US005345444A

United States Patent [19]
Cloonan et al.

[11] Patent Number: 5,345,444
[45] Date of Patent: Sep. 6, 1994

[54] CHUTED, GROWABLE PACKET SWITCHING ARRANGEMENT

[75] Inventors: Thomas J. Cloonan, Downers Grove; Gaylord W. Richards, Lisle, both of Ill.

[73] Assignee: AT&T Bell Laboratories, Murray Hill, N.J.

[21] Appl. No.: 954,104

[22] Filed: Sep. 30, 1992

[51] Int. Cl.$^5$ .................. H04L 12/56; H04J 14/08
[52] U.S. Cl. .................. 370/60; 370/94.1; 359/139
[58] Field of Search .............. 370/60, 60.1, 94.1, 370/94.2, 94.3; 359/139, 117, 118, 128, 135

[56] References Cited

U.S. PATENT DOCUMENTS

| 5,048,011 | 9/1991 | Melen | 370/60 |
| 5,077,483 | 12/1991 | Cloonan et al. | 359/135 |
| 5,093,743 | 3/1992 | Eng et al. | 359/120 |
| 5,148,428 | 9/1992 | Lee | 370/60 |

FOREIGN PATENT DOCUMENTS 2206939 8/1990 Japan.
3159338 7/1991 Japan.

OTHER PUBLICATIONS

K. Y. Eng et al., "The Growable Switch Architecture: A Self-Routing Implementation for Large ATM Applications", *International Conference on Communications*, Jun. 1991, pp. 32.3.1–32.3.7.
S. Urushidani, "Rerouting Network: A High-Performance Self-Routing Switch for B-ISDN", *IEEE Journal on Selected Areas in Communications*, vol. 9, No. 8, Oct. 1991, pp. 1194–1204.
M. Decina et al., "Shuffle Interconnection Networks with Deflection Routing for ATM Switching: the Open-Loop Shuffleout", Proc. of 13th International Teletraffic Congress, Copenhagen, Jun. 1991.
T. J. Cloonan et al., "Optical Implementation and Performance of One-Dimensional and Two-Dimensional Trimmed Inverse Augmented Data Manipulator Networks for Multiprocessor Computer Systems", *Optical Engineering*, vol. 28, No. 4, Apr. 1989, pp. 305–314.
T. K. Woodward et al., "Operation of a Fully Integrated GaAs–Al$_x$Ga$_{1-x}$As FET–SEED: A Basic Optically Addressed Integrated Circuit", *IEEE Photonics Technology Letters*, vol. 4, No. 6, Jun. 1992, pp. 614–617.
Y. S. Yeh et al., "The Knockout Switch: A Simple, Modular Architecture for High-Performance Packet Switching", *ISS'87, AT&T Technical Papers*, pp. 288–311.

Primary Examiner—Wellington Chin
Assistant Examiner—Hassan Kizou
Attorney, Agent, or Firm—Ross T. Watland; David L. Hurewitz

[57] ABSTRACT

A growable packet switching arrangement where the distribution network blocking probability is substantially reduced because the network has both switch links and chute links, and the network nodes include both a switching element interconnecting successive stage switch links and a plurality of non-switching, chute connections interconnecting successive stage chute links. A network node can transfer a packet, being received on a switch link, to any selected one of the chute connections of that node for transmission on a chute link. The network nodes are relatively simple and inexpensive because they store only the first few bits needed to route an ATM cell. The blocking probability is further reduced when the number of chutes per node is increased. The number of chutes may be based, for example, on the number of switch link inputs per node.

13 Claims, 37 Drawing Sheets

FIG. 2 OPTICAL HARDWARE MODULES FOR TWO NODE STAGES

THROUGHPUT vs. S

PACKET LOSS PROBABILITY vs. S

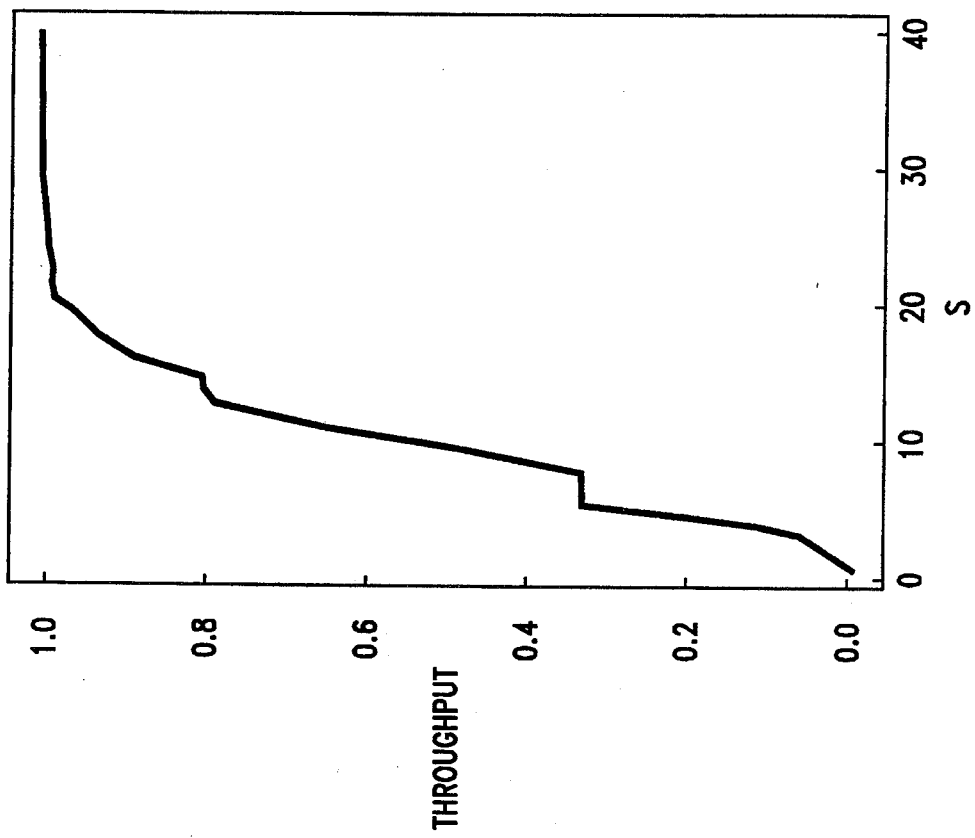
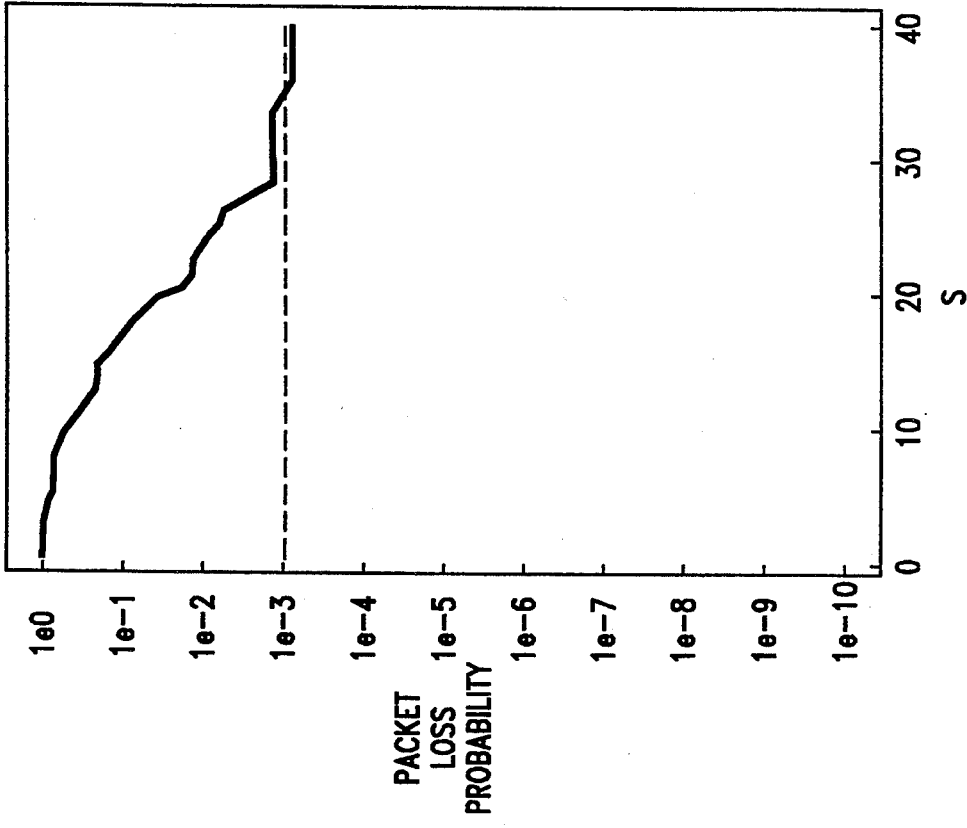

PACKET LOSS PROBABILITY vs. S

SWITCH ARCHITECTURE

CHUTED, GROWABLE PACKET SWITCHING ARRANGEMENT

CROSS-REFERENCE TO RELATED APPLICATION

This application is related to the following applications, which are assigned to the same assignee and concurrently filed herewith:

T. J. Cloonan et al., Case 9-22, "Free Space Optical, Growable Packet Switching Arrangement", Ser. No. 07/954,103, U.S. Pat. No. 5,311,345 and T. J. Cloonan et al., Case 11-24, "Chuted, Optical Packet Distribution Network" Ser. No. 07/954,101, U.S. Pat. No. 5,289,303.

TECHNICAL FIELD

This invention relates to communication systems.

BACKGROUND AND PROBLEM

The term broadband covers a host of new products, technologies, services, and networks. One way to define broadband networks is to categorize them as those networks that support services requiring bit rates well above one megabits per second. Business and residential subscribers will be connected to broadband networks via a common access, operating at 150 megabits per second or above, that can handle a range of different broadband service types. ATM (asynchronous transfer mode) has been chosen as the communication principle on which broadband networks will be based. A future broadband ISDN (integrated services digital network) will offer the flexibility needed to handle diverse services ranging from basic telephone service to high speed data transfer, videotelephony, and high quality television distribution. The key to this flexibility is ATM which carries digital information in special cells. This allows the network to be used efficiently by applications and services with widely differing bandwidth requirements and call characteristics.

A growable packet switching arrangement disclosed in a paper by K.Y. Eng et al., entitled "The Growable Switch Architecture: A Self-Routing Implementation for Large ATM Applications", *International Conference on Communications*, June 1991, has been proposed for use in ATM applications. In the disclosed arrangement, a partition is made between a front-end distribution network and a column of output packet switching modules. The outputs are divided into groups of n lines each. All incoming cells are routed through the front-end distribution network for substantially instantaneous delivery based on their destination output group addresses. As such, the distribution network must not buffer full cells and must instead perform its routing function for all the cells arriving in each packet time slot. Since the n outputs are grouped into n lines each, there are a total of N/n output groups. For each output group, the corresponding output packet switching module has m (m> =n) inputs, meaning that up to m cells can be accepted for that output group in each time slot. The output packet switching module has buffers for storing full received cells. In an L×N packet switch, up to L cells can arrive simultaneously for a particular output group so the design range of m is n< =m< =L. According to the generalized knockout principle, it is possible to pick m< <N to yield an arbitrarily small cell loss probability that is acceptable for the switching system design, even under the most general traffic assumptions. The maximum number of cells accepted into each output group is restricted to m; if there are more than m cells destined to the same output group in a time slot, the excessive cells are simply dropped. Although the general characteristics of a growable packet switching arrangement are known, the design of such an arrangement with a low cost, high performance distribution network remains an important problem.

A high performance, self-routing ATM switch, referred to as a rerouting network (FIG. 39) is disclosed in a paper by S. Urushidani entitled, "Rerouting Network: A High-Performance Self-Routing Switch for B-ISDN", *IEEE Journal on Selected Areas in Communications*, Vol. 9, No. 8, Oct. 1991. Although the Urushidani paper contains no disclosure, teaching or suggestion concerning growable packet switching arrangements, the performance of the disclosed ATM switch is enhanced by a "rerouting" algorithm applied to a particular multistage interconnection algorithm. The interconnection algorithm offers many access points to the output and resolves output contention by including buffers at each switching stage. The rerouting network is a multistage interconnection network with more than $\log_2 L$ switching stages. The stages are interconnected by routing links and bypass links. The algorithm is applied to embed plural banyan networks within the switch. That is, the partial networks composed of switching elements and routing links from switching stages 1 to 4, from 2 to 5, and so on are banyan networks, because a single path always exists between all input-output pairs. Therefore, a cell that fails to take its desired route due to cell contention at a given stage can restart its routing from the next stage through a banyan network formed in the following $\log_2 L$ stages. This restart is referred to as "rerouting". On the other hand, the bypass links route the cell, having reached its destination, to the output line without switching at each switching element. Although the rerouting network has good performance--for example, relatively low blocking-it is not suitable for use as the distribution network of a growable packet switching arrangement. One of the key properties of a growable packet switching arrangement is that the nodes of the distribution network should not be required to buffer full packets. The rerouting network nodes each include sufficient buffers to store full 53-byte ATM cells for later transmission. Accordingly, the nodes are complex and expensive in sharp distinction to the distribution network nodes needed in a growable packet switching arrangement.

In view of the foregoing, a need exists in the art for a growable packet switching arrangement with a low cost, high performance distribution network.

SOLUTION

This need is met and a technical advance is achieved in accordance with the principles of the invention in an exemplary growable packet switching arrangement where the distribution network blocking probability is substantially reduced because the network has both switch links and chute links, roughly comparable to the rerouting network routing links and bypass links, respectively, and the network nodes include both a switching means interconnecting successive stage switch links and a plurality of non-switching, chute connection means interconnecting successive stage chute links. A network node can transfer a packet, being received on a switch link, to any selected one of the chute connection means of that node for transmission on a chute link. The network nodes are relatively simple and inexpensive because they store only the first few bits needed to route an ATM cell, rather than storing the full 53 bytes for transmission at a later time as in the rerouting network nodes. The blocking probability is further reduced when the number of chutes per node is increased. The number of chutes may be based, for example, on the number of switch link inputs per node.

A packet switching arrangement in accordance with the invention has L input ports, M intermediate ports and N output ports, where L, M and N are positive integers greater than two. The arrangement includes a distribution network and N/n output packet switching modules, where n and N/n are positive integers with $N>n>1$. The distribution network switches packets from the L input ports to the M intermediate ports without storing full received packets. The packet switching modules each comprise means for switching packets from a distinct group of m intermediate ports to a distinct group of n output ports, where m is a positive integer with $m>n$. Each packet switching module further comprises means for storing full received packets. The distribution network comprises S stages of nodes. Each node of the first $(S-1)$ node stages comprises an $X \times Y$ switching means, where $S>3$, $X>1$, and $Y>1$. The distribution network further comprises $(S-1)$ link stages interconnecting successive node stages with each link stage comprising chute links and switch links. The $X \times Y$ switching means of each node of the interior $(S-2)$ node stages receives packets on X switch links and selectively transmits packets on Y switch links. Each such node includes a plurality of chute connection means each connected to only one chute link of the preceding link stage and to only one chute link of the following link stage for transmitting a packet, being received from the preceding stage chute link, onto the following stage chute link. Each such node also includes means for transferring a packet, being received on a switch link by the $X \times Y$ switching means, to any selected one of the chute connection means for transmission on the following stage chute link.

Illustratively, $X=2$, $Y=2$ and the number of chute connection means of each node of the interior $(S-2)$ node stages is $Xm/n=4$. All four of the chute connection means are connected via chute links to only one node of the following node stage. The selected chute connection means is selected based on the absence of a packet on the preceding stage chute link. A packet is transferred from the $2 \times 2$ switching means to a chute connection means based on destination information included in the packet. The transfer is made unless packets are present on the four preceding stage chute links connected to the four chute connection means.

The $2 \times 2$ switching means of each node of the first node stage receives packets from two input ports and selectively transmits packets on two switch links. The first stage node includes four chute connection means each connected to only one chute link of the following link stage for transmitting a packet thereon. The first stage node also includes means for transferring a packet, being received from one of the two input ports, to any selected one of the four chute connection means for transmission on the following stage chute link.

Each node of the last node stage includes means for receiving packets on two switch links, and four chute connection means each connected to only one chute link of the preceding link stage and to only one of the M intermediate ports, for transmitting a packet, being received from the preceding stage chute link, to the one intermediate port. The last stage node also includes means for transferring a packet, being received on a switch link by the receiving means, to any selected one of the four chute connection means for transmission to the one intermediate port. The receiving means discards a packet being received on a switch link but not being transferred to a chute connection means. No packets are discarded by any node of the first $(S-1)$ node stages.

The distribution network includes a number of partitions each associated with a distinct output packet switching module. Each partion includes all of the network chute links leading to the associated output packet switching module and all of the network nodes interconnected by those chute links. There are $n/X=2$ nodes per node stage in a partition. The $(S-1)$ links stages include global link stages having inter-partition switch links and local link stages having no inter-partition switch links. The network nodes include global nodes preceding global link stages and local nodes preceding local link stages. The global nodes route packets in accordance with a first routing method; the local nodes route packets in accordance with a second routing method.

DRAWING DESCRIPTION

FIGS. 17–26 are diagrams showing the performance of networks of the type shown in FIG. 6 but having varying network parameters;

GENERAL DESCRIPTION

Figure 1:
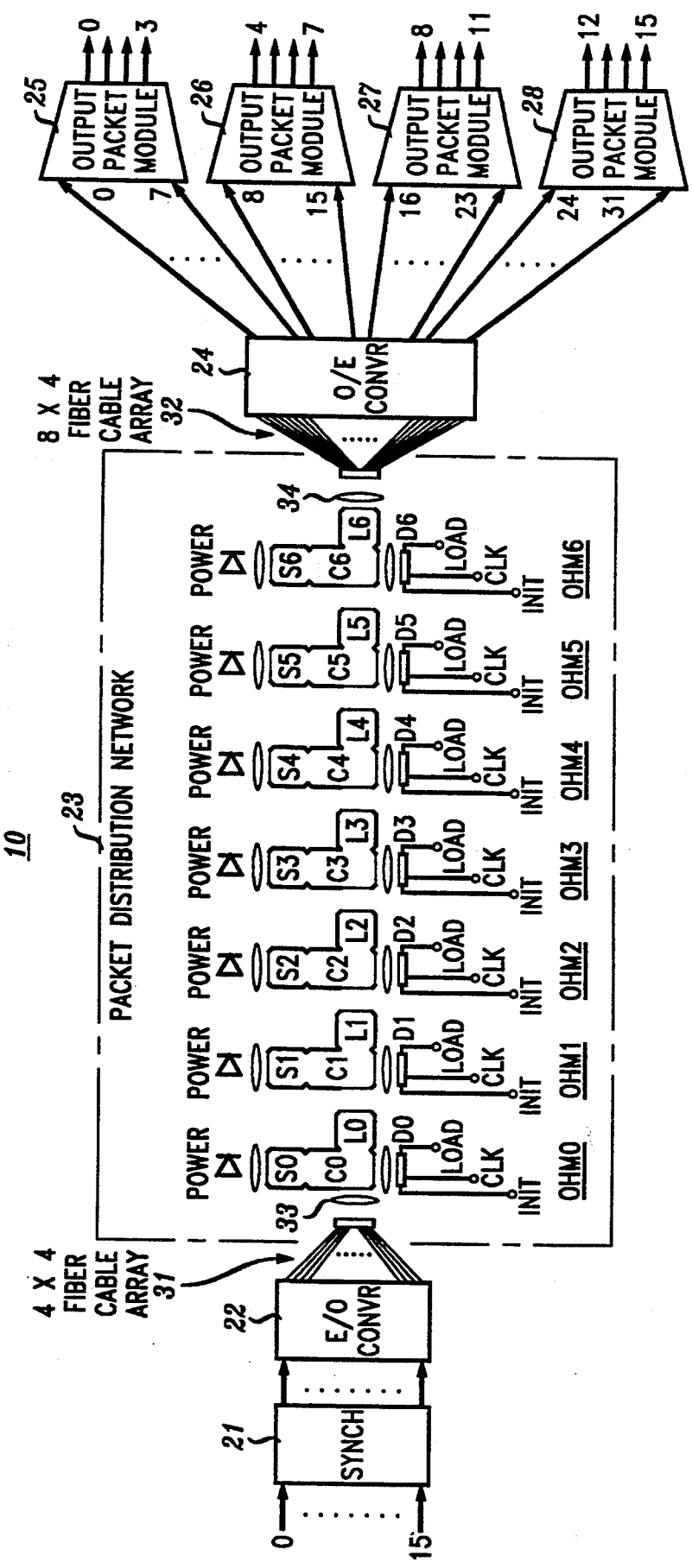
FIG. 1 is a diagram of an exemplary growable packet switching arrangement including a packet distribution network.

One specific illustrative embodiment of a growable, packet switching arrangement 10 is shown in FIG. 1. Arrangement 10 includes a packet distribution network 23 implemented using free-space optics. Packets are received on 16 inputs by a synchronizer 21 which aligns incoming packets for transmission in packet time slots.

Figure 6:
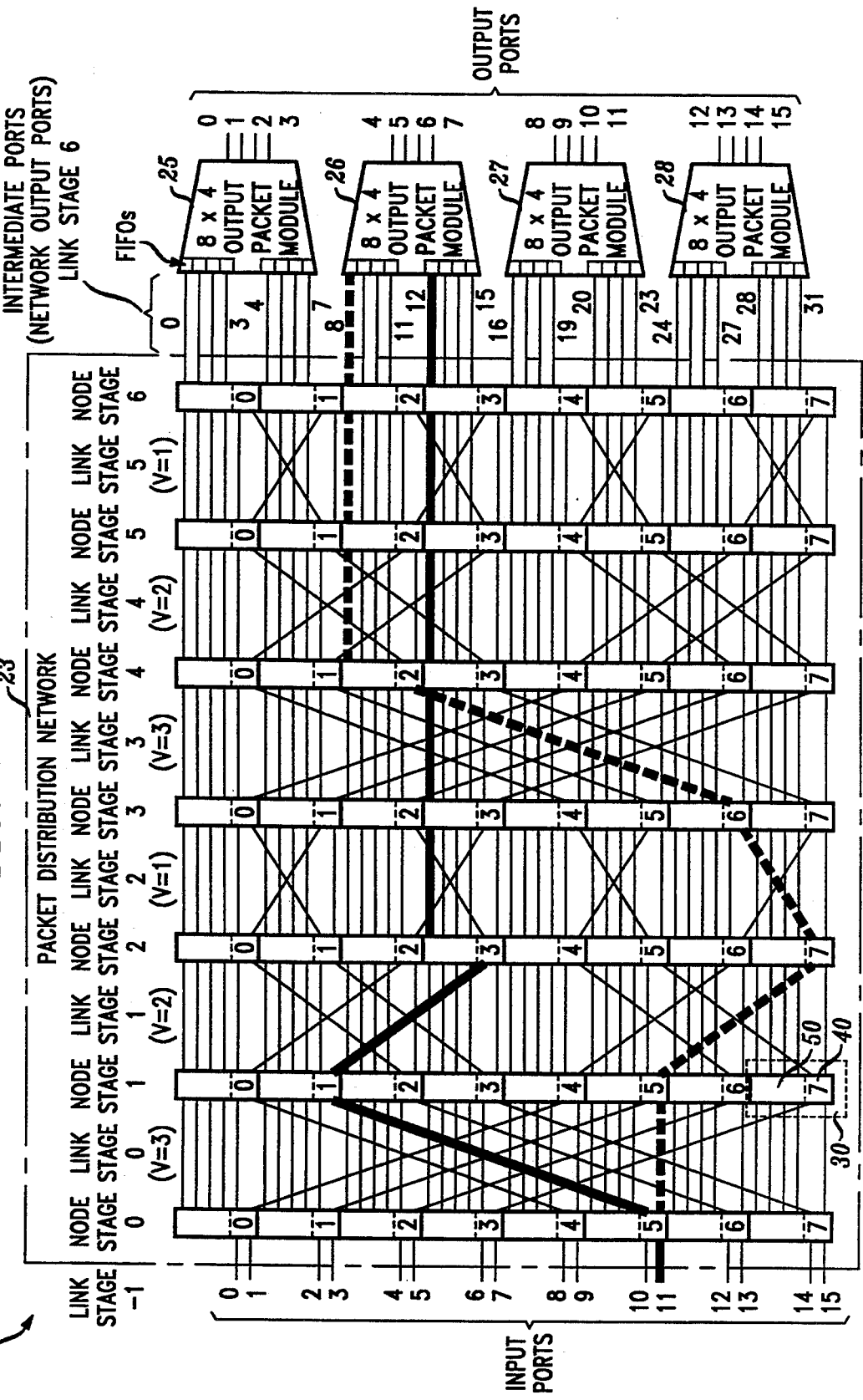
FIG. 6 is a diagram of the topology of the network of FIG. 1.

The aligned packets are converted to optical signals by an E/O converter 22 and transmitted by a 4×4 fiber cable array 31 to packet distribution network 23. Network 23 packet switches each incoming packet for transmission on one fiber of an 8×4 fiber cable array 32. Network 23 includes a lens 33, seven optical hardware modules OHM0-OHM6, and a lens 34. The optical signals transmitted from network 23 are converted back to electrical signals by an O/E converter 24 for transmission to four output packet modules 25-28. The network 23 topology is shown in FIG. 6.

Figure 2:
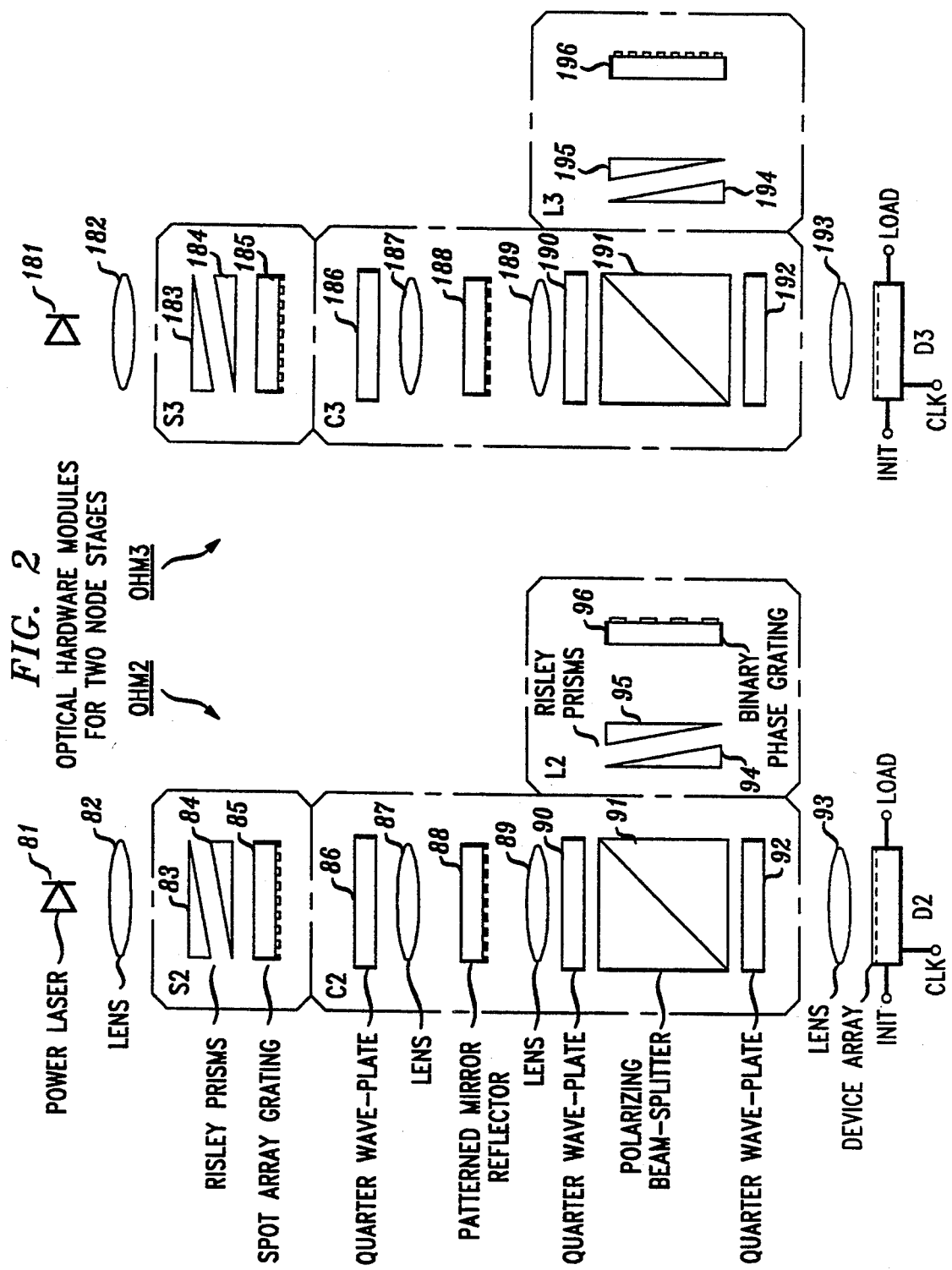
FIG. 2 is a diagram of two optical hardware modules included in the arrangement of FIG. 1.

Network 23 includes seven planar arrays D0-D6 of FET-SEED devices implemented using the technology disclosed in a paper by T. K. Woodward et al., entitled "Operation of a Fully Integrated GaAs—Al$_x$Ga$_{1-x}$As FET-SEED: A Basic Optically Addressed Integrated Circuit", *IEEE Photonics Technology Letters*, Vol. 4, No. 6, June 1992. The optical hardware required for two consecutive optical hardware modules OHM2 and OHM3 is shown schematically in FIG. 2. The linearly polarized light emitted from the laser diode power supply 81 is collimated by the collimation lens 82. The collimated beam is then routed through a pair of Risley prisms 83, 84, which can be rotated to point the beam to its appropriate location on the device array. This pointed beam is then passed through a spot array grating 85 to create an array of clock beams that can be used to interrogate the state of each of the windows in the device array D2. This array of beams is then passed through a quarter wave-plate retarder 86 to convert the light from a linear polarization state to a circular polarization state. The array of clock beams is then imaged by lens 87 through the transparent spacings on patterned mirror reflector 88 before being re-collimated by a third lens 89 and re-convened into a linear polarization state by quarter wave-plate retarder 90. This linear polarized light passes straight through polarization-sensitive beam splitter 91 before being routed through a quarter waveplate retarder 92, converting it into circularly polarized light. The light is then imaged by an objective lens 93, creating clock spots in the windows of device array D2. Each of these clock spots is modulated (absorbed or reflected) by the device window, and the reflected light is routed back through objective lens 93 which now re-collimates the light. This re-collimated light is then passed through quarter wave-plate retarder 92 which converts it back into linear polarized light, but its plane of polarization is now oriented so that the light is reflected to the fight by polarization-sensitive beam splitter 91. The light is then routed through another set of Risley prisms 94, 95, which can be used to point the beams into the windows of the second device array D3. The pointed beams then pass through a 1×3 binary phase grating 96, which provides a Banyan interconnection pattern. The output beams from grating 96 are directed into a second polarization-sensitive beam splitter 191 and reflected up. These beams pass through quarter wave-plate retarder 190, which converts them into the circular polarization state, and then through lens 189. They are then imaged onto the reflective mirrors on patterned mirror reflector 188 and reflected back down through lens 189 and then through quarter wave-plate retarder 190 which converts them back into a linear polarization state. These beams then pass through polarization-sensitive beam-splitter 191 and through quarter wave-plate retarder 192 toward the second objective lens 193. The modulated signal beams from the first device array D2 are then imaged as spots within the windows of the second device array D3, setting the digital states of those devices. Note that the only difference between OHM2 and OHM3 is that the period of grating 196 is half that of grating 96. This results in the different interconnection patterns in network 23 (FIG. 6). The INIT, LOAD and CLK signals are described later herein.

DETAILED DESCRIPTION

Background on the Growable Packet Switch Architecture

Figure 37:
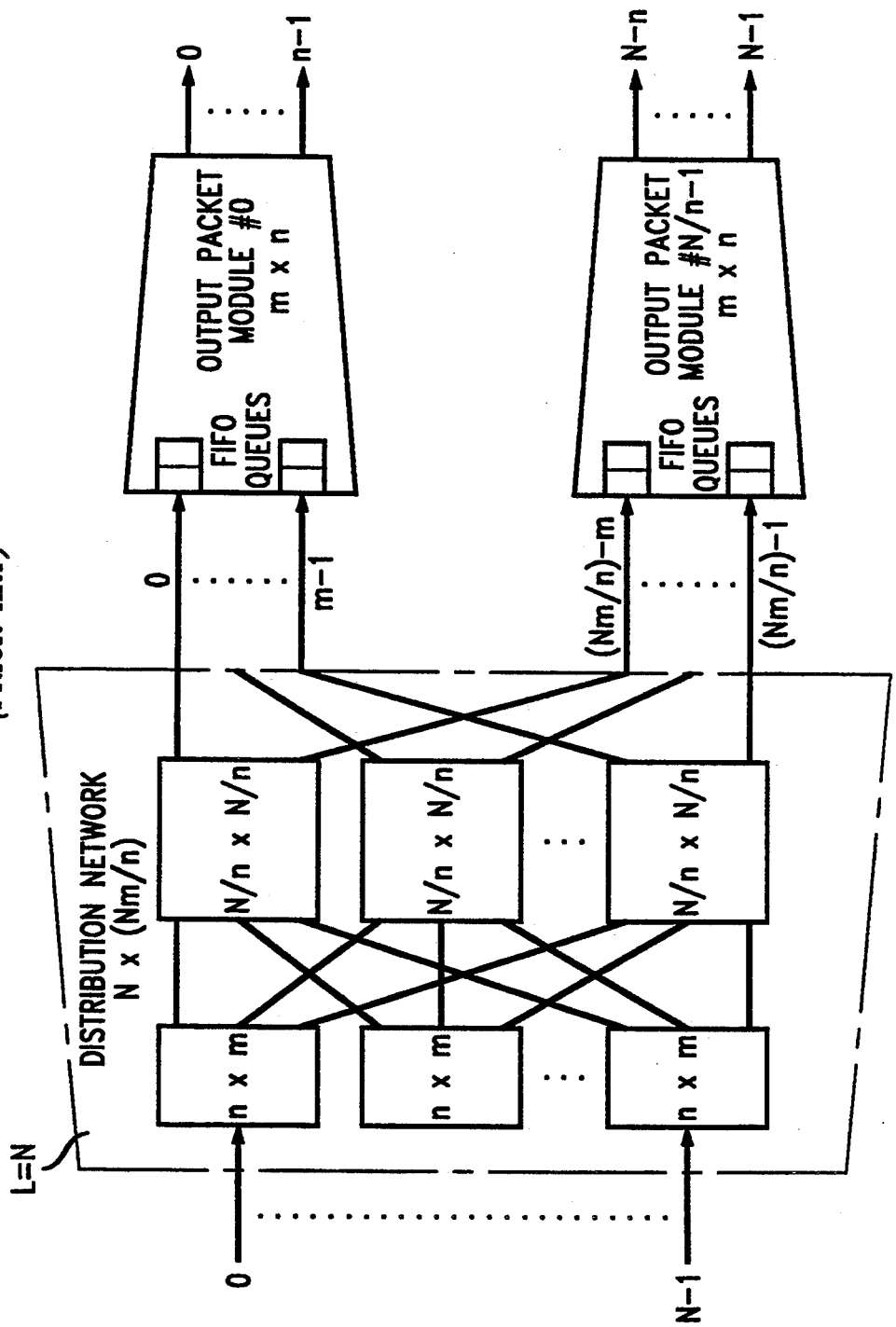
FIG. 37 is a diagram of the prior art, growable packet switching architecture.

The general growable packet switch architecture contains two basic sub-systems: the distribution network and output packet modules (FIG. 37). These two sub-systems perform very distinct functions. The distribution network routes each packet to the output packet module that is connected to the packet's desired output port. Thus, if a packet is destined for output port #0, then the distribution network merely needs to route the packet to any one of the m input lines connected to output packet module #0, assuming that one of the m input lines is idle. The distribution network supports L input ports, and it also supports M=Nm/n intermediate ports (or distribution network output ports) that are routed to the mxn output packet modules, where L, N, and n are all a power of 2. Each of the output packet modules has access to n output ports, so a total of K=N/n output packet modules are required. Each output packet module stores the arriving packets in FIFO queues, and it then routes the packets at the front of each of the m FIFO queues to their desired output ports. Thus, in addition to providing the FIFO queues, the output packet module also provides the functionality of a small switching network. The overflow problems associated with the finite-length queues within the output packet module can be analyzed to determine satisfactory queue lengths based on the traffic load.

An interesting feature of the growable packet switch is the manner in which it provides arbitration and contention resolution between multiple packets that are destined for the same output port. Arbitration determines which of the input packets is given priority when contention exists, and those packets which are not able to be instantly routed to their desired output are buffered at FIFO queues in the output packet modules so that they can then be transmitted by the output packet module to their desired output port at a later time. The Knockout Principle is the contention resolution scheme used in the growable packet switch, and it takes advantage of the statistical nature of packet traffic to determine the number of queues that must be associated with each output port to yield desired operating characteristics. According to the generalized Knockout Principle, if the arriving packets on different input lines are statistically independent, then groups of n output ports can be associated with a single output packet module containing m input lines and m FIFO queues, and the probability that more than m packets will be simultaneously destined for the n output ports can be engineered to be very low by selecting an appropriate value of m. (The basic knockout principle is disclosed in a paper by Y. S. Yeh et al., entitled "The Knockout Switch: A Simple, Modular Architecture for High-Peformance Packet Switching", *ISS 87, AT&T Technical Papers*. If more than m packets are simultaneously destined for the same output packet module, then only m of the packets are accepted (loaded into the m FIFO queues), and the rest of the packets are dropped. Higher level protocols can be used to initiate the re-transmission of dropped packets.

If the network size (L×N) is large and if $p_L$ is the network loading (the probability that a packet arrives on an input line during a particular packet slot), it can be shown that the probability that a packet is lost within the growable packet switch is approximately given by:

$$P(\text{packet loss}) = [1 - m/(np_L)]\left[1 - \sum_{k=0}^{m}(np_L)^k e^{-np_L}/k!\right] + (np_L)^m e^{-np_L}/m! \quad [1]$$

Figure 38:
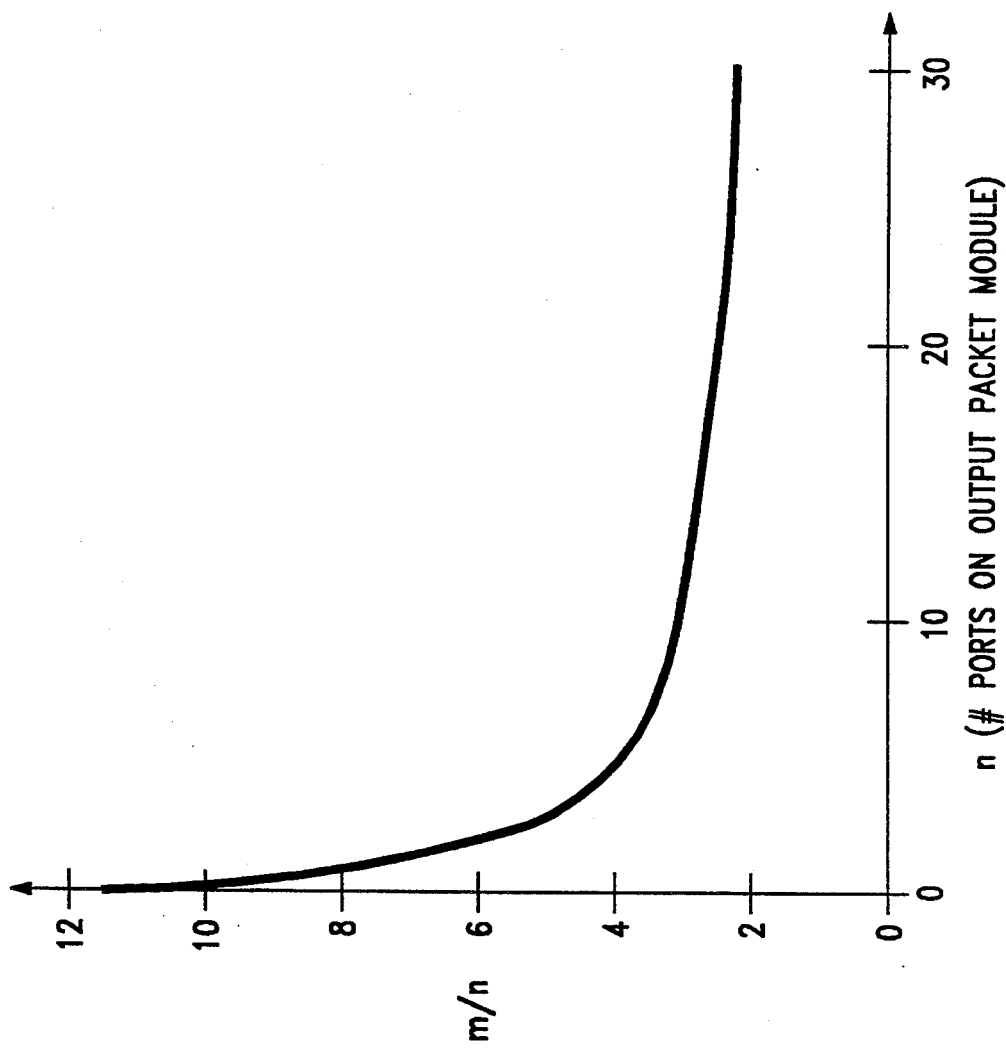
FIG. 38 is a diagram illustrating the relation of certain parameters of the architecture of FIG. 37.
Figure 39:
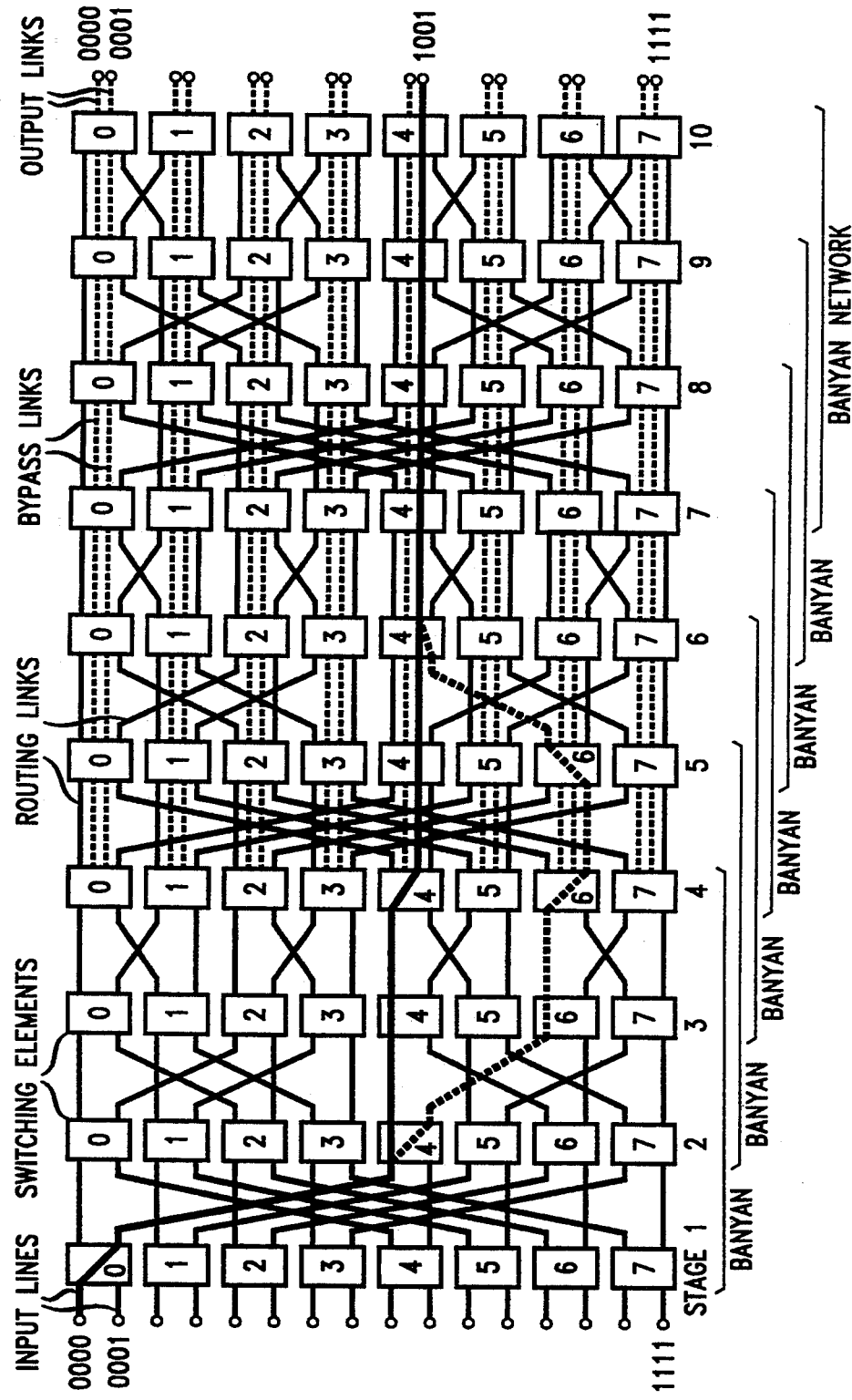
FIG. 39 is a diagram of a prior art network.

For example, if the switch is 90 percent loaded ($p_L=0.9$) and if the output packet module has $n=8$ output ports and $m=32$ FIFO queues, then Eq. 1 indicates that a network with large L and N would experience a packet loss probability of approximately $4\times 10^{-13}$. Eq. 1 also indicates that larger values of n require smaller m/n ratios to produce a particular packet loss probability. However, larger values of n also require more complicated functionality (and cost) within the output packet modules. If the minimum acceptable packet loss probability is defined (somewhat arbitrarily) to be $10^{-9}$, then the required values of m/n are illustrated in FIG. 38 as a function of n. For most applications, it is sufficient that the exemplary growable packet switching arrangements herein have a probability of packet loss less than the square root of the expression of Eq. 1.

Interconnections Based on Free-Space Digital Optics

Figure 3:
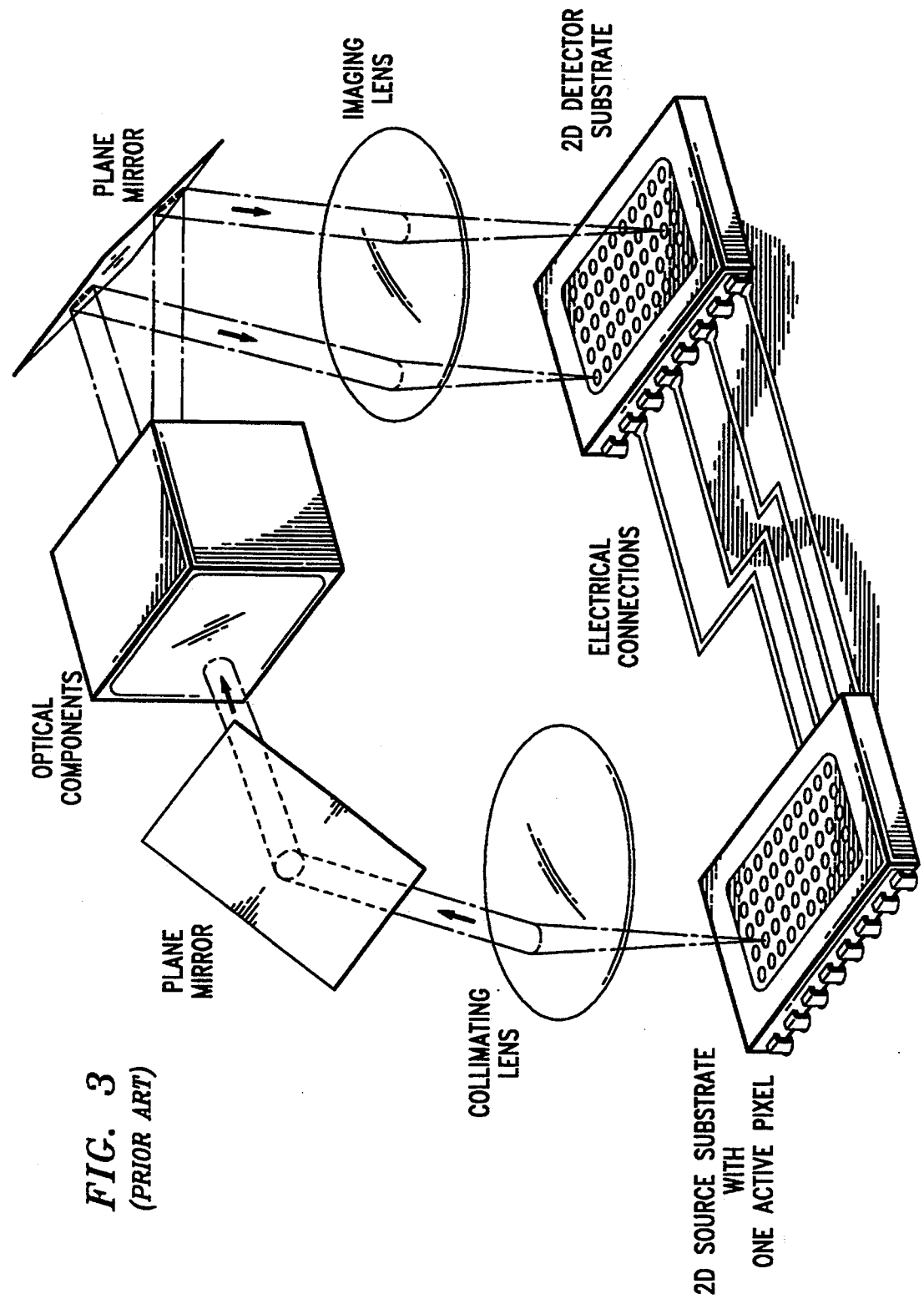
FIGS. 3–4 are diagrams of optical hardware used in a prior art network.
Figure 4:
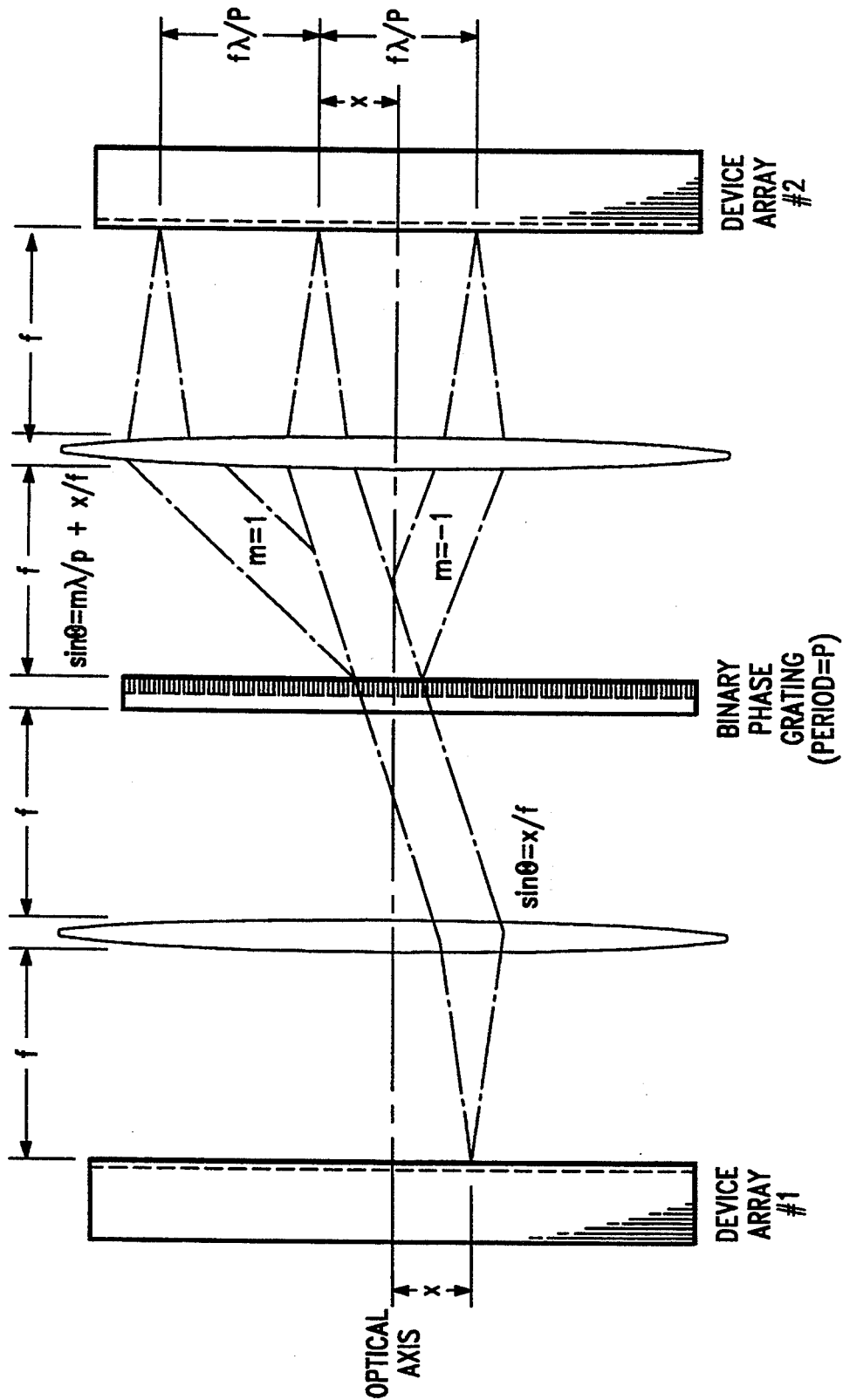

The interconnections between devices in the growable packet switch can be provided using free-space digital optics. A very simple arrangement of optical components that can provide many useful interconnection patterns with low power loss is shown in FIG. 3. This arrangement is based on a simple 2-lens, infinite conjugate, telecentric imaging system set up to provide 4f imaging. However, a binary phase grating (diffractive hologram) has been added at the pupil plane between the two imaging lenses to provide the necessary beam-steering operations. Changes in the periodic structure of the grating can diffract different amounts of optical power from the original beam into different spots in the output image plane. The grating in FIG. 4 routes each input beam to three spots in the output image plane. This arrangement of hardware (FIG. 4) was proposed for use in a multistage interconnection network known as the Trimmed Inverse Augmented Data Manipulator (TIADM) network disclosed in a paper by T. J. Cloonan et al., entitled "Optical Implementation and Performance of One-Dimensional and Two-Dimensional Trimmed Inverse Augmented Data Manipulator Networks for Multiprocessor Computer Systems", *Optical Engineering*, April 1989, Vol. 28, No. 4, pp. 305–314. If some of the beams in the TIADM network (light-colored links in FIG. 5) are blocked, then the connections for the Banyan network are provided by the remaining dark-colored links. A 2D-to-3D conversion of this interconnection pattern is performed to make it usable with planar device arrays. This conversion is described in detail within the literature.

Figure 5:
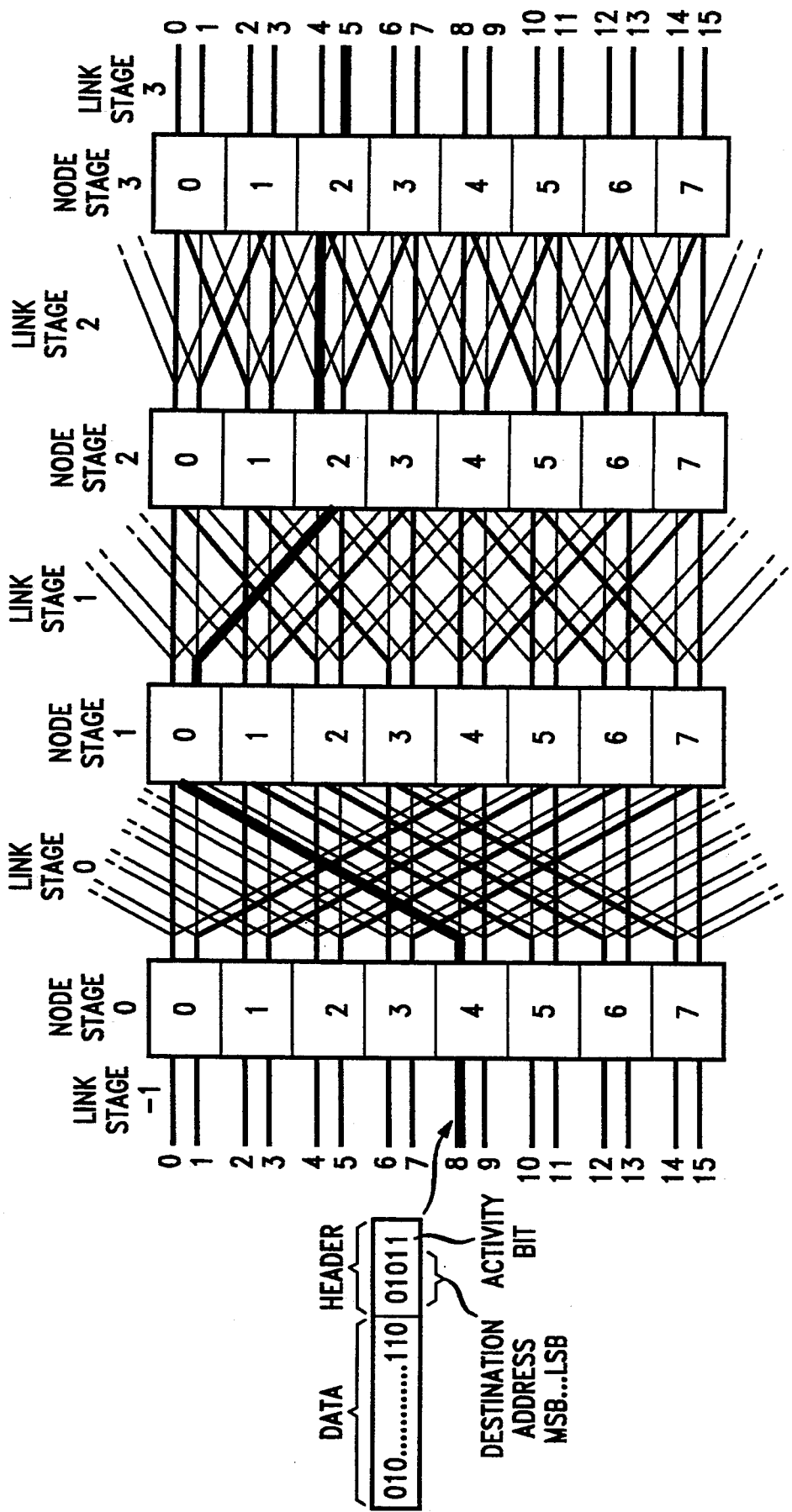
FIG. 5 is a diagram showing the light beams generated by binary phase gratings such as those shown in FIG. 2.

The techniques used to label the link-stages, the node-stages, and the nodes within a node-stage are illustrated in FIG. 5. If the network contains S node-stages, then these node-stages are labeled from 0 to S−1, and the link-stage following node-stage i is labeled link-stage i. FIG. 5 also shows the fixed link-stage connections required between adjacent node-stages. If there are $L/2 = N/2 = Q = 2^q$ nodes in each node-stage labeled 0 to Q−1, then the Banyan interconnection within link-stage i must provide a connection from every node (U) in node-stage i to two nodes ($Z_0$ and $Z_1$) in node-stage i+1. The Banyan can be described by two nodemapping functions ($B_i^0$ and $B_i^1$) on the address of node U, where each mapping function describes the connection provided by one of the two output links from node U in node-stage i to one of the two nodes $Z_0$ and $Z_1$ in node-stage i+1. In the equation below, the node address U is represented by a q-bit binary representation ($u_q, u_{q-1}, ..., u_2, u_1$), and the node address $Z_\theta$ is represented by a q-bit binary representation ($z_q, z_{q-1}, z_2, z_1$). The mapping from node U to node $Z_\theta$ can therefore be described by the general expression:

$$(z_{q-1}, z_2, z_1) = B_i^\theta[(u_q, u_{q-1}, ..., u_{q-i+1}, u_{q-i-1}, ..., u_2, u_1)] = (u_q, u_{q-1}, ..., u_{q-i+1}, \theta \text{ XOR } u_{q-i}, u_{q-i-1}, ..., u_2, u_1) \quad [2]$$

where $\theta$ is the output link identifier ($\theta = 0$ for the straight output link, and $\theta = 1$ for the angled output link). One of the two mappings described by Eq. 2 implements the straight connection to the node directly in line with the source node, while the other mapping implements the angled connection to a node that is $2^{q-i-1}$ node positions away from the source node.

The Chuted-Banyan (Canyan) Distribution Network

Because the Canyan (Chuted-Banyan) distribution network 23 is used within a growable packet switching arrangement 10, it is implemented as a synchronous network with all of the arriving fixed-length packets buffered and synchronized at the input of the network. If the incoming packets are 53-byte ATM packets, the virtual path indicators (VPIs) used for transmission equipment (or the virtual channel indicators (VCIs) used for switching equipment) are extracted from the 5-byte packet headers and routed through a translation table at the front-end of the network. The output of the translation table contains a new VPI (VCI) that is overwritten on top of the old VPI (VCI). It also contains the actual destination address of the output port to which the packet is destined, and this information is prepended to the 53-byte ATM packet. As a result of this prepended address, a slight data rate speed-up is required between the incoming data lines and the links within the Canyan distribution network.

The network structure of Canyan distribution network 23 is shown in FIG. 6 within growable packet switching arrangement 10 having L=16 input ports, N=16 output ports, and output packet modules 25–28 with m=8. inputs (FIFO queues) and n=4 output ports. Thus, growable packet switching arrangement 10 provides K=N/n=4 output packet modules. Canyan distribution network 23 supports L=16. input ports and M=Nm/n=32 intermediate ports (or network 23 output ports); network 23 provides an effective fanout F=m/n=2. Canyan distribution network 23 contains S=7 node-stages. The number, S, of distribution network stages is reduced by making (S+1), the number of stages including the stage of output packet modules, less than $[\log_2(\max(L,N))]_2/2$, the minimum number of stages in a multi-stage sorting network of 2×2 switching means, K. E. Batcher, "Sorting Networks and Their Applications," The Proceedings of AFIPS, 1968. (S+1) is also made greater than $log_2N$ so that complete connectivity is achieved between input ports and output ports. For the remainder of this description, it is assumed that the number of input ports (L) of packet switching arrangement 10 is equal to the number of output ports (N) of arrangement 10.

Canyan distribution network 23 can be viewed as two distinct sub-networks (the switching sub-network and the chute-multiplexing sub-network) overlaid on top of one another. As a result, the nodes in FIG. 6, (e.g., 30) are effectively split into two distinct parts: the switching means 40 (the portion of each node below the dashed line) and the chute-multiplexing portion 50 (the portion of each node above the dashed line). The switching means of each node provides the functionality required for the routing of each packet to an appropriate output chute in the chute-multiplexing sub-network, while the chum-multiplexing portion of each node comprises four chum connection means which merely transport the packets toward the FIFO queues in the output packet modules 25–28. Because of similarities between the beam-steering operations required for their link-stage interconnections, both the switching sub-network and the chute-multiplexing sub-network share the same imaging optics to provide the connections between adjacent node-stages.

The Switching Sub-Network

Figure 7:
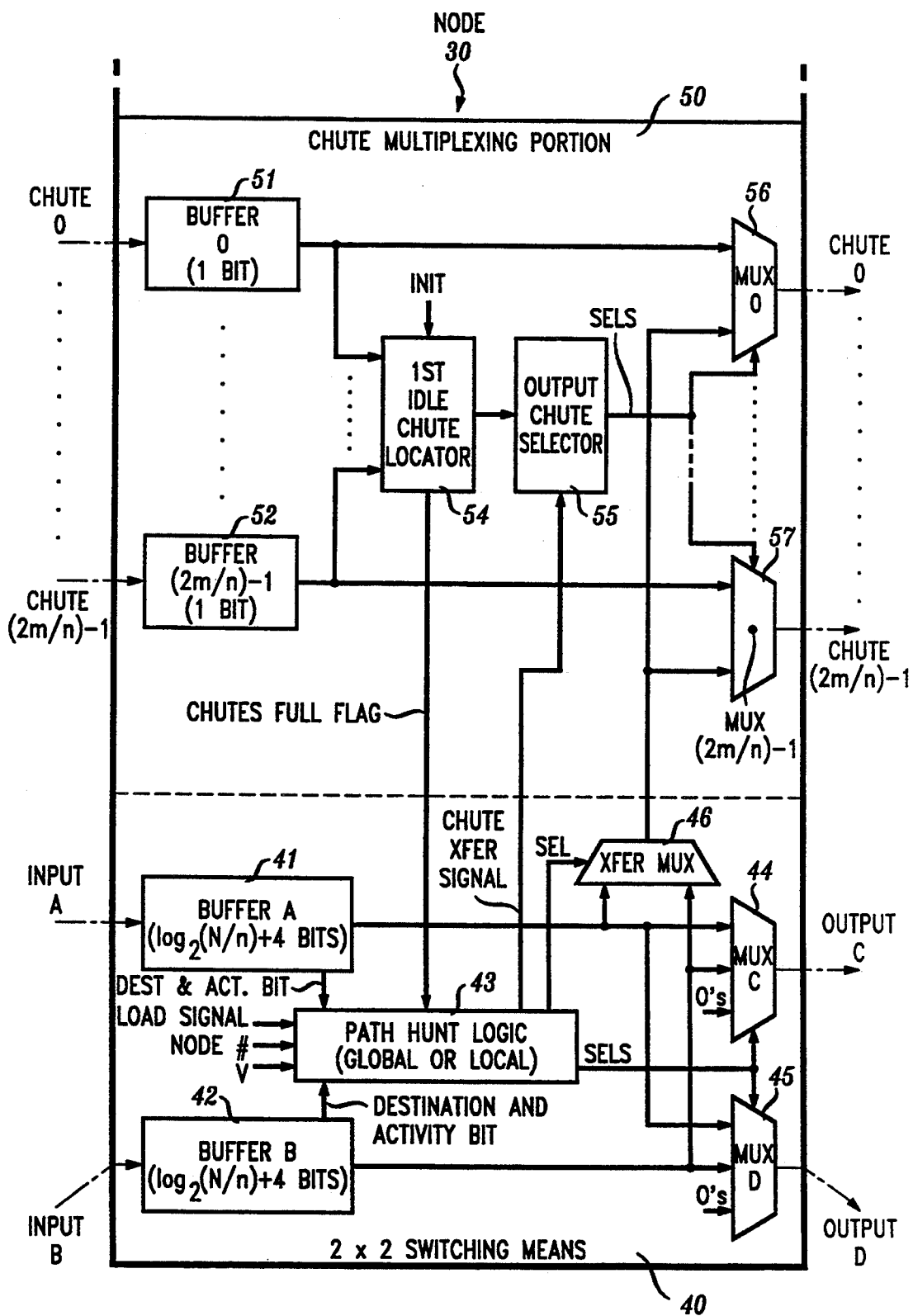
FIG. 7 is a diagram of the functional elements of one node in the network as shown in FIG. 6.
Figure 8:
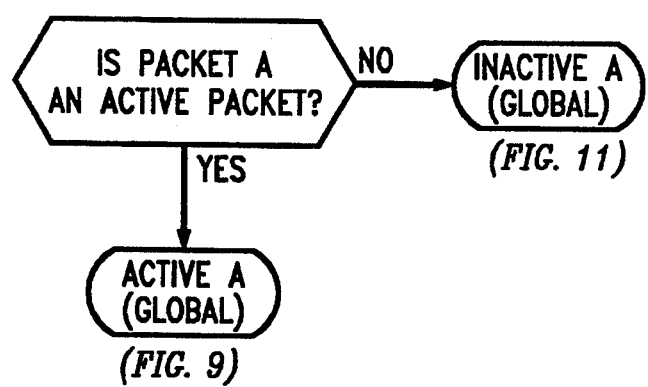
FIGS. 8–11 are flow charts of the contention resolution method used in global nodes of the network of FIG. 6.
Figure 9:
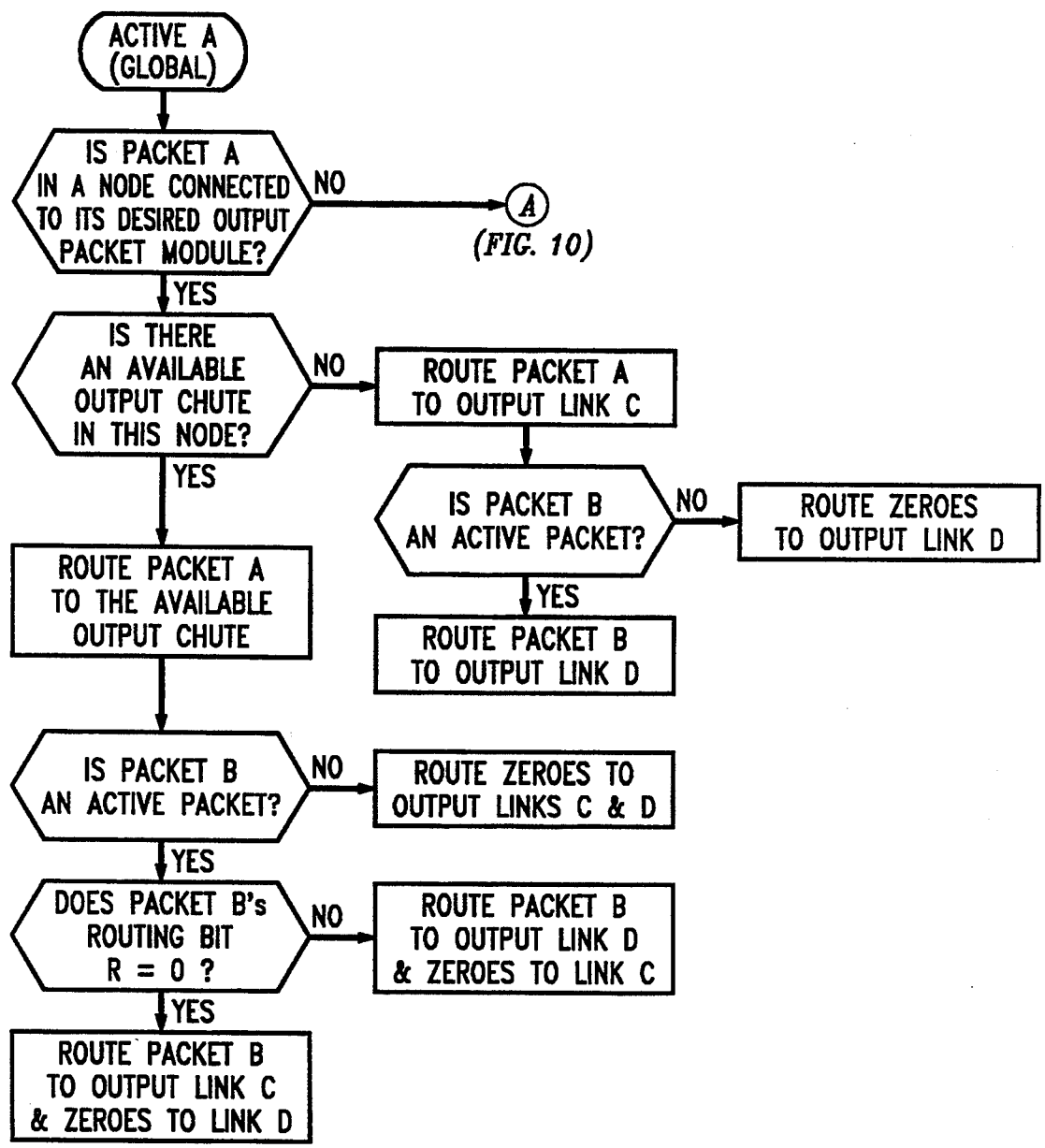
Figure 10:
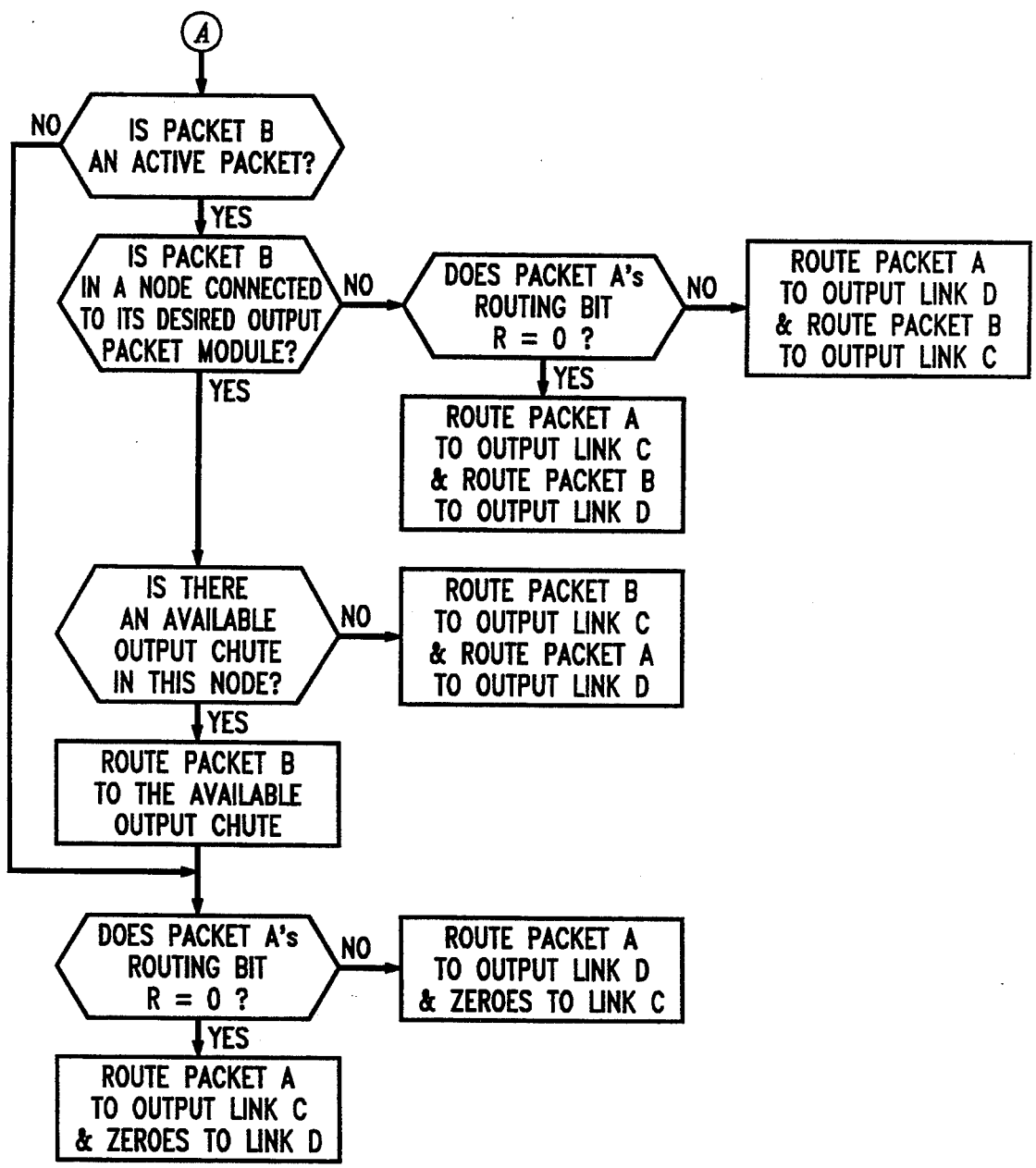
Figure 11:
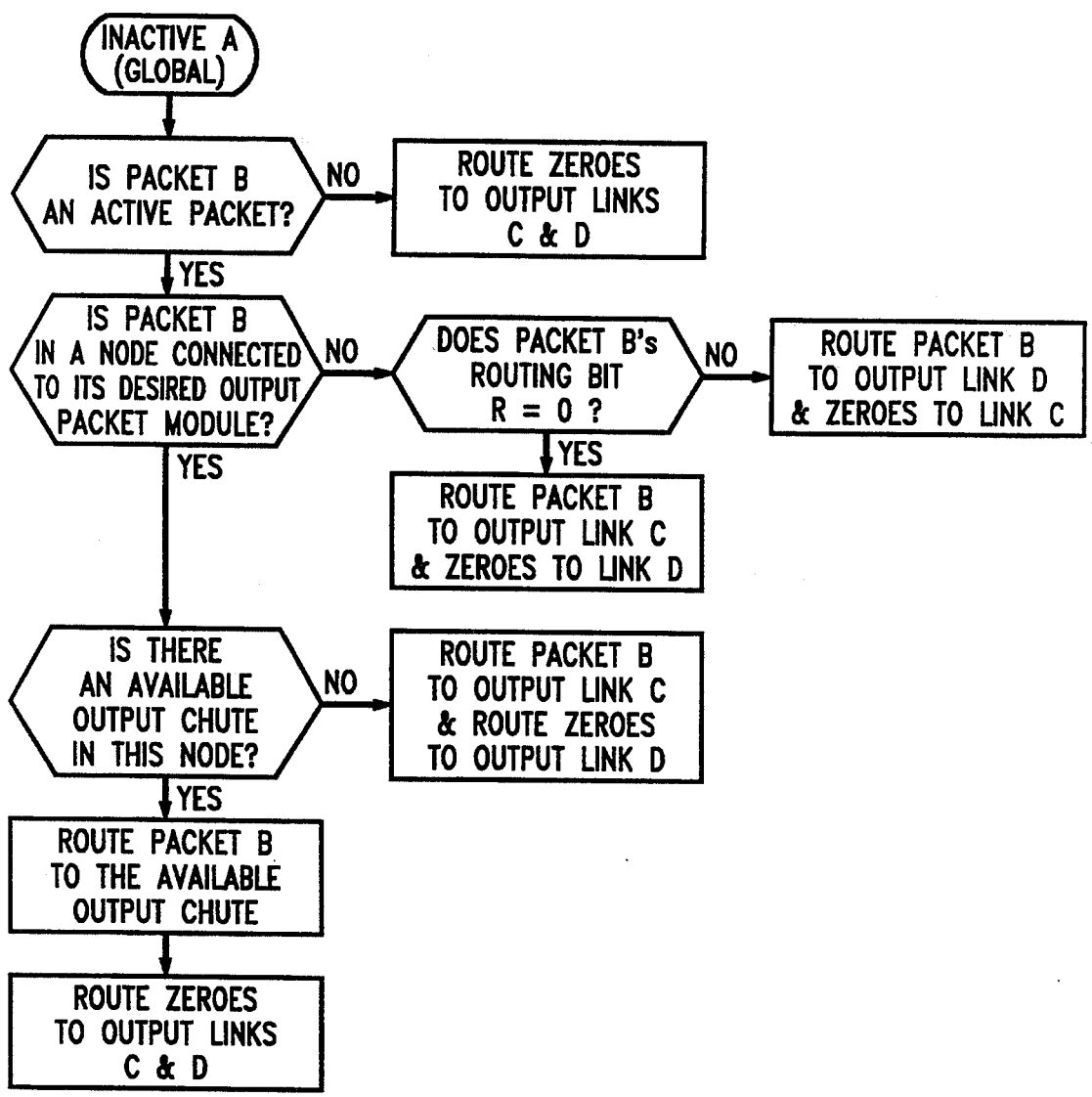
Figure 12:
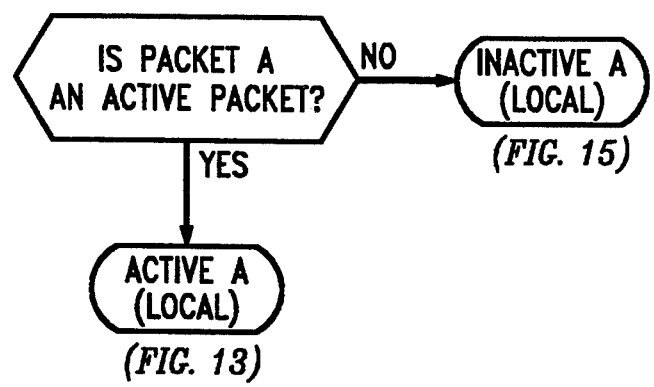
FIGS. 12–15 are flow charts of the contention resolution method used in local nodes of the network of FIG. 6.
Figure 13:
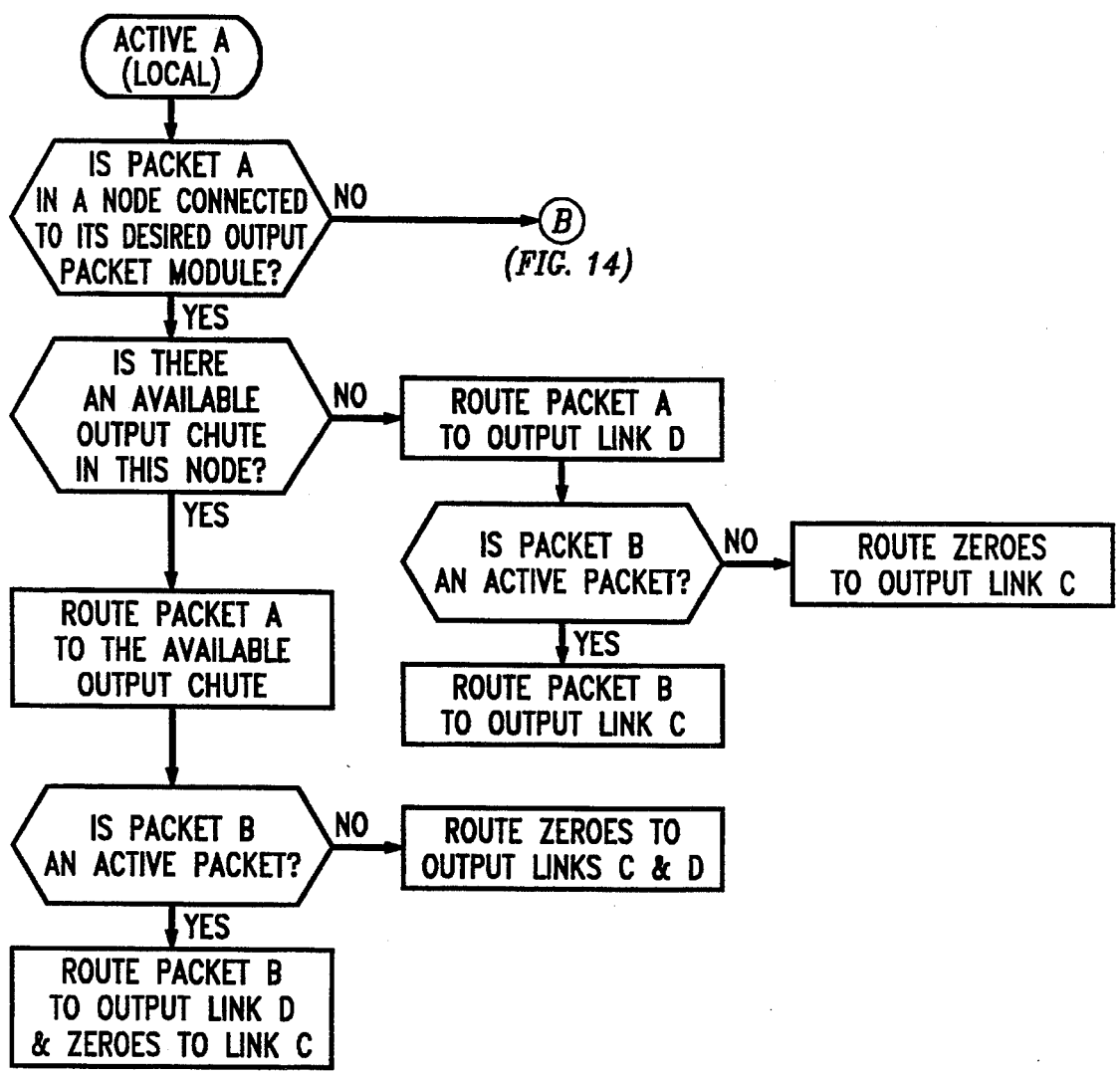
Figure 14:
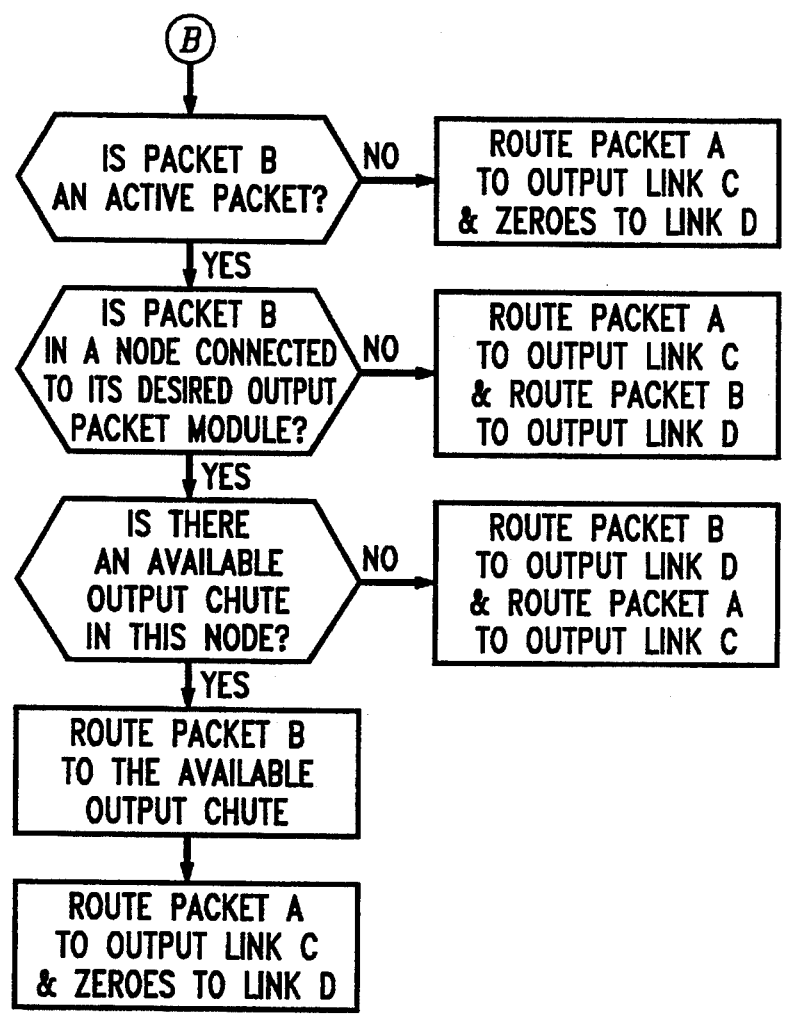
Figure 15:
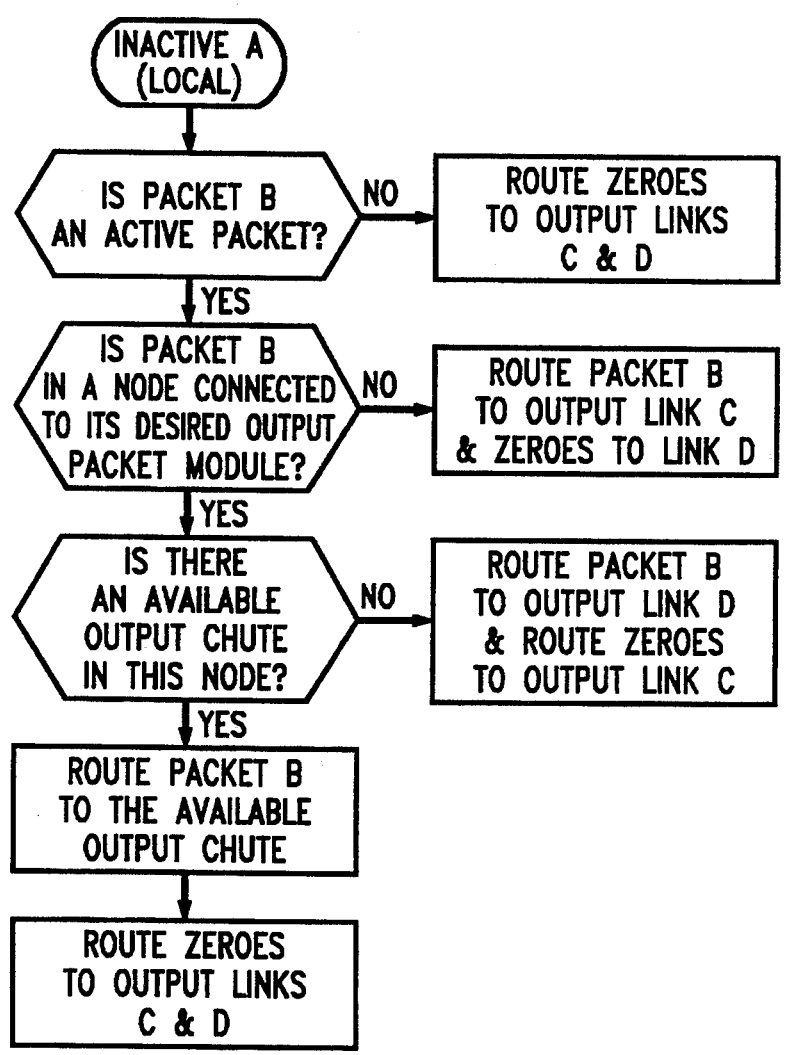

In the Canyan network, the switching sub-network is a standard Banyan network containing 2×2 self-routing switching means (the lower portion of the nodes in FIGS. 6 and 7). Two packets arriving at the switching means input ports can be routed on straight paths or on crossed paths to the two switching means output ports. The links connecting the outputs from the switching means of the nodes in one node-stage to the switching means of the nodes in the next node-stage are referred to herein as switch links and provide a Banyan interconnection pattern (Eq. 2). The Banyan pattern in an L=N-input Canyan network is repeated after every set of $log_2(N)-1$ link-stages, because full connectivity is provided after this number of link-stages. Thus, link-stage f will provide the Banyan connections defined by the mapping functions $B^0_{f mod [log_2(N)-1]}$ and $B^1_{f mod [log_2(N)-1]}$, where A mod B is defined as the integer remainder of the quotient A/B and the mapping functions are defined in Eq. 2. To identify the link-stage type within a Canyan network, a network parameter known as the connection variable (V) is defined. In any link-stage i of an N-input Canyan network, the connection variable for that particular link-stage is defined to be:

$$V = log_2(N) - 1 - i\ mod[log_2(N) - 1] \quad [3]$$

The connection variables for each of the link-stages in the Canyan network of FIG. 6 are displayed at the top of the FIGURE.

If a particular packet is destined for an output port emanating from output packet module j, then the goal of the switching sub-network is to route that packet on the Banyan connections to any node in any node-stage that is in any horizontal row connected via the straight output chutes to output packet module j. Once the packet has arrived at any of these desired nodes, then the packet is transferred within the node to the chute-multiplexing portion of the node (the upper portion of the nodes in FIGS. 6 and 7).

The Chute-Multiplexing Sub-Network

The chute-multiplexing sub-network is a simple network with Nm/n straight output links, referred to herein as chute links, interconnecting the chute-multiplexing portion of nodes (the upper portion of the nodes in FIGS. 6 and 7). If X is the number of switching means inputs per node (in this example, X=2), the Xm/n output chutes leaving the chute-multiplexing portion of node U in node-stage i are connected directly to the Xm/n inputs on the chute-multiplexing portion of node U in node-stage i+1, and the Xm/n output chutes leaving the chute-multiplexing portion of node U in the last node-stage are connected via fiber optic bundles and an O/E converter 24 directly to FIFO queues in the associated output packet module. The chute-multiplexing portion of node U comprises Xm/n chute connection means. All of the output chutes require straight link-stage connections, which are provided by the Banyan interconnection optics of FIG. 4. The chute-multiplexing sub-network permits packets that have arrived at a node in their desired output row to be multiplexed onto the first available (idle) output chute of the 2m/n output chutes emanating from the node. Once a packet is routed to an idle output chute, it is transported straight across that output chute from node to node until it arrives at the FIFO queue in the output packet module. In effect, a packet that is routed to an output chute takes possession of that chute for the entire packet slot, and no other packets are permitted to use that chute during the entire packet slot.

A Routing Example

An example of a packet being routed through Canyan distribution network 23 is shown by bold, solid links in FIG. 6. This packet is to be routed from input port 11 to output port 5 within growable packet switching arrangement 10. Since output port 5 is attached to output packet module 26, the packet can be routed down any one of the eight output chutes directed at output packet module 26. These output chutes are numbered 82–15. In link-stage 0 and link-stage 1, the packet passes through links in the switching sub-network until it arrives at node 3 in node-stage 2. Since node 3 has output chutes that are connected to output packet module 23, the packet can be transferred to the chute-multiplexing sub-network and directed to output chute 12. It then passes straight through the remaining stages on output chute 12, ultimately arriving at one of the FIFO queues in output packet module 26. Output packet module 26 then routes the packet to its destination (output port 5).

Another path connecting input 11 to output 5 is shown by the bold, dashed links in FIG. 6. This alternate path would be used by the packet if it were deflected from its desired path in node-stage 0. This deflection could occur as a result of another packet propagating through the network that is already using the desired path. Once a packet is deflected, it propagates through a minimum of $log_2(N/n)+1$ link-stages before it can be transferred to the chute-multiplexing logic. However, if the Canyan network is designed with a sufficient number of link-stages, then the alternate paths will typically permit most of the deflected packets to be routed to their desired destinations.

Nodes in the Canyan Distribution Network

To provide the routing functions described in the previous section, the 2×2 switching means of each node within the Canyan distribution network performs five basic tasks. These tasks are: 1) recognition of activity on an input link, 2) calculation of a packet's desired output link, 3) recognition that a packet can be transferred from the switching sub-network to the chute-multiplexing sub-network, 4) arbitration of packet contention problems, and 5) routing of the packets to appropriate output links or to the chute-multiplexing portion of the node. The chute-multiplexing portion of each node also performs several tasks, including 1) recognition of activity on an input chute, 2) passing of packets from input chutes to output chutes, 3) multiplexing of a new packet from the switching means of the node onto the first available output chute, and 4) informing the switching means of the node of the availability (or lack of availability) of idle output chutes.

The basic hardware within a single node 30 (FIG. 6) is illustrated in FIG. 7. In switching means 40, two link inputs (labeled input A and input B ) and two output links (labeled output C and output D) are provided in the switching means of the node. Input link A is assumed to come from the straight link within the Banyan interconnection, and input link B is assumed to come from the angled link (angled either up or down) within the Banyan interconnection. Output link C is assumed to go to the straight link within the Banyan interconnection, and output link D is assumed to go to the angled link (angled either up or down) within the Banyan interconnection. $Log_2(N/n)+1$ of the header bits (described below) that arrive on an input link are buffered in a $log_2(N/n)+4$ bit shift register 41, 42, and the buffered bits are routed to the path hunt logic 43 which determines appropriate output links for each of the packets. (Note: The three extra bits in the shift registers 41, 42 provide sufficient delay for the operations of the path hunt logic 43 to be completed before the outputs of the shift registers 41, 42 are sent to output multiplexers 44, 45. Output multiplexers 44, 45 route the packets to their appropriate output links based on the select signals produced by path hunt logic 43. To calculate appropriate output links for the packets, the path hunt logic is supplied with several pieces of information, including the destination addresses and the activity bits for the packets on inputs A and B, the node number (to identify when a packet is in its desired row), the connection variable V (to identify the pivot bit used for routing), and a load signal (to indicate when the packet header is appropriately latched in the input buffer so that path hunt processing can begin). The node number and the connection variable can be hard-wired values that would change for each node.

Path hunt logic 43 also determines if any of the arriving packets should be transferred to chute-multiplexing portion 50 of the node. To calculate whether a packet should be transferred to an output chute, path hunt logic 43 is supplied with several pieces of information, including the destination addresses and the activity bits for the packets on inputs A and B, the node number, the connection variable (V), and a flag indicating if all of the chutes are full, (the flag being generated by first idle chute locator 54 activity bit). If a packet is transferred into chute-multiplexing portion 50 of the node, path hunt logic 43 generates the appropriate select signals for a transfer multiplexer 46, which routes packet A or packet B up into chute-multiplexing portion 50. Path hunt logic 43 also sends a chute transfer signal to output chute selector 55 so that the multiplexer 56, 57 associated with the first available (idle) output chute can be enabled to receive the transferred packet. First idle chute locator 54 receives a reset pulse to initialize the logic at the beginning of each packet interval. Chute-multiplexing portion 50 of the node also has logic to pass the packets on the $2m/n$ incoming chutes to the $2m/n$ output chutes. Only one flip-flop delay is required for re-timing of bits as they pass through chutemultiplexing portion 50 of the node in each node-stage. However, an implementation using only one flip-flop results in different network delays for packets that have entered the chutes in different node-stages, so the logic associated with the FIFO queues of the output packet modules must be modified to identify the start of a packet (by locating the activity bit) and load the packet into the FIFO queues as it arrives. Another approach that eliminates this variable delay would add $log_2(N/n)+4$ bit shift registers to each of the chute input ports, but this scheme increases the node hardware complexity and increases the required field of view of the optics.

Figure 35:
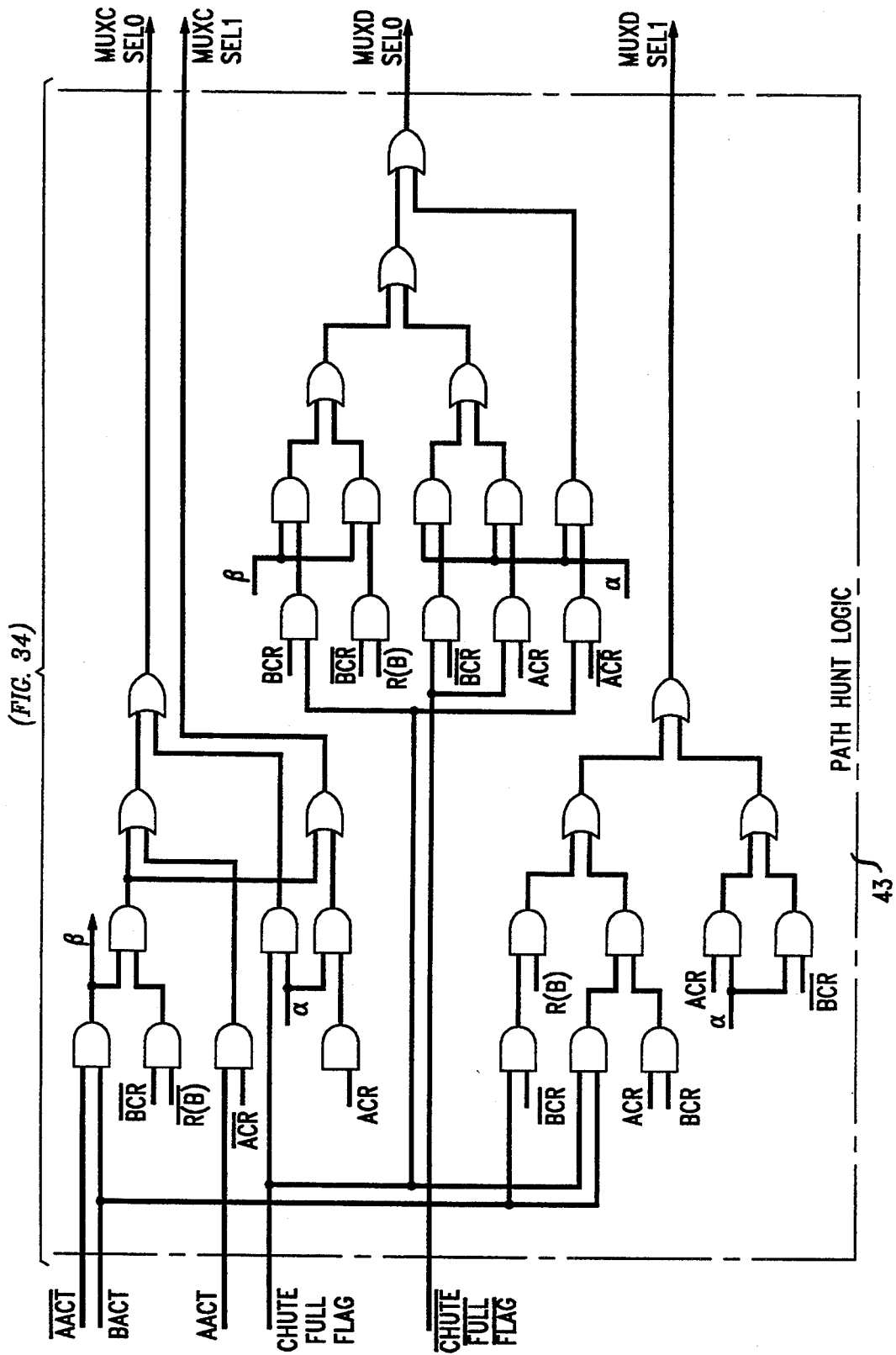
Figure 36:
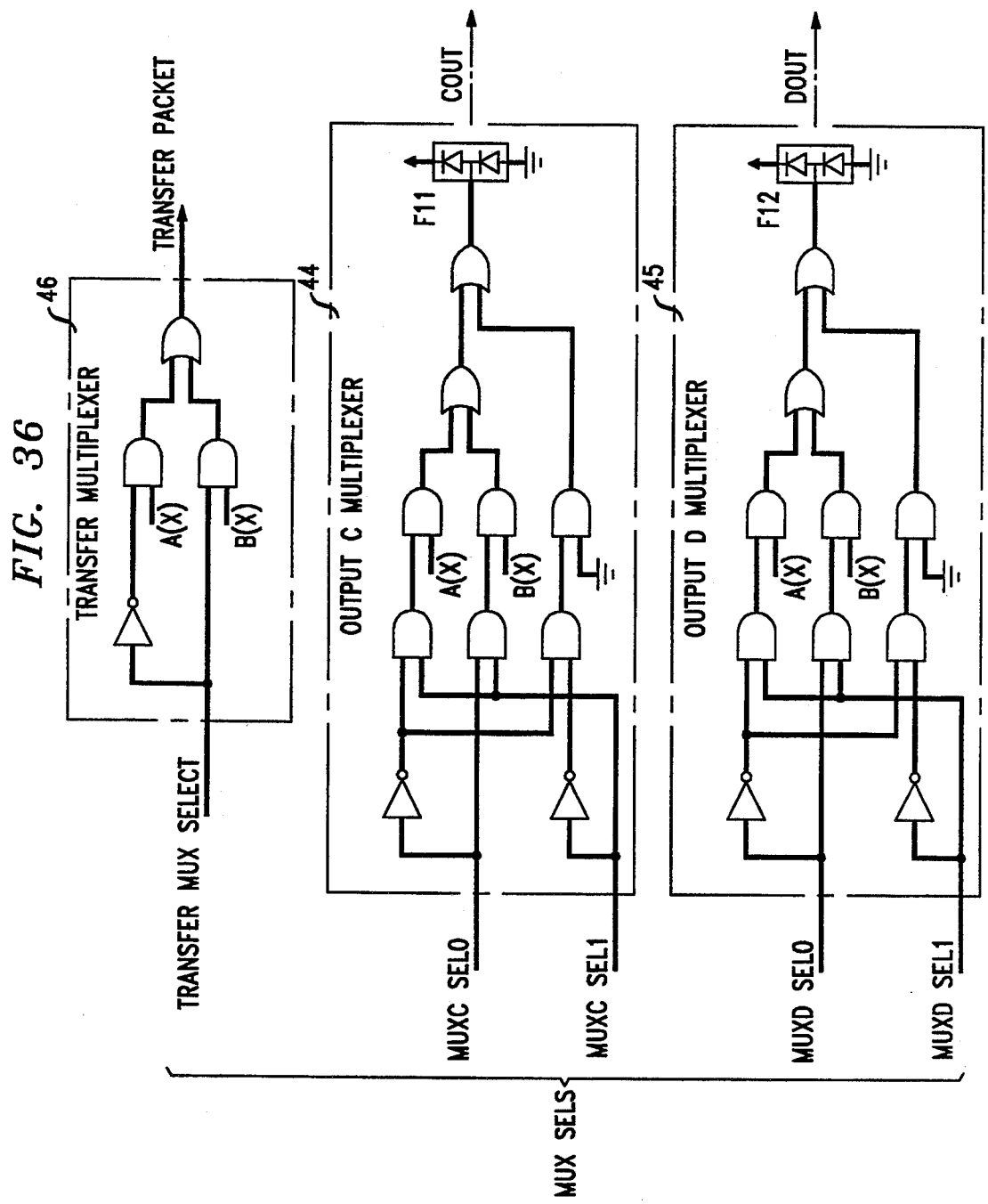

The logic required for the single node 30 (FIG. 7) is shown in detail in FIGS. 27-36. Assuming single flip-flops are used for each chute in each node and assuming that simple 2-input logic gates (ANDs, ORs, NANDs, and NORs) with fanout values less than eight are used within the design, then the resulting design requires a maximum of $[(32m/n)+25log_2(N/n)+207]$logic gates per node, $(2m/n)+2$ detectors and $(2mn/n)+2$ modulators. The detectors F1, F4, FIG. 27; F9, FIG. 30; F10, FIG. 32) and modulators (F5, F8, FIG. 29; F11, F12, FIG. 36) are implemented using FET-SEED technology. FIG. 5 shows a packet format that gives each node within a particular node-stage enough information to route the packet to the correct node in the next node-stage. Thus, each packet has a header prepended to the raw data that can be used by the nodes to identify the output port to which the packet is destined. For a growable packet switch with N output ports, this header contains $log_2(N)+1$ bits, where the first bit of the header field is the activity bit and the remaining $log_2(N)$ bits specify the destination address for the packet- i.e., the packet's desired output port. The activity bit is a logic one for an active packet and a logic zero for an inactive packet. As discussed later herein, network nodes are of two types: global and local. The path hunt logic 43 circuitry shown in FIGS. 35 and 36 is for a local node and implements the routing method of FIGS. 12-15; a global node (not shown) implements the routing method of FIGS. 8-11. The signal INIT is used to preset all of the SR latches in FIG. 28 to known states so that their outputs indicate that all of the chutes are idle. This INIT signal is asserted on all of the nodes in all of the stages at the beginning of each packet interval prior to the introduction of packets into the first stage of the network. The LOAD signal is used to store the values of ACR and BCR (indicating when packet A and B are in the correct row), R(A) and R(B) (indicating the routing bits for the packets), and AACT and BACT (indicating the activity bits for the packets). These values are stored in flip-flops when the header field from the packet has been shifted into the node. The CLK signal is used to synchronize the data flow within all of the nodes, because it is used to shift bits into the node shift registers.

Packet Routing Algorithm

To route a packet through the node-stages of a Banyan network, a particular node must first determine if the incoming packet is active- i.e., if the activity bit is set to a logic one. If so, then the node only needs to compare one bit of the binary destination address to one bit of the node's own binary address to calculate the appropriate output link to which the packet should be routed. The bits of interest within the destination address and the node address are referred to as the destination pivot bit and the node pivot bit, respectively. For a network with L=N inputs, the binary destination address is represented by $(p_{1-1}, p_{1-2},...,p_1,p_0)$, where $1=\log_2(N)$. The binary node address is similarly represented by $(h_{1-1},h_{1-2},...,h_1)$. The destination pivot bit for a packet in node-stage i is then defined to be $\rho v$, where V is the connection variable (Eq. 3) defined for the link-stage i, which follows node-stage i. The node pivot bit for a node in node-stage i is similarly defined to be $h_v$. A routing bit (R) can be calculated for every packet within node-stage i based on these pivot bits, and the routing bit is given by $R=\rho_v$ XOR $h_v$. If the routing bit R=0, then the packet is routed to the straight output link from the node, which provides a connection to the next node-stage defined by the mapping function $B_i^0$ (Eq. 2). If the routing bit R=1, then the packet is routed to the angled output link from the node, which provides a connection to the next node-stage defined by the mapping function $B_i^1$ (Eq. 2). As an example, the single packet in FIG. 5 originating at input 8 and destined for output 5 has a destination address given by $\rho_3,\rho_2,\rho_1,\rho_0=0101$. The destination pivot bit in node 4 of node-stage 0 is $\rho_3=0$ and the node pivot bit is $h_3=1$, so the routing bit R=1 and the packet is routed on the angled output link. The destination pivot bit in node 0 of node-stage 1 is $\rho_2=1$ and the node pivot bit is $h_2=0$, so the routing bit R=I and the packet is again routed on the angled output link. Repeating this algorithm in the remaining node-stages results in the packet being routed to its desired output port. (Note: For the last stage in FIG. 5, the value of $h_0$ is assumed to be 0, and the "straight" output link is the top output while the "angled" output link is the bottom output). In FIGS. 27-36, the bits of a packet received on input A are designated by A1... A($\log_2[N/n]$)... and the bits of a packet received on input B are designated by B1... B($\log_2[N/n]$) ... . The bits of the node number are designated by h1...h($\log_2[N/n]$).

Transferring a Packet to the Chute-Multiplexing Sub-Network

Within Canyan distribution network 23, a node determines when a packet should be transferred from the switching sub-network to the chute-multiplexing sub-network by examining the most-significant $\log_2(N/n)$ bits of the destination address. If these bits match the binary address of the output packet module (00,01,10 or 11) to which the node is connected, then they will also match the most-significant $\log_2(N/n)$ bits of the node address, and the node will transfer the packet to an available chute within the chute-multiplexing sub-network (if an available chute exists). This is shown in the Canyan distribution network 23 of FIG. 6, where N=16 and n=4. The two most-significant bits of the packet destination address ($\rho_3,\rho_2,\rho_1,\rho_0=0101$) match the two most-significant bits of node 011 (node 3) when the packet passes through node-stage 2, and they also match the binary address of the desired output packet module (module 01) to which that node is connected.

Contention Resolution: Packet Blocking, and Packet Deflection

In a growable packet switch arrangement with a Canyan distribution network, there are several reasons why a packet may be kept from propagating along its desired path. These reasons can be classified into two categories: packet deflection and packet blocking. Packet deflection and packet blocking are different, because a deflected packet is merely re-routed along a sub-optimal path, but it still has a chance of being routed to its desired output port. However, a packet that has been blocked has no way to reach its desired output within the current packet slot.

Packet deflection will occur within the switching sub-network for two reasons. First, if two packets arrive at a node and attempt to use the same link emanating from that node, then only one packet can be routed on the desired link, and the other packet is deflected and re-routed on the second unused link. Packet deflection can occur in a second way if a packet arrives at a node connected to its desired output packet module and finds that all of the 2m/n output chutes for that node are already occupied by other packets. Since the packet cannot be transferred to the chute-multiplexing network within that node, it must be deflected and re-routed out on the Banyan links to try to find vacant output chutes within another node in a later node-stage.

Packet blocking can occur within the switching sub-network in several different ways. First, if all of the m chutes connected to the desired output packet module are already occupied by other packets, then a packet attempting to reach that output packet module is blocked. This can happen if the desired output packet module is a "hot-spot" whose outputs have many packets destined for them. Packet blocking can also occur if a packet is deflected so many times that it is not able to locate a node with an idle output chute before reaching the last node-stage in the switching sub-network. This second type of packet blocking can occur even if some of the output chutes attached to the desired output packet module are idle. A third type of packet blocking can occur if a packet is routed to an idle output chute, but the FIFO queue attached to that output chute is full. This last type of packet blocking is not analyzed herein because queueing theory models can be used to determine queue lengths that minimize buffer overflows and yield sufficiently low packet loss probabilities. Infinite-length FIFO queues are assumed herein, so the third type of packet blocking does not occur.

The hardware within a node cannot solve the problem of packet blocking, but it can implement a contention resolution algorithm to determine which packet receives priority when two packets are destined for the same output link or when a packet tries to enter a set of occupied output chutes. When packet contention arises and the contention resolution algorithm is used, one of the packets is deflected onto a sub-optimal path within the switching sub-network.

In a Canyan network, there are two basic types of link-stages created by the partitions of the output packet modules (global link-stages and local link-stages), and different contention resolution algorithms are applied to these different types of link-stages. In general, a global link-stage provides connections between nodes that are connected (via output chutes) to different output packet modules, while a local link-stage provides connections between nodes that are connected (via output chutes) to the same output packet module. If the connection variable (V) for a particular link-stage is greater than $\log_2(n)-1$, then the link-stage provides global connections. If the connection variable (V) for a particular link-stage is less than or equal to $\log_2(n)-1$, then the link-stage provides local connections. Thus, in the network of FIG. 6, all of the link-stages with V>1 provide global connections, while the linkstages with V<1 provide local connections.

For convenience, a global node-stage is defined as a node-stage that precedes a global link-stage, and a local node-stage is defined as a node-stage that precedes a local link-stage. FIGS. 8-11 comprise a flow-chart for the contention resolution algorithm (routing method) used by a node in a global node-stage, and FIGS. 12-15 comprise a flow-chart for the contention resolution algorithm (routing method) used by a node in a local node-stage. FIGS. 8-11 indicate that for global node-stages, input A (arriving from the straight link-stage connection) takes precedence over input B (arriving from the angled link-stage connection). This guarantees that a packet that has arrived at its desired output row but has been deflected by occupied output chutes will continue to propagate on the straight paths and stay in that output row until it arrives at the local link-stages. In the local link-stages, the deflected packet is transferred to another output row associated with its desired output packet module, where an idle output chute in that row is located (if there is one). FIGS. 12-15 indicate that for local node-stages, input A also takes precedence over input B. If either packet is deflected due to occupied output chutes, it is always routed on the angled link-stage connection to permit it to search for an idle output chute in another output row.

Since different contention resolution algorithms are used in local and global node-stages, the path hunt logic for nodes in local node-stages is different than the path hunt logic for nodes in global node-stages. Both sets of logic can be combined if another signal (identifying the type of node-stage) is supplied to each node, but this results in more complicated node logic. It is assumed herein that two different device array designs are used to provide different path hunt logic for the two types of node-stages.

Performance Analysis of the Canyan Distribution Network

Because the structure of the Canyan distribution network is architecturally different from most of the other networks that have been proposed for use within a packet-switched environment, its operational characteristics are determined. Three different performance metrics are calculated: the network delay, the network throughput, and the packet loss probability.

Network Delay

The delay that a packet encounters as it passes through the Canyan distribution network is dependent on the node-stage in which the packet is transferred from the switching sub-network to the chute-multiplexing sub-network. While in the switching sub-network, the packet encounters $\log_2(N/n)+4$ bit periods of delay within each node-stage. Once it is transferred to the chute-multiplexing sub-network, the packet encounters one bit period of delay within each node-stage. Thus, if a particular Canyan network design requires S node-stages, then the minimum delay within the network is given by $\log 2(N/n)+4+(S-1)$ bit periods, while the maximum delay is given by $(S-1)[\log_2(N/n)+4]+1$ bit periods. These differences in delays require $(S-2)[\log_2(N/n)+3]$-bit guard-band intervals to be inserted between adjacent packet slots, which requires a slight speed-up of the data rates within the distribution network. Differences between different packets propagating within the network in a given packet slot can then be equalized at the FIFO queues.

Network Throughput and Packet Loss Probability

The number of node-stages (S) required for a particular application is typically determined by the network throughput and the required packet loss probability. Two different analyses were used to study these network characteristics within the Canyan distribution network: a computer simulation and an analytical model based on a Markov chain.

The analytical model was based on an approach in which the packet load in node-stage i is determined using the packet load in node-stage i−1. Thus, if the packet load entering the switch at node-stage 0 is known, then the packet load at any node-stage within the switch can be subsequently calculated.

Several assumptions have been made to simplify the Markov analysis. First, the Canyan distribution network is assumed to support L inputs and (Nm/n) outputs, and each of the (N/n) output packet modules is assumed to support m inputs and n outputs. Thus, the chute-multiplexing portion of each switching node has $C=(2m/n)$ output chutes. The packets arriving at the network inputs are assumed to be synchronous, and the arriving packets are assumed to be random and independent. The destinations for the packets are also assumed to be uniformly distributed over all N of the output ports emanating from the output packet modules.

Figure 16:
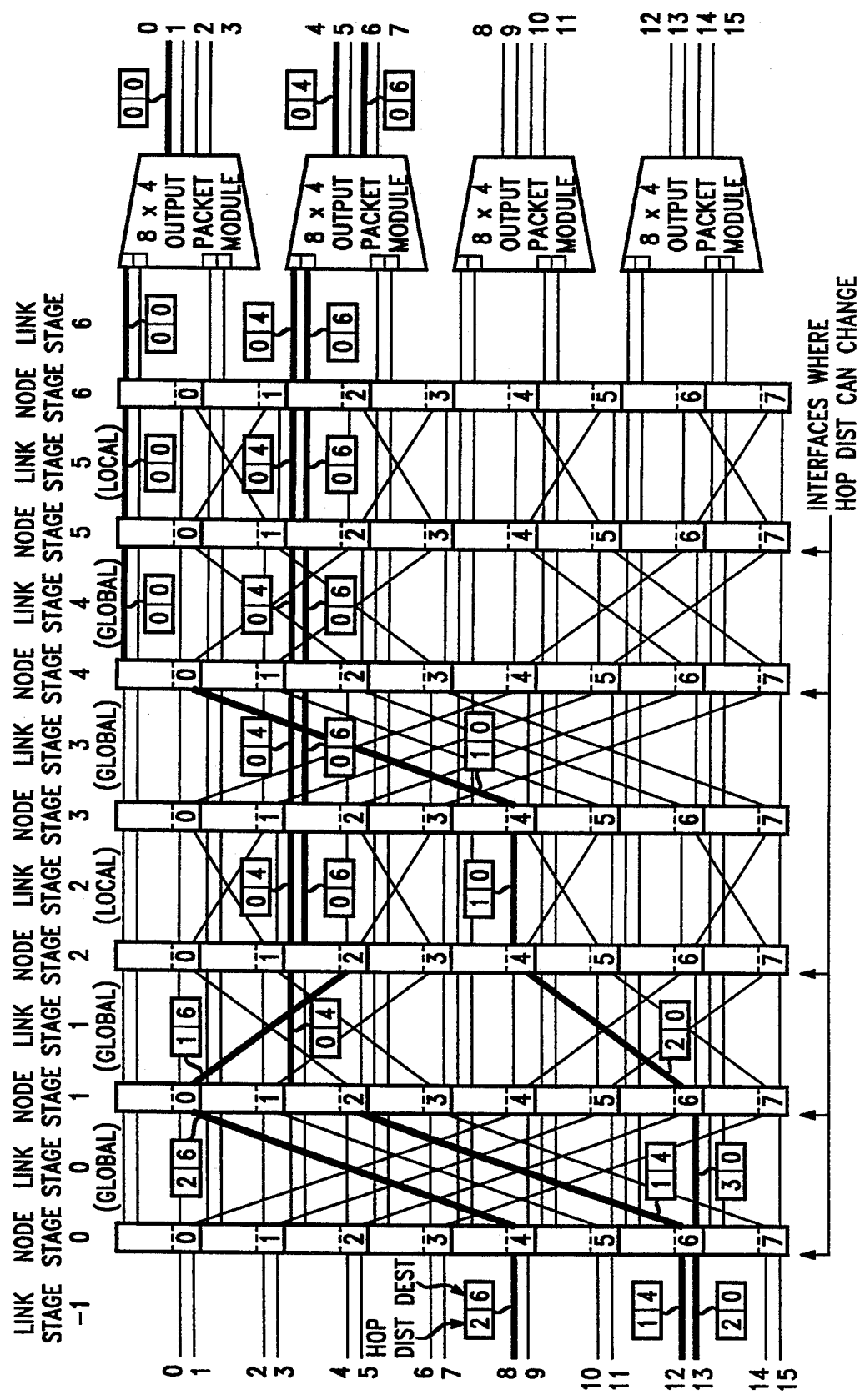
FIG. 16 is a diagram of the network of FIG. 6 illustrating parameters used in modeling network performance.

For any packet within node-stage i of the Canyan distribution network, a feature known as the hop distance D is defined to be the number of global link-stages through which a packet must pass before it arrives in a node-stage where it could be transferred to one of its desired output chutes. The hop distance D for a packet passing through the Canyan distribution network will remain unchanged from the input of node-stage i to the output of link-stage i. Thus, the hop distance D is assumed to change at the interface between link-stage i and node-stage i+1. For a packet entering node-stage 0 of a Canyan network, the hop distance D is given by some value between 0 and $X=\log_2(N/n)-1$. Whenever a packet is routed along one of its desired global link-stage connections, its hop distance is decreased by one as it passes through the interface between the link-stage and the next node-stage. If deflected in a global link-stage, the hop distance is always reset to $D=X+1=\log_2(N/n)+1$. Whenever a packet's hop distance reaches zero, it can be transferred to an idle output chute (if one exists). If an idle output chute does not exist, then the packet's hop distance is set to $D=1$ (indicating that its hop distance is actually zero, but it has been deflected by occupied output chutes and has no chance of being transferred to an output chute until it changes rows in a local link-stage). Thus, it is not possible to have a hop distance of zero in a global link-stage. When a packet with a hop distance of $D=-1$ moves into a local node-stage, its hop distance can be changed back to zero if it is sent out on the angled link. For all hop distances greater than zero, the hop distance for a particular packet is never changed when the packet has passed through a local link-stage. Thus, for packets in any link-stage of the Canyan network, the possible hop distance values will always fall in the range from $-1$ to $X+1=\log_2(N/n)+1$. The hop distances for several packets propagating through the stages of a Canyan distribution network are illustrated in FIG. 16. The hop distance of a packet is merely a logical feature that is useful in the Markov performance analysis. The actual node hardware of FIG. 7 does not explicitly use the hop distance to determine the required path for the propagating packets, and the hop distance is never explicitly carried within the header field of the packets. Thus, the hop distances shown in the packet headers of FIG. 16 are merely logical values that can always be determined from a knowledge of the packet's destination address and the node number and the connection variable for the node in which the packet resides.

For the analysis of the throughput and packet loss probabilities, the offered load to the network (the average fraction of input ports with active packets during a given packet slot) is defined as $\rho_L$, where $0 < \rho_L \leq 1$. $Y(D,i)$ represents the state that a packet is in when it is in a link in link-stage i with a hop distance of $D(-1 \leq D \leq X+1=\log_2(N/n)+1)$; $Z(R,i)$ represents the state that a packet is in when it is in output chute R in link-stage i ($0 < R \leq C-1 = (2m/n)-1$). Thus, there are $X+C+2=\log_2(N/n)+(2m/n)+2$ different states in which a packet can exist in a particular link-stage. $P[Y(D,i)]$ represents the probability that packets are in a link in link-stage i with a hop distance of D, and $P[Z(R,i)]$ represents the probability that packets are in a chute in link-stage i and that the chute has the chute number R. From the definitions above, it follows that the following relation is satisfied for every stage i within the Canyan network:

$$\rho_L = \sum_{D=-1}^{X+1} P[Y(D, i)] + \sum_{R=0}^{C-1} P[Z(R, i)] \quad [4]$$

In addition, in any stage i, the percentage of all L possible input packets that have been routed to one of their desired output chutes (the network throughput or carried load) is given by:

$$\text{throughput} = \sum_{R=0}^{C-1} P[Z(R, i)] \quad [5]$$

and the percentage of all L possible input packets that have not yet been routed to one of their desired output chutes is given by 1-(throughput). Thus, if a Canyan distribution network is designed with exactly S node-stages, then the packet loss probability for the distribution network is given by:

$$P[\text{packet loss}] = \left(1 - \sum_{R=0}^{C-1} P[Z(R, S)]\right) / \rho_L \quad [6]$$

Initial conditions for the Markov analysis can be determined by examining the packets before they actually enter the Canyan network. It can be shown that for a packet entering the first node-stage of a Canyan network (which is therefore in link-stage $-1$), the probability that the packet has a hop distance of D ($-1 \leq D \leq X+1=\log_2(N/n)+1$) is given by:

$$P[Y(-1,-1)]=0, \text{ for } D=-1 \quad [7]$$

$$P[Y(0,-1)]=n/N, \text{ for } D=0$$

$$P[Y(D,-1)]=2^{D-1}n/N, \text{ for } 1 \leq D \leq X=\log_2(N/n)$$

$$P[Y(X+1,-1)]=0, \text{ for } D=X+1=\log_2(N/n)+1$$

In addition, the chutes are initially empty in link-stage $-1$, so it follows that:

$$P[Z(R,-1)]=0, \text{ for } 0 \leq R \leq C-1=(2m/n)-1 \quad [8]$$

For the Markov chain model, a packet in a particular state in link-stage i-1 will always transition to one of the $X+C+2=\log_2(N/n)+(2m/n)+2$ states in link-stage i. We must therefore define the transition probabilities (or conditional probabilities) that take a packet from one state in link-stage i−1 to another state in link-stage i. For example, the transition probability $P[Y(3,i)/Y(4,i-1)]$ defines the transition probability that a packet in link-stage i−1 with a hop distance of D=4 will eventually have a hop distance of D=3 when it passes through link-stage i. Stated another way, $P[Y(3,i)/Y(4,i-1)]$ gives the probability that a packet will have a hop distance of D=3 in link-stage i given that the packet had a hop distance of D=4 in link-stage i−1. Based on the definition of the transition probabilities, the following relation must be satisfied for any state $Y(E,i-1)$ in link-stage i−1:

$$\sum_{D=-1}^{X+1} P[Y(D, i)/Y(E, i-1)] + \sum_{R=0}^{C-1} P[Z(R, i)/Y(E, i-1)] = 1.0 \quad [9]$$

where E is the hop distance ranging from $-1$ to $X+1=\log_2(N/n)+1$. The following relation must be satisfied for any state $Z(F,i-1)$ in link-stage i−1:

$$\sum_{D=-1}^{X+1} P[Y(D, i)/Z(F, i-1)] + \sum_{R=0}^{C-1} P[Z(R, i)/Z(F, i-1)] = 1.0 \quad [10]$$

where F is the chute number ranging from 0 to $C-1=(2m/n)-1$. Eq. 7 and Eq. 8 merely state that a packet in a particular state in link-stage i−1 must transition (with probability 1.0) to one of the states in link-stage i.

Once all of the transition probabilities have been determined, the probability of being in a particular state in link-stage i is determined from the probabilities of being in each of the possible states in link-stage i−1 and from the associated transition probabilities. In particular, the probability of being in state $Y(E,i)$ in link-stage i is calculated using the theorem of total probability:

$$P[Y(E, i)] = \sum_{D=-1}^{X+1} P[Y(D, i-1)]P[Y(E, i)/Y(D, i-1)] + \sum_{R=0}^{C-1} P[Z(R, i-1)]P[Y(E, i)/Z(R, i-1)] \quad [11]$$

The probability of being in state $Z(F,i)$ in link-stage i is also calculated using the theorem of total probability:

$$P[Z(F, i)] = \sum_{D=-1}^{X+1} P[Y(D, i-1)]P[Z(F, i)/Y(D, i-1)] + \quad [12]$$

-continued $$\sum_{R=0}^{C-1} P[(Z(R, i-1)]P[Z(F, i)/Z(R, i-1)]$$

The transition probabilities describe an event that occurs at the interface between link-stage i−1 and node-stage i (as shown in FIG. 16). The values for these transition probabilities are very dependent on the type of link-stages (global or local) that precede and follow node-stage i. In addition, another set of transition probabilities is defined for the first node-stage which is preceded by the network inputs. Thus, there are five different types of node-stages for which transition probabilities are defined: node-stages preceded by network inputs and followed by a global link-stage (input-global node-stages); node-stages preceded by a global link-stage and followed by a global link-stage (global-global node-stages); node-stages preceded by a global link-stage and followed by a local link-stage (global-local node-stages); node-stages preceded by a local link-stage and followed by a local link-stage (local-local node-stages); and node-stages preceded by a local link-stage and followed by a global link-stage (local-global node-stages).

To simplify the Markov analysis, another useful packet state known as $Z_{tot}(i)$ is defined for link-stage i as the union of all of the different states in which a packet is in an output chute. Thus, it follows that the probability of being in state $Z_{tot}(i)$ is given by:

$$P[Z_{tot}(i)] = \sum_{R=0}^{C-1} P[Z(R, i)] \quad [13]$$

Once $P[Z_{tot}(i)]$ has been determined (using the transition probabilities below), the values for $P[Z(R,i)]$ can then be determined for each value of R ($0 \leq R \leq C-1$). To do this, it is assumed that the chutes are filled in ascending order, so the first packet sent into the chutes in a particular row goes into chute R=0, and the second packet goes into chute R=1, etc. Given this assumption, it can be shown that:

$$P[Z(0, i)] = P[Z(0, i-1)] + P[Z_{tot}(i)]\{1 - P[Z(0, i-1)]\}, \quad [14]$$

for R = 0, $$P[Z(R, i)] = P[Z(R, i-1)] +$$

$$P[Z_{tot}(i)] \prod_{k=0}^{R-1} P[Z(k, i-1)]\{1 - P[Z(R, i-1)]\},$$

for $0 \leq R \leq C - 2$, $$P[Z(C-1, i)] = P[Z(C-1, i-1)] +$$

$$P[Z_{tot}(i)] \prod_{k=0}^{C-2} P[Z(k, i-1)],$$

for R = C − 1.

These formulae indicate that the increase in the probability of chute R being occupied by a packet is directly proportional to 1) the probability that packets are being routed to the chutes ($P[Z_{tot}(i)]$), 2) the probability that all of the chutes with values less than R are occupied $$\left( \prod_{k=0}^{R-1} P[Z(k, i-1)] \right),$$

and 3) the probability that chute R is idle ($1-P[Z(R,i-1)]$). The third term is not needed for the last chute, because the transition probabilities described below do not increase the value of $P[Z_{tot}(i)]$ if the last chute is already occupied.

Given the background information described above, formulae are developed for all of the transition probabilities within the Canyan distribution network. The non-zero transition probabilities for each of the five aforementioned node-stage types are described in detail below.

Input-Global Node-Stages.

There are four non-zero transition probabilities that exist for input-global

P[Y(D,0)Y(D,−1)], for $1 \leq D \leq X$ in Input-Global Node-Stages.

Assume packet #1 arrives at a node in node-stage O with $1 \leq D \leq X$. Its hop distance remains unaltered if any one of the following conditions is true:

1. Packet #1 is the only packet entering the node:

$$\text{probability} = 1 - \sum_{k=0}^{X+1} P[Y(D, -1)].$$

2. Packet #1 enters the node with packet #2, packet #2 has a hop distance $D \geq 1$, and no contention occurs for an output link:

$$\text{probability} = (0.5) \sum_{k=1}^{X+1} P[Y(k, -1)].$$

3. Packet #1 enters the node with packet #2, packet #2 has a hop distance $D \geq 1$, contention occurs for an output link, and packet #1 wins:

$$\text{probability} = (0.5)(0.5) \sum_{k=1}^{X+1} P[Y(k, -1)].$$

4. Packet #1 enters the node with packet #2, packet #2 has a hop distance D=0 (so packet #2 is transferred to an output chute and packet #1 is routed to its desired output link):

probability=$P[Y(0,-1)]$.

Since these four conditions are mutually exclusive, the total transition probability is merely given by the sum of the four probabilities described above.

P[Y(X+1,0)/Y(D,−1)], for $1 \leq D \leq X$ in Input-Global Node-Stages.

Assume packet #1 arrives at a node in node-stage 0 with $1 \leq D \leq X$. It is deflected and its hop distance is reset to X+1 if the following condition is true:

1. Packet #1 enters the node with packet #2, packet #2 has a hop distance $D \geq 1$, contention occurs for an output link, and packet #1 loses:

$$\text{probability} = (0.5)(0.5) \sum_{k=1}^{X+1} P[Y(k, -1)].$$

$P[Z_{tot}(0)/Y(0,-1)]$, for D=0 in Input Global Node-Stages.

Assume packet #1 arrives at a node in node-stage 0 with D=0. It is transferred to an output chute if the following condition is true:
1. Packet #1 is the only packet entering the node:

$$\text{probability} = 1 - \sum_{k=0}^{X+1} P[Y(k, -1)].$$

2. Packet #1 enters the node with packet #2, packet #2 has a hop distance D≧1, so packet #2 is routed to its desired output link and packet #1 is transferred to an output chute:

$$\text{probability} = \sum_{k=1}^{X+1} P[Y(k, -1)].$$

3. Packet #1 enters the node with packet #2, packet #2 has a hop distance D=0, contention occurs for an output chute, and packet #1 wins:

$$\text{probability} = (0.5)P[Y(0,-1)].$$

The total transition probability is given by the sum of these three probabilities.

$P[Y(-1,0)/Y(0-1)]$, for D=0 in Input-Global Node-Stages.

Assume packet #1 arrives at a node in node-stage 0 with D=0. It is deflected and its hop distance is reset to X+1 if the following condition is true:
1. Packet #1 enters the node with packet #2, packet #2 has a hop distance D=0, contention occurs for an output chute, and packet #1 loses:

$$\text{probability} = (0.5)P[Y(0,-1)]$$

Global-Global Node-Stages.

There are eight non-zero transition probabilities that exist for global-global node-stages.

$P[Y(D-1,i)/Y(D,i-1)]$, for 3≦D≦X+1 in Global-Global Node-Stages.

Assume packet #1 arrives at a node in node-stage i with 3≦D≦X+1. Its hop distance is then decremented by one if any one of the following conditions is true:
1. Packet #1 is the only packet entering the node:

$$\text{probability} = 1 - P[Y(-1, i-1)] - \sum_{k=1}^{X+1} P[Y(k, i-1)].$$

2. Packet #1 enters the node with packet #2, packet #2 has a hop distance D>2, and no contention occurs for an output link:

$$\text{probability} = (0.5) \sum_{k=2}^{X+1} P[Y(k, i-1)].$$

3. Packet #1 enters the node with packet #2, packet #2 has a hop distance D≧2, contention occurs for an output link, and packet #1 wins:

$$\text{probability} = (0.5)(0.5) \sum_{k=2}^{X+1} P[Y(k, i-1)].$$

4. Packet #1 enters the node with packet #2, packet #2 has a hop distance D=1, packet #2 is deflected to the straight link because all of the output chutes (including chute C−1) are already occupied, and packet #1 wanted to use the cross link:

$$\text{probability} = (0.5)P[Y(1,i-1)]P[Z(C-1,i-1)].$$

5. Packet #1 enters the node with packet #2, packet #2 has a hop distance D=1, and packet #2 is transferred to the output chutes because there is an idle one available, so packet #1 can be routed to its desired output link:

$$\text{probability} = P[Y(1,i-1)][1 - P[Z(C-1,i-1)]].$$

6. Packet #1 enters the node with packet #2, packet #2 has a hop distance D=−1, (indicating it has been deflected and will continue out on the straight link), and packet #1 wanted to use the cross link:

$$\text{probability} = (0.5)P[Y(-1,i-1)]$$

The total transition probability is given by the sum of the six probabilities described above.

$P[Y(X+1,i)/Y(D,i-1)]$, for 3≧D≧X+1 in Global-Global Node-Stages.

Assume packet #1 arrives at a node in node-stage i with 3<D<X+1. It is deflected and its hop distance is reset to X+1 if the any one of the following conditions is true:
1. Packet #1 enters the node with packet #2, packet #2 has a hop distance D≧2, contention occurs for an output link, and packet #1 loses:

$$\text{probability} = (0.5)(0.5) \sum_{k=2}^{X+1} P[Y(k, i-1)].$$

2. Packet #1 enters the node with packet #2, packet #2 has a hop distance D=1, packet #2 is deflected to the straight link because all of the output chutes (including chute C−1) are already occupied, and packet #1 wanted to use the straight link:

$$\text{probability} = (0.5)P[Y(1,I-1)]P[Z(C-1,i-1)].$$

3. Packet #1 enters the node with packet #2, packet #2 has a hop distance D=−1, (indicating it has been deflected and will continue out on the straight link), and packet #1 wanted to use the straight link:

$$\text{probability} = (0.5)P[Y(-1,i-1)]$$

The total transition probability is given by the sum of the three probabilities described above.

$P[Y(1,i)/Y(2,i-1)]$, for D=2 in Global-Global Node-Stages.

Assume packet #1 arrives at a node in node-stage i with D=2. Its hop distance is then decremented to D=1 and it is routed out on its desired cross link if any one of the following conditions is true:

1. Packet #1 is the only packet entering the node:

$$\text{probability} = 1 - P[Y(-1, i-1)] - \sum_{k=1}^{X+1} P[Y(k, i-1)].$$

2. Packet #1 enters the node with packet #2, packet #2 has a hop distance $D \geq 3$, and no contention occurs for an output link (indicating packet #2 wanted the straight link):

$$\text{probability} = (0.5) \sum_{k=3}^{X+1} P[Y(k, i-1)].$$

3. Packet #1 enters the node with packet #2, packet #2 has a hop distance $D \geq 3$, contention occurs for the cross link, and packet #1 wins:

$$\text{probability} = (0.5)(0.5) \sum_{k=3}^{X+1} P[Y(k, i-1)].$$

4. Packet #1 enters the node with packet #2, packet #2 has a hop distance $D=2$ (indicating packet #2 is also destined for the cross link), contention always occurs, and packet #1 wins:

$$\text{probability} = (0.5)P[Y(2,i-1)].$$

5. Packet #1 enters the node with packet #2, packet #2 has a hop distance $D=1$, packet #2 is deflected to the straight link because all of the output chutes (including chute $C-1$) are already occupied, so packet #1 can use its desired cross link:

$$\text{probability} = P[Y(1,i-1)]P[Z(C-1,i-1)].$$

6. Packet #1 enters the node with packet #2, packet #2 has a hop distance $D=1$, and packet #2 is transferred to the output chutes because there is an idle one available, so packet #1 can be routed to its desired cross link:

$$\text{probability} = P[Y(1,i-1)][1-P[Z(C-1,i-1)]].$$

7. Packet #1 enters the node with packet #2, packet #2 has a hop distance $D=-1$, (indicating it has been deflected and will continue out on the straight link), so packet #1 can be routed to its desired cross link:

$$\text{probability} = P[Y(-1,i-1)]$$

The total transition probability is given by the sum of these seven probabilities.

$P[Y(X+1,i)/Y(2,i-1)]$, for $D=2$ in Global-Global Node-Stages.

Assume packet #1 arrives at a node in node-stage i with $D=2$. It is deflected and its hop distance is reset to $X+1$ if any one of the following conditions is true:

1. Packet #1 enters the node with packet #2, packet #2 has a hop distance $D \geq 3$, contention occurs for the cross link, and packet #1 loses:

$$\text{probability} = (0.5)(0.5) \sum_{k=3}^{X+1} P[Y(k, i-1)].$$

2. Packet #1 enters the node with packet #2, packet #2 has a hop distance $D=2$ (indicating packet #2 is also destined for the cross link), contention always occurs, and packet #1 loses:

$$\text{probability} = (0.5)P[Y(2,i-1)]$$

The total transition probability is given by the sum of these two probabilities.

$P[Y(-1,i)/Y(1,i-1)]$, for $D=1$ in Global-Global Node-Stages.

Assume packet #1 arrives at a node in node-stage i with $D=1$. (Note: It is not possible for two packets to arrive at a node with $D=1$ for both packets, because both packets would have to arrive on the cross path). It is deflected to the straight path and its hop distance is set to $-1$ if any one of the following conditions is true:

1. Packet #1 is the only packet entering the node, and packet #1 is deflected to the straight link because all of the output chutes (including chute $C-1$) are already occupied:

$$\text{probability} = \left\{ 1 - P[Y(-1, i-1)]/P[Z(C-1, i-1)] - \right.$$

$$\left. P[Y(0, i-1)] - \sum_{k=2}^{X+1} P[Y(k, i-1)] \right\} P[Z(C-1, i-1)].$$

2. Packet #1 enters the node with packet #2, packet #2 has a hop distance $D \geq 0$, and packet #1 is deflected to the straight link because all of the output chutes (including chute $C-1$) are already occupied:

probability =

$$\left\{ P[Y(0, i-1)] + \sum_{k=2}^{X+1} P[Y(k, i-1)] \right\} P[Z(C-1, i-1)].$$

The total transition probability is given by the sum of these two probabilities.

$P[Y(X+1,i)/Y(1,i-1)]$, for $D=1$ in Global-Global Node-Stages.

Assume packet #1 arrives at a node in node-stage i with $D=1$. It is deflected and its hop distance is reset to $X+1$ if the following condition is true:

1. Packet #1 enters the node with packet #2, packet #2 has a hop distance $D=-1$, (indicating it has been deflected and will continue out on the straight link), so packet #1 is deflected to the cross link because all of the output chutes (including chute $C-1$) are obviously already occupied:

$$\text{probability} = P[Y(-1,i-1)]$$

$P[Z_{tot}(0)/Y(1,i-1)]$, for $D=1$ in Global-Global Node-Stages.

Assume packet #1 arrives at a node in node-stage i with $D=1$. It is transferred to an output chute if any one of the following conditions is true:

1. Packet #1 is the only packet entering the node and packet #1 is transferred to the output chutes because there is an idle one available (Note: It is not possible for there to be an idle output chute in a node and for a packet to arrive at that node with $D=-1$):

$$\text{probability} = \left\{ 1 - P[Y(0, i-1)] - \sum_{k=2}^{X+1} P[Y(k, i-1)] \right\} \{1 - P[Z(C-1, i-1)]\}.$$

2. Packet #1 enters the node with packet #2, packet #2 has a hop distance $D \geq 0$, so packet #2 is routed to its desired output link and packet #1 is transferred to an idle output chute:

$$\text{probability} = \left\{ P[Y(0, i-1)] + \sum_{k=2}^{X+1} P[Y(k, i-1)] \right\} \{1 - P[Z(C-1, i-1)]\}.$$

The total transition probability is given by the sum of these two probabilities.

$P[Y(-1,i)/Y(-1,i-1)]$, for $D=-1$ in Global-Global Node-Stages.

Assume packet #1 arrives at a node in node-stage i with $D=-1$ (indicating it arrives on the straight input link). It is passed through to the straight output link and its hop distance remains at $D=-1$ because the straight input always has priority:

probability = 1.

Global-Local Node-Stages.

There are five non-zero transition probabilities that exist for global-local node-stages.

$P[Y(D-1,i)/Y(D-1)]$, for $2 \leq D \leq X+1$ in Global-Local Node-Stages.

Assume packet #1 arrives at a node in node-stage i with $2 \leq D \leq X+1$. Its hop distance is then decremented by one because it doesn't matter which output link the packets are sent to in the local link-stage that follows:

probability = 1.

$P[Y(-1,i)/Y(1,i-1)]$, for $D=1$ in Global-Local Node-Stages.

Assume packet #1 arrives at a node in node-stage i with $D=1$. It is deflected to the straight path and its hop distance is set to $-1$ if the following condition is true:

1. Packet #1 enters the node with packet #2, packet #2 has a hop distance $D=-1$, (indicating it has been deflected and will continue out on the cross link within the local link-stage that follows), so packet #1 is deflected to the straight link because all of the output chutes (including chute $C-1$) are obviously already occupied:

probability = $P[Y(-1,i-1)]$ $P[Y(0,i)/Y(1,i-1)]$, for $D=1$ in Global-Local Node-Stages.

Assume packet #1 arrives at a node in node-stage i with $D=1$. It is deflected and its hop distance is reset to 0 (indicating that it is deflected by full chutes in node-stage i, but it has a chance of being transferred to an idle chute in node-stage i+1) if any one of the following conditions is true:

1. Packet #1 is the only packet entering the node, and packet #1 is deflected to the cross link because all of the output chutes (including chute $C-1$) are already occupied:

$$\text{probability} = \left\{ 1 - P[Y(-1, i-1)]/P[Z(C-1, i-1)] - P[Y(0, i-1)] - \sum_{k=2}^{X+1} P[Y(k, i-1)] \right\} P[Z(C-1, i-1)].$$

2. Packet #1 enters the node with packet #2, packet #2 has a hop distance $D \geq 0$ (it is not possible for packet #2 to have a hop distance of $D=0$ or $D=1$ in this node-stage) and packet #1 is deflected to the cross link because all of the output chutes (including chute $C-1$) are already occupied:

probability =

$$\left\{ P[Y(0, i-1)] + \sum_{k=2}^{X+1} P[Y(k, i-1)] \right\} P[Z(C-1, i-1)].$$

The total transition probability is given by the sum of these two probabilities.

$P[Z_{tot}(0)/Y(1,-1)]$, for $D=1$ in Global-Local Node-Stages.

Assume packet #1 arrives at a node in node-stage i with $D=1$. It is transferred to an output chute if any one of the following conditions is true:

1. Packet #1 is the only packet entering the node and packet #1 is transferred to the output chutes because there is an idle one available (Note: It is not possible for there to be an idle output chute in a node and for a packet to arrive at that node with $D=-1$, and it is also not possible for two packets to arrive at the same node with $D=1$):

$$\text{probability} = \left\{ 1 - P[Y(0, i-1)] - \sum_{k=2}^{X+1} P[Y(k, i-1)] \right\} \{1 - P[Z(C-1, i-1)]\}.$$

2. Packet #1 enters the node with packet #2, packet #2 has a hop distance $D \geq 0$, so packet #2 is routed to its desired output link and packet #1 is transferred to an idle output chute:

$$\text{probability} = \left\{ P[Y(0, i-1)] + \right.$$

$$\left. \sum_{k=2}^{X+1} P[Y(k, i-1)] \right\} \{1 - P[Z(C-1, i-1)]\}.$$

The total transition probability is given by the sum of these two probabilities.

P[Y(0,i)/Y(−1,i−1)], for D=−1 in Global-Local Node-Stages.

Assume packet #1 gives at a node in node-stage i with D=−1 (indicating it arrives on the straight input link). It is passed through to the cross output link and its hop distance is set to 0 if the following condition is true:
1. Always, because the straight input always has priority:

probability=1.

Local-Local Node-Stages.

There are five non-zero transition probabilities that exist for local-local node-stages.

P[Y(D,i)/Y(D,i−1)], for 1≦D≦X+1 in Local-Local Node-Stages.

Assume packet #1 arrives at a node in node-stage i with 1≦D≦X+1. Its hop distance remains unaltered because it doesn't matter which output link the packets are sent to in the local link-stage that follows: probability=1.

P[Y(−1,i)/Y(0,i−1)], for D=0 in Local-Local Node-Stages.

Assume packet #1 arrives at a node in node-stage i with D=0 (indicating that it arrives on the cross input link). It is deflected to the straight path and its hop distance is set to −1 if the following condition is true:
1. Packet #1 enters the node with packet #2, packet #2 has a hop distance D=−1, (indicating it has been deflected and will continue out on the cross link within the local link-stage that follows), so packet #1 is deflected to the straight link because all of the output chutes (including chute C−1) are obviously already occupied:

probability=P[Y(−1,i−1)]

P[Y(0,i)/Y(0,i−1)], for D=0 in Local-Local Node-Stages.

Assume packet #1 arrives at a node in node-stage i with D=0. It is deflected and its hop distance is reset to 0 (indicating that it is deflected by full chutes in node-stage i, but it has a chance of being transferred to an idle chute in node-stage i+1) if any one of the following conditions is true:
1. Packet #1 is the only packet entering the node, and packet #1 is deflected to the cross link because all of the output chutes (including chute C−1) are already occupied. (Note: It is not possible for two packets to arrive at a node with D=0):

$$\text{probability} = \left\{ 1 - P[Y(-1, i-1)]/P[Z(C-1, i-1)] - \right.$$

$$\left. \sum_{k=1}^{X+1} P[Y(k, i-1)] \right\} P[Z(C-1, i-1)].$$

2. Packet #1 enters the node with packet #2, packet #2 has a hop distance D≧0 (it is not possible for packet #2 to also have a hop distance of D=0 in this node-stage), and packet #1 is deflected to the cross link because all of the output chutes (including chute C−1) are already occupied:

$$\text{probability} = \sum_{k=1}^{X+1} P[Y(k, i-1)]P[Z(C-1, i-1)].$$

P[$Z_{tot}$(0)/Y(0,−1)], for D=0 in Local-Local Node-Stages.

Assume packet #1 arrives at a node in node-stage i with D=0. It is transferred to an output chute if any one of the following conditions is true:
1. Packet #1 is the only packet entering the node and packet #1 is transferred to the output chutes because there is an idle one available (Note: It is not possible for there to be an idle output chute in a node and for a packet to arrive at that node with D=−1, and it is also not possible for two packets to arrive at the same node with D=0):

probability =

$$\left\{ 1 - \sum_{k=1}^{X+1} P[Y(k, i-1)] \right\} \{1 - P[Z(C-1, i-1)]\}.$$

2. Packet #1 enters the node with packet #2, packet #2 has a hop distance D>0, so packet #2 is routed to its desired output link and packet #1 is transferred to an idle output chute:

$$\text{probability} = \left\{ \sum_{k=1}^{X+1} P[Y(k, i-1)] \right\} \{1 - P[Z(C-1, i-1)]\}.$$

The total transition probability is given by the sum of these two probabilities.

P[Y(0,i)/Y(−1,i−1)], for D=−1 in Local-Local Node-Stages.

Assume packet #1 arrives at a node in node-stage i with D=−1 (indicating it arrives on the straight input link). It is passed through to the cross output link and its hop distance is set to 0 because the straight input always has priority:

probability=1.

Local-Global Node-Stages.

There are eight non-zero transition probabilities that exist for local-global node-stages.

P[Y(D,i)/Y(D,i−1)] for 2≦D≦X+1 in Local-Global Node-Stages.

Assume packet #1 arrives at a node in node-stage i with 2≦D≦X+1. Its hop distance remains unaltered if any one of the following conditions is true:

1. Packet #1 is the only packet entering the node:

$$\text{probability} = 1 - \sum_{k=-1}^{X+1} P[Y(k, i-1)].$$

2. Packet #1 enters the node with packet #2, packet #2 has a hop distance $D \geq 1$, and no contention occurs for an output link:

$$\text{probability} = (0.5) \sum_{k=1}^{X+1} P[Y(k, i-1)].$$

3. Packet #1 enters the node with packet #2, packet #2 has a hop distance $D \geq 1$, contention occurs for an output link, and packet #1 wins:

$$\text{probability} = (0.5)(0.5) \sum_{k=1}^{X+1} P[Y(k, i-1)].$$

4. Packet #1 enters the node with packet #2, packet #2 has a hop distance $D=0$, packet #2 is deflected to the straight link because all of the output chutes (including chute $C-1$) are already occupied, and packet #1 wanted to use the cross link:

probability = $(0.5)P[Y(0,i-1)]P[Z(C-1,i-1)]$.

5. Packet #1 enters the node with packet #2, packet #2 has a hop distance $D=0$, and packet #2 is transferred to the output chutes because there is an idle one available, so packet #1 can be routed to its desired output link:

probability = $P[Y(0,i-1)][1-P[Z(C-1,i-1)]]$.

6. Packet #1 enters the node with packet #2, packet #2 has a hop distance $D=-1$, (indicating it has been deflected and will continue out on the straight link), and packet #1 wanted to use the cross link:

probability = $(0.5)P[Y(-1,i-1)]$

The total transition probability is given by the sum of the six probabilities described above.

$P[Y(X+1,i)/Y(D,i-1)]$, for $2 \leq D \leq X+1$ in Local-Global Node-Stages.

Assume packet #1 arrives at a node in node-stage i with $2 \leq D \leq X+1$. It is deflected and its hop distance is reset to $X+1$ if the any one of the following conditions is true:

1. Packet #1 enters the node with packet #2, packet #2 has a hop distance $D \geq 1$, contention occurs for an output link, and packet #1 loses:

$$\text{probability} = (0.5)(0.5) \sum_{k=1}^{X+1} P[Y(k, i-1)].$$

2. Packet #1 enters the node with packet #2, packet #2 has a hop distance $D=0$, packet #2 is deflected to the straight link because all of the output chutes (including chute $C-1$) are already occupied, and packet #1 wanted to use the straight link:

probability = $(0.5)P[Y(0,i-1)]P[Z(C-1,i-1)]$.

3. Packet #1 enters the node with packet #2, packet #2 has a hop distance $D=-1$, (indicating it has been deflected and will continue out on the straight link), and packet #1 wanted to use the straight link:

probability = $(0.5)P[Y(-1,i-1)]$

The total transition probability is given by the sum of the three probabilities described above.

$P[Y(1,i)/Y(1,i-1)]$, for $D=1$ in Local-Global Node-Stages.

Assume packet #1 arrives at a node in node-stage i with $D=1$. Its hop distance remains at $D=1$ and it is routed out on its desired cross link if any one of the following conditions is true:

1. Packet #1 is the only packet entering the node:

$$\text{probability} = 1 - \sum_{k=-1}^{X+1} P[Y(k, -1)].$$

2. Packet #1 enters the node with packet #2, packet #2 has a hop distance $D \geq 2$, and no contention occurs for an output link (indicating packet #2 wanted the straight link):

$$\text{probability} = (0.5) \sum_{k=2}^{X+1} P[Y(k, i-1)].$$

3. Packet #1 enters the node with packet #2, packet #2 has a hop distance $D \geq 2$, contention occurs for the cross link, and packet #1 wins:

$$\text{probability} = (0.5)(0.5) \sum_{k=2}^{X+1} P[Y(k, i-1)].$$

4. Packet #1 enters the node with packet #2, packet #2 has a hop distance $D=1$ (indicating packet #2 is also destined for the cross link), contention always occurs, and packet #1 wins:

probability = $(0.5)P[Y(1,i-1)]$

5. Packet #1 enters the node with packet #2, packet #2 has a hop distance $D=0$, packet #2 is deflected to the straight link because all of the output chutes (including chute $C-1$) are already occupied, so packet #1 can use its desired cross link:

probability = $P[Y(0,i-1)]P[Z(C-1,i-1)]$.

6. Packet #1 enters the node with packet #2, packet #2 has a hop distance $D=0$, and packet #2 is transferred to the output chutes because there is an idle one available, so packet #1 can be routed to its desired cross link:

probability = $P[Y(0,i-1)][1-P[Z(C-1,i-1)]]$.

7. Packet #1 enters the node with packet #2, packet #2 has a hop distance $D=-1$, (indicating it has been deflected and will continue out on the straight link), so packet #1 can be routed to its desired cross link:

probability = $P[Y(-1,i-1)]$

The total transition probability is given by the sum of these seven probabilities.

$P[Y(X+1,i)/Y(1,i-1)]$, for $D=1$ in Local-Global Node-Stages.

Assume packet #1 arrives at a node in node-stage i with $D=1$. It is deflected and its hop distance is reset to $X+1$ if any one of the following conditions is true:

1. Packet #1 enters the node with packet #2, packet #2 has a hop distance $D \geq 2$, contention occurs for the cross link, and packet #1 loses:

$$\text{probability} = (0.5)(0.5) \sum_{k=2}^{X+1} P[Y(k, i-1)].$$

2. Packet #1 enters the node with packet #2, packet #2 has a hop distance $D=1$ (indicating packet #2 is also destined for the cross link), contention always occurs, and packet #1 loses:

$$\text{probability} = (0.5)P[Y(1,i-1)]$$

The total transition probability is given by the sum of these two probabilities.

$P[Y(-1,i)/Y(0,i-1)]$, for $D=0$ in Local-Global Node-Stages.

Assume packet #1 arrives at a node in node-stage i with $D=0$. (Note: It is not possible for two packets to arrive at a node with $D=0$ for both packets, because both packets would have to arrive on the cross path). It is deflected to the straight path and its hop distance is set to $-1$ if any one of the following conditions is true:

1. Packet #1 is the only packet entering the node, and packet #1 is deflected to the straight link because all of the output chutes (including chute $C-1$) are already occupied:

$$\text{probability} = \left\{ 1 - P[Y(-1, i-1)]/P[Z(C-1, i-1)] - \sum_{k=1}^{X+1} P[Y(k, i-1)] \right\} P[Z(C-1, i-1)].$$

2. Packet #1 enters the node with packet #2, packet #2 has a hop distance $D \geq 1$, and packet #1 is deflected to the straight link because all of the output chutes (including chute $C-1$) are already occupied:

$$\text{probability} = \left( \sum_{k=1}^{X+1} P[Y(k, i-1)] \right) P[Z(C-1, i-1)].$$

The total transition probability is given by the sum of these two probabilities.

$P[Y(X+1,i)/Y(0,i-1)]$ for $D=0$ in Local-Global Node-Stages.

Assume packet #1 arrives at a node in node-stage i with $D=0$. It is deflected and its hop distance is reset to $X+1$ if the following condition is true:

1. Packet #1 enters the node with packet #2, packet #2 has a hop distance $D=-1$, (indicating it has been deflected and will continue out on the straight link), so packet #1 is deflected to the cross link because all of the output chutes (including chute $C-1$) are obviously already occupied:

$$\text{probability} = P[Y(-1,i-1)]$$

$P[Z_{tot}(0)/Y(0,i-1)]$, for $D=0$ in Local-Global Node-Stages.

Assume packet #1 arrives at a node in node-stage i with $D=0$. It is transferred to an output chute if any one of the following conditions is true:

1. Packet #1 is the only packet entering the node, and packet #1 is transferred to the output chutes because there is an idle one available. (Note: It is not possible for there to be an idle output chute in a node and for a packet to arrive at that node with $D=-1$, and it is not possible for two packets to arrive with $D=0$):

$$\text{probability} = \left\{ 1 - \sum_{k=1}^{X+1} P[Y(k, i-1)] \right\} \{1 - P[Z(C-1, i-1)]\}.$$

2. Packet #1 enters the node with packet #2, packet #2 has a hop distance $D>1$, so packet #2 is routed to its desired output link and packet #1 is transferred to an idle output chute:

$$\text{probability} = \left\{ \sum_{k=1}^{X+1} P[Y(k, i-1)] \right\} \{1 - P[Z(C-1, i-1)]\}.$$

The total transition probability is given by the sum of these two probabilities.

$P[Y(-1,i)/Y(-1,i-1)]$, for $D=-1$ in Local-Global Node-Stages.

Assume packet #1 arrives at a node in node-stage i with $D=-1$ (indicating it arrives on the straight input link). It is passed through to the straight output link and its hop distance remains at $D=31$ 1 because the straight input always has priority: probability=1.

Canyan Network Characteristics vs. Network Parameters

Figure 18:
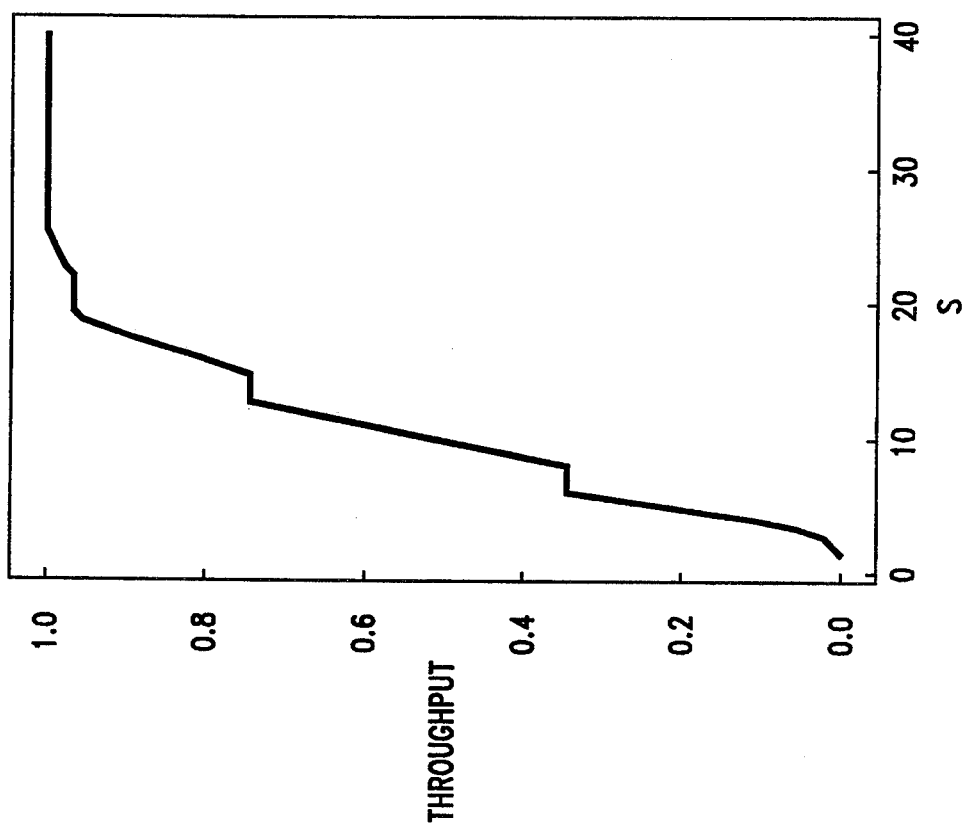
Figure 17:
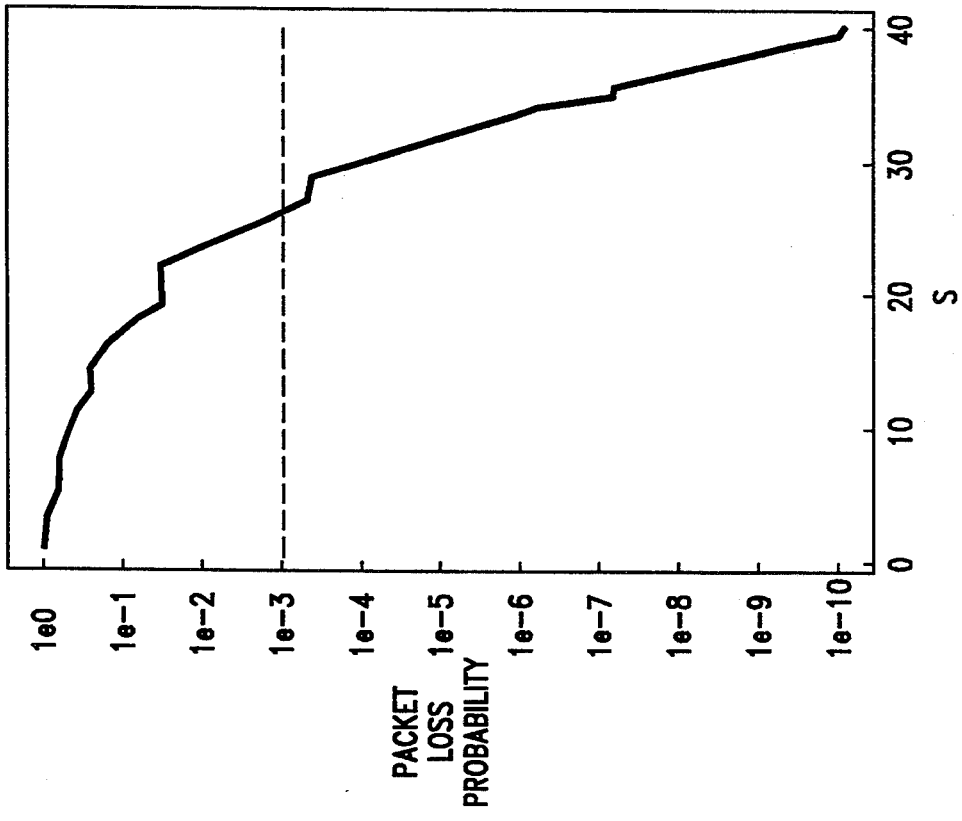

Computer simulations have been used to analyze the operating characteristics (packet loss probability, throughput, etc.) for Canyan distribution networks with various sizes (LxN), dimensionalities (S, m, and n), and offered loads ($p_L$). The results for a network with $L=N=256$, $m=16$, $n=8$, and $p_L=1.0$ are shown in FIGS. 17-18, where the packet loss probability and the throughput are plotted as a function of the number of node-stages in the network (S). The shape of the resulting curves is characteristic of most Canyan networks. As expected, Canyan networks with more node-stages will typically have lower blocking probabilities and higher throughputs, because the packets are offered more opportunities to find their way to an available output chute. However, both curves approach asymptotic limits. For example, regardless of the value of S, the packet loss probability for the particular Canyan network in FIG. 17 never drops below a value of $6.8 \times 10^{-4}$. This limit is the growable packet switch limit of Eq. 1, which predicts that the lowest possible blocking probability for a growable packet switch with $m=16$, $n=8$, and $p_L=1.0$ is approximately $7.9 \times 10^{-4}$, which is shown as a dashed, horizontal line in FIG. 17. In other words, for uniformly distributed destination addresses, there is a small probability that some of the output packet modules will have more than m=16 packets destined for them during some of the packet slots, so some of these packets must be dropped. (Note: It is shown that these asymptotic limits can be modified if the values of m and n are changed).

Although the simulation results provide useful information for small Canyan networks (L,N≦256), simulations of larger Canyan networks typically require excessive amounts of processing power and computation time. As a result, the Markov model was used for the analysis of larger networks. To validate this model, the packet loss probability and the throughput for the network of FIGS. 17-18 (L=N=256, m=16, n=8, and $\rho_L=1.0$) were re-calculated using the Markov model. The initial conditions defined by Eq. 7 and Eq. 8, Eq. 11 and Eq. 12 and the transition probability equations described above were used to determine the network throughput and the packet loss probability (Eq. 5 and Eq. 6). The results are shown in FIGS. 19-20, and it can be seen that the curves in FIGS. 17-18 and FIG. 12 track one another very closely until the grow able packet switch limit is reached. The Markov model does not accurately predict the existence of this limit, so a hybrid model combining the results of the Markov model and the results of the growable packet switch limit (Eq. 1) was used to analytically characterize the Canyan network. This hybrid model predicted the actual packet loss probability to be the maximum of the two packet loss probability values predicted by the Markov model and the growable packet switch limit. The growable packet switch limit predicted for m=16, n=8, and $\rho_L=1.0$ is shown as a dashed, horizontal line in the packet loss probability curve of FIG. 19, and the resulting hybrid model in FIG. 19 tracks quite well with the simulation results of FIG. 17. The region with the largest error occurs at the intersection between the Markov model curve and the horizontal limit line, and even there, the magnitude of the error is still less than an order of magnitude. Similar results were observed for many different Canyan networks with various sizes, dimensionalities, and offered loads.

Figure 21:
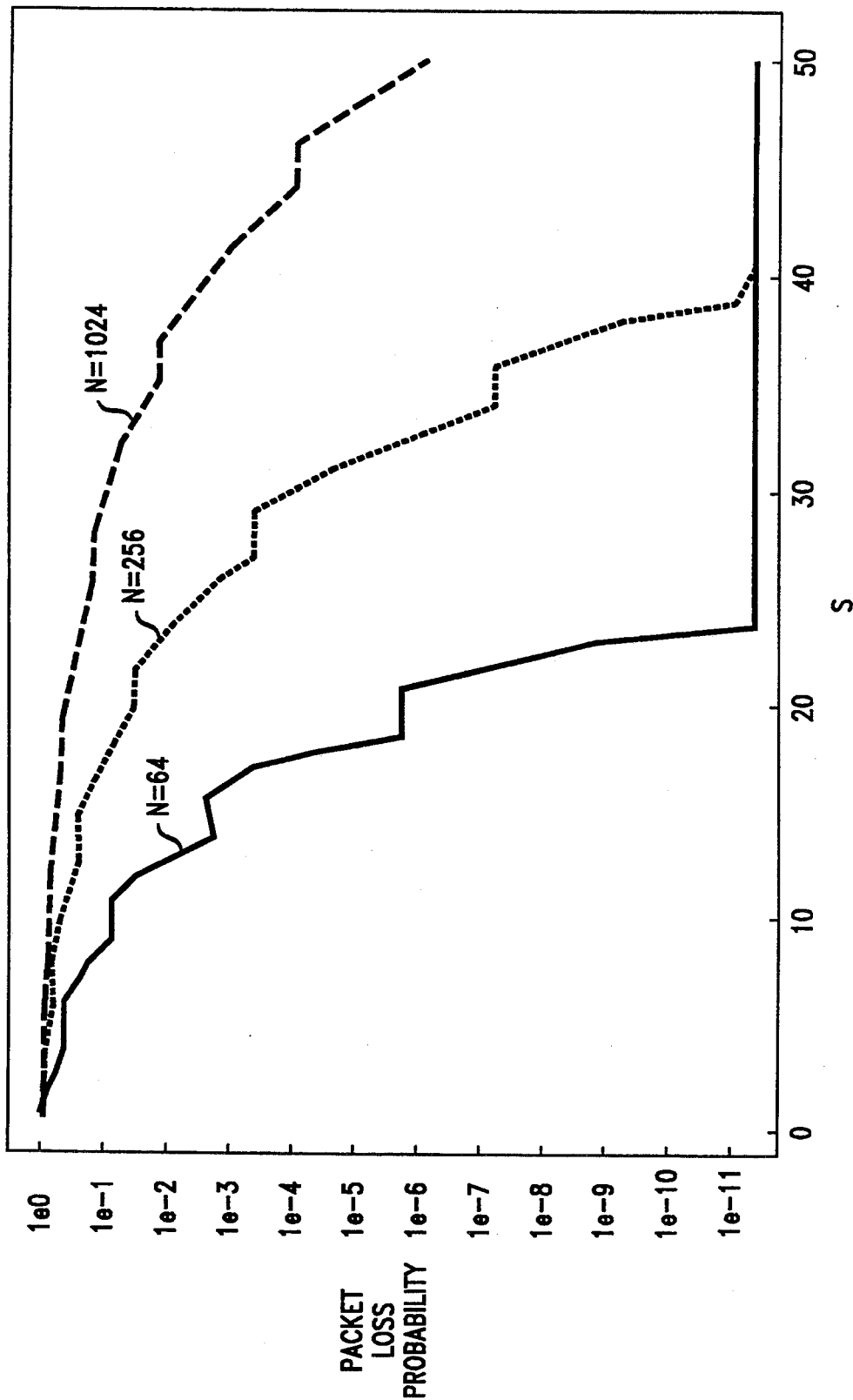

Using the hybrid Markov model, the packet loss probabilities for many different Canyan distribution networks were calculated. As an example, the plots in FIG. 21 indicate how the packet loss probability varies as a function of network size (N). These plots indicate that the growable packet switch limit remains fixed as N is increased (because the ratio of m and n remain unaltered), but the Markov model portion of the curves have different shapes and slopes. In particular, as L and N are increased, the Canyan network requires more node-stages to produce a desired packet loss probability. This is a result of three effects: 1) more stages are required for full connectivity as L and N are increased, 2) a deflected packet must propagate through more stages to reach its desired output row as L and N are increased, and 3) there are more ways for packets to deflect one another as L and N are increased.

Figure 22:
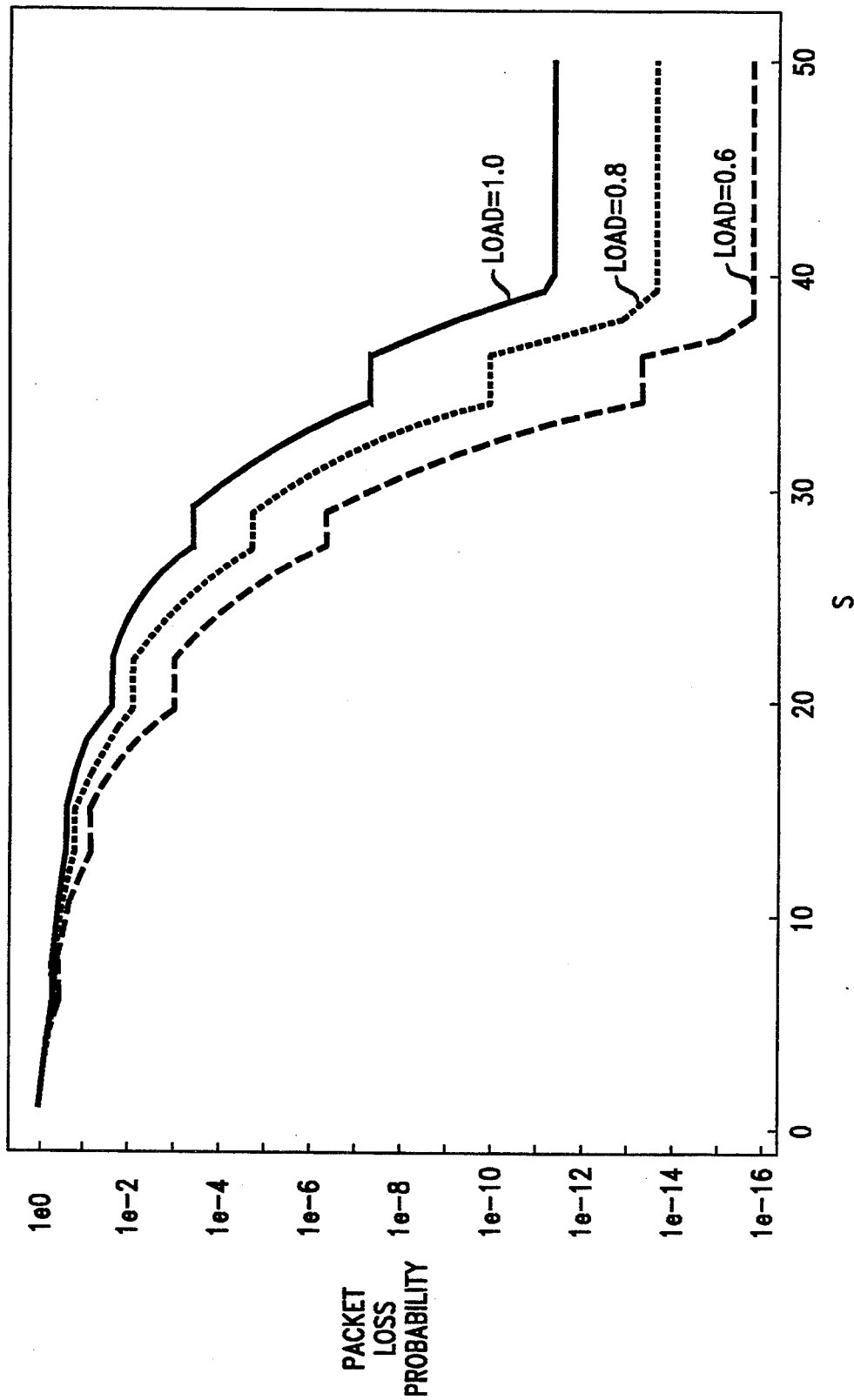

Variations in the offered load also have an effect on the performance of Canyan networks. FIG. 22 illustrates that the same network with different loads will have different growable packet switch linfits (higher loads have higher limits). In addition, networks with higher loads also require more node-stages to produce a desired packet loss probability, because there are more ways for packets to deflect one another.

Figure 23:
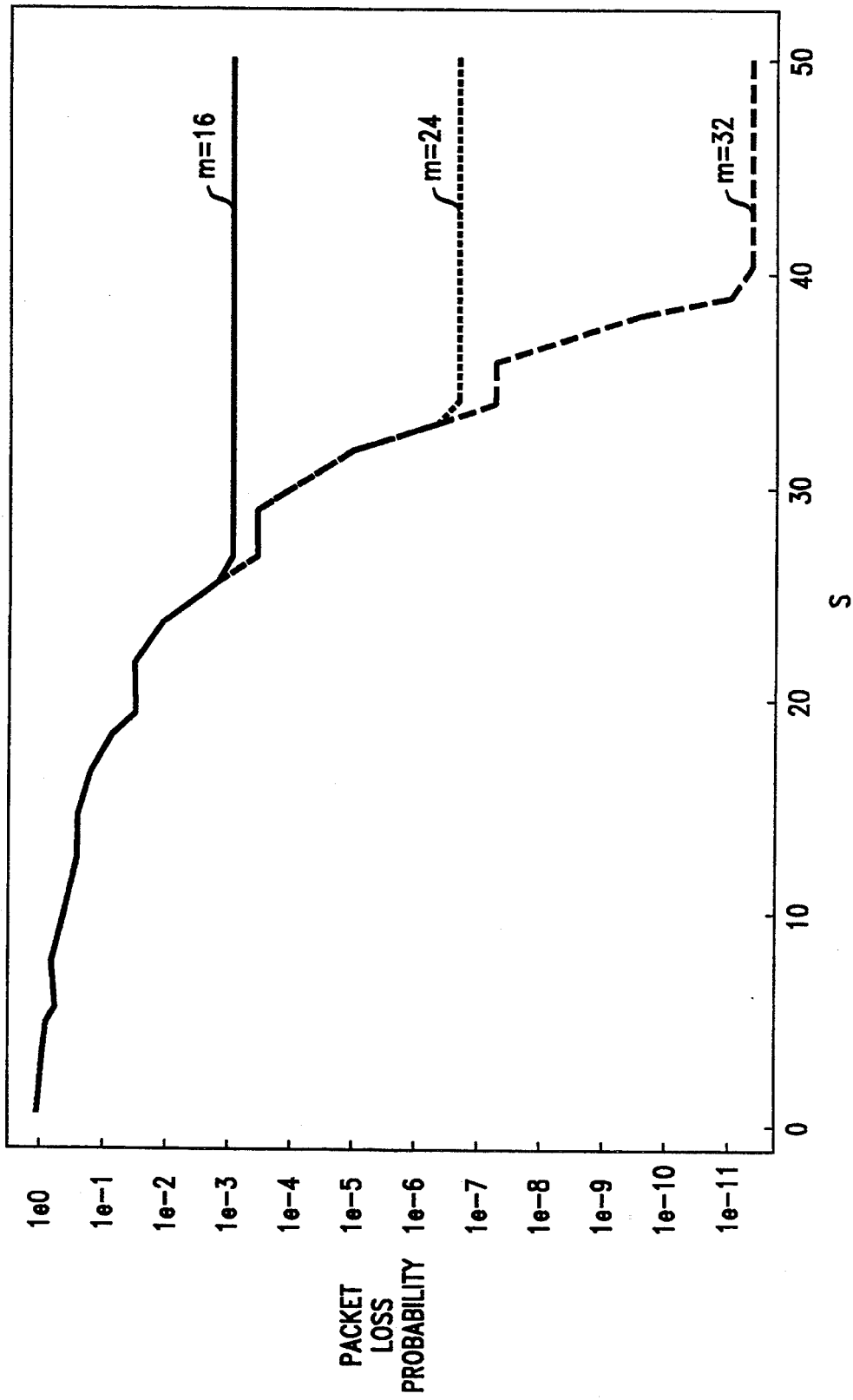

In FIG. 23, the value of m (the number of FIFO queues associated with each of the output packet modules) is varied, and this only alters the growable packet switch limit. As shown in the FIGURE, higher values of m produce lower limits and less blocking, because there are more available output chutes providing more access to the output packet modules.

Figure 24:
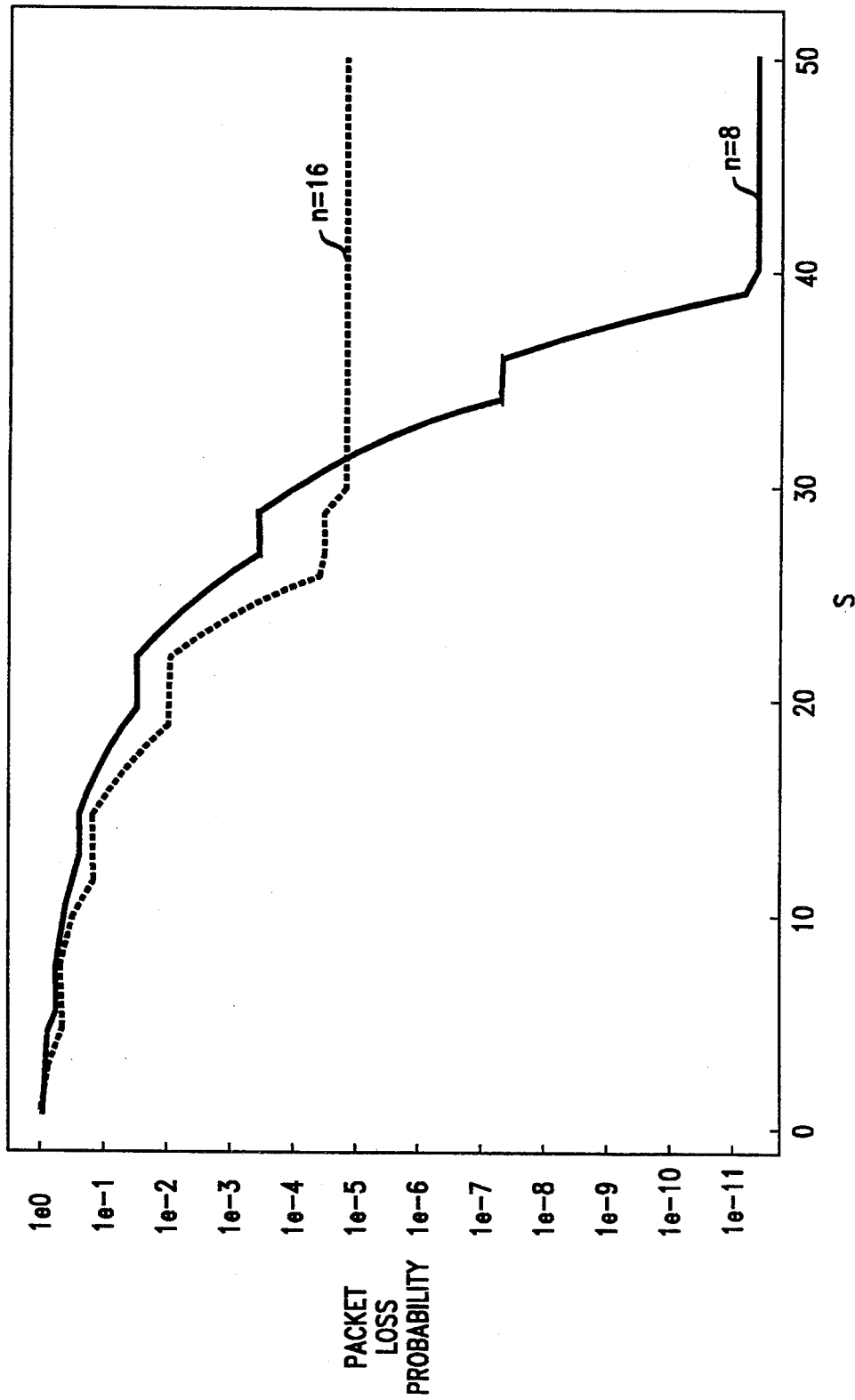

FIG. 24 shows that the packet loss probability curves are significantly influenced by changes in the value of n (the number of output ports associated with each output packet module). As n is increased, the growable packet switch limit also increases, because on the average, more packets will be homing in on and more contention will exist for the m FIFO queues associated with a particular output packet module. On the other hand, as n is increased, the Canyan network requires less node-stages to produce a desired packet loss probability. This is because the average hop distance is lowered as n is increased, and the number of stages through which a deflected packet must propagate to reach its desired output row is also decreased as n is increased.

The Compressed-Canyan Distribution Network

All of the packet loss probability curves for the Canyan distribution networks in the previous section had similar shapes. An interesting feature within all of these curves is the appearance of multiple plateaus on the otherwise monotonically decreasing plots. In addition, the plateaus appear to be spaced quite evenly. Closer analysis of these plots indicates that the plateaus occur wherever local link-stages are used in the network. In particular, the packet loss probability does not seem to be significantly decreased by the inclusion of many of the local link-stages. This should be expected, because local link-stages are only useful if a packet is deflected by a full set of output chutes in its current output row. The local link-stage can route the packet to a different output row that is still connected to its desired output packet module. Having a full set of output chutes in a row is rare, because most practical networks will have relatively large values of m to maintain a low growable packet switch limit (FIG. 23), so they will also have a fairly large number of output chutes (2m/n) connected to each node. In addition, it is even more unlikely that the local link-stages will be used near the input end of the network, because the propagating packets have not yet passed through enough stages to fill the output chutes.

Thus the local link-stages can oftentimes be eliminated from the Canyan network design. The resulting network topology typically requires fewer node-stages for a particular packet loss probability, so these networks are called Compressed - Canyan networks. (Note: If a Canyan network is designed with a small number of output chutes per node, or if extremely low blocking probabilities are required, or if "hot spots" (popular output packet modules) are expected, then local link-stages can typically be added near the middle and output end of the network to correct for the problems associated with full output chutes).

Unfortunately, all of the local link-stages from a Canyan network cannot be removed to create a useful Compressed-Canyan network. The link-stages to be removed are carefully selected. For example, if a particular Canyan network is designed with a small number of output chutes per node, or if extremely low blocking probabilities are required, or if "hot spots" (popular output packet modules) are expected, then local link-stages can typically be added near the middle and output end of the network to correct for the problems associated with full output chutes. In addition, it may be necessary to customize the type and number of consecutive local link-stages that are used in each of these correction regions.

Figure 25:
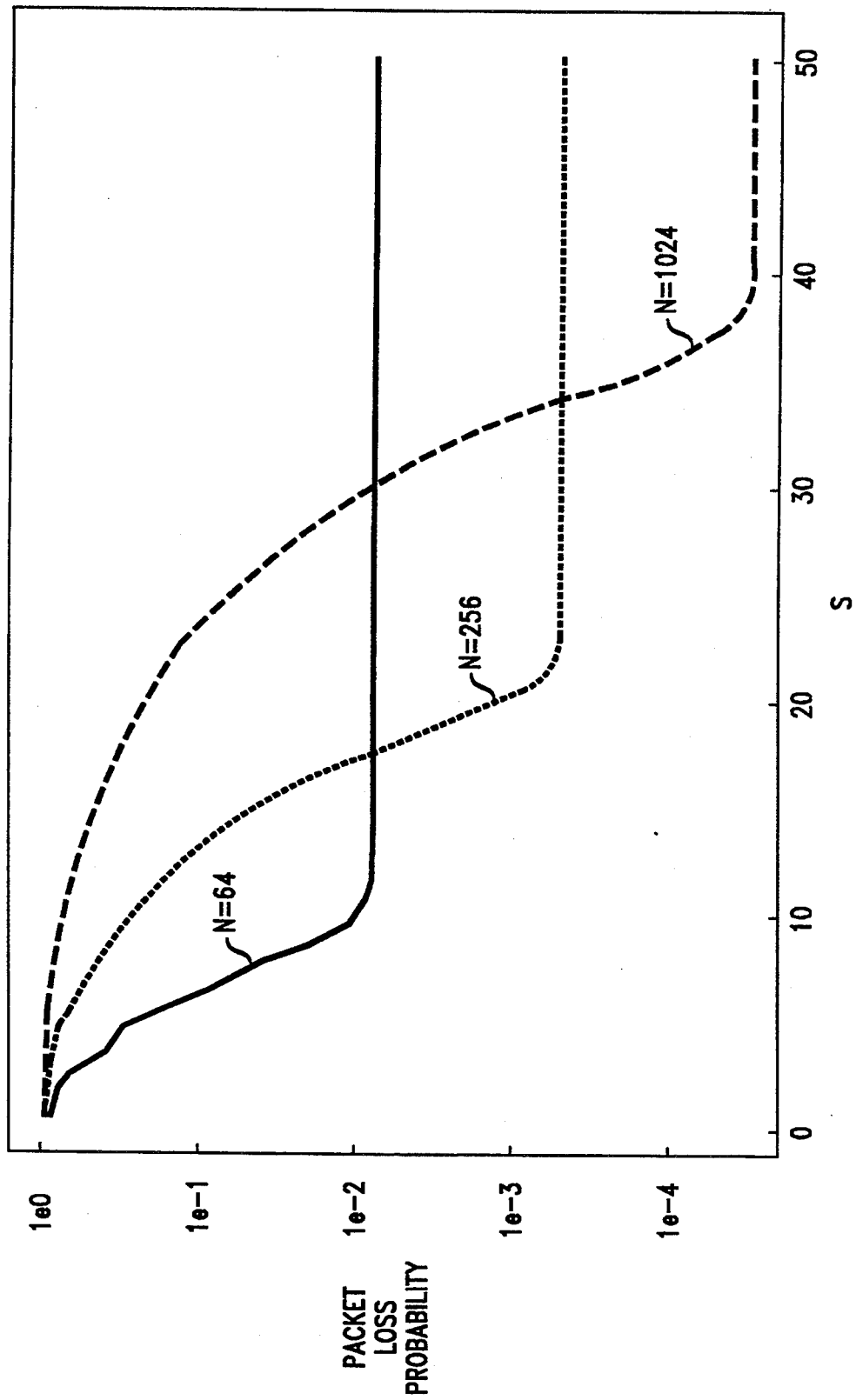

As an example, the packet loss probability curves for three Compressed-Canyon networks (L=N=64, L=N=256, and L=N=1024) are illustrated in FIG. 25. Each of the networks has the same network parameters (m=32, n=8, and $\rho_L=1.0$), and each of the networks has all of its local link-stages removed. Unfortunately, the problems associated with full output chutes become apparent in each of these plots, because the plots level out at packet loss probabilities much higher than those predicted by the grow able packet switch limit. To correct for the full output chute problems in these three networks, local link-stages are added to the networks in strategic locations. The following iterative mapping rules (Eqs. 15–18) were used to determine where and how local link-stages should be added to improve the networks of FIG. 25.

For link-stage i=0, the connection variable V(0) is given by:

$$V(0) = \log_2(N) - 1. \quad [15]$$

For link-stage i, $1 \leq i < \log_2(N)\log_2(N/n)/2$, the connection variable V(i) is given by:

$$V(i) = V(i-1) - 1, \text{ if } V(i-1) \geq \log_2(n) + 1 \quad [16]$$

$$V(i) = \log_2(N) - 1, \text{ if } V(i-1) = \log_2(n)$$

For link-stage $i = \log_2(N)\log_2(N/n)/2$, the connection variable V(i) is given by:

$$V(i) = \log_2(n) - 1. \quad [17]$$

For link-stage i, $i > \log_2(N)\log_2(N/n)/2$, the connection variable V(i) is given by:

$$V(i) = V(i-1) - 1, \text{ if } V(i-1) \geq \log_2(n) + 1 \quad [18]$$

$$V(i) = V(i - \log_2(N/n) - 1), \text{ if } [V(i-1) = \log_2(n)] \text{ AND } [V(i - \log_2(N/n) - 1) > 1]$$

$$V(i) = \log_2(n) - 1, \text{ if } [V(i-1) = \log_2(n)] \text{ AND } [V(i - \log_2(N/n) - 1) = 1]$$

Figure 26:
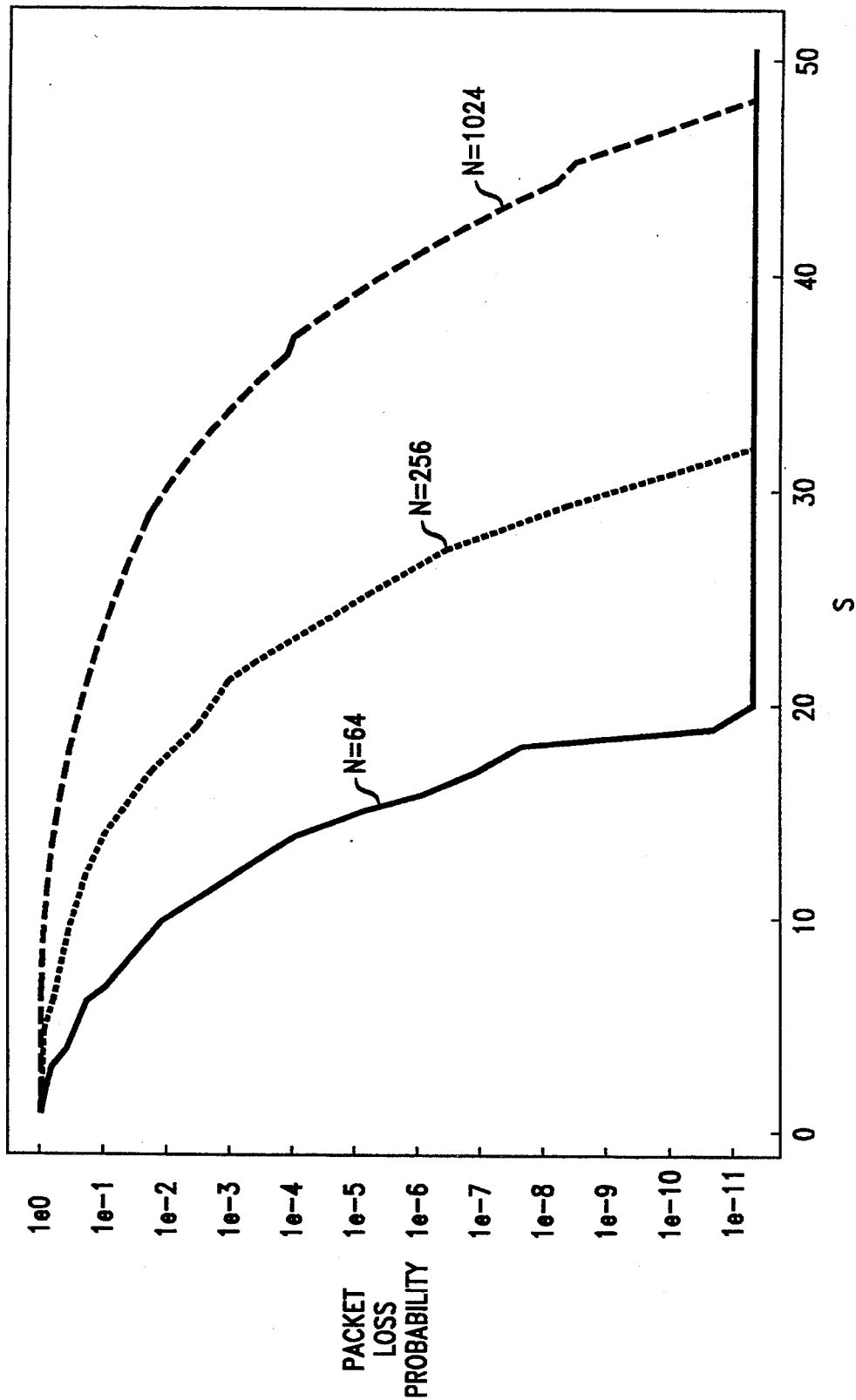
Figure 27:
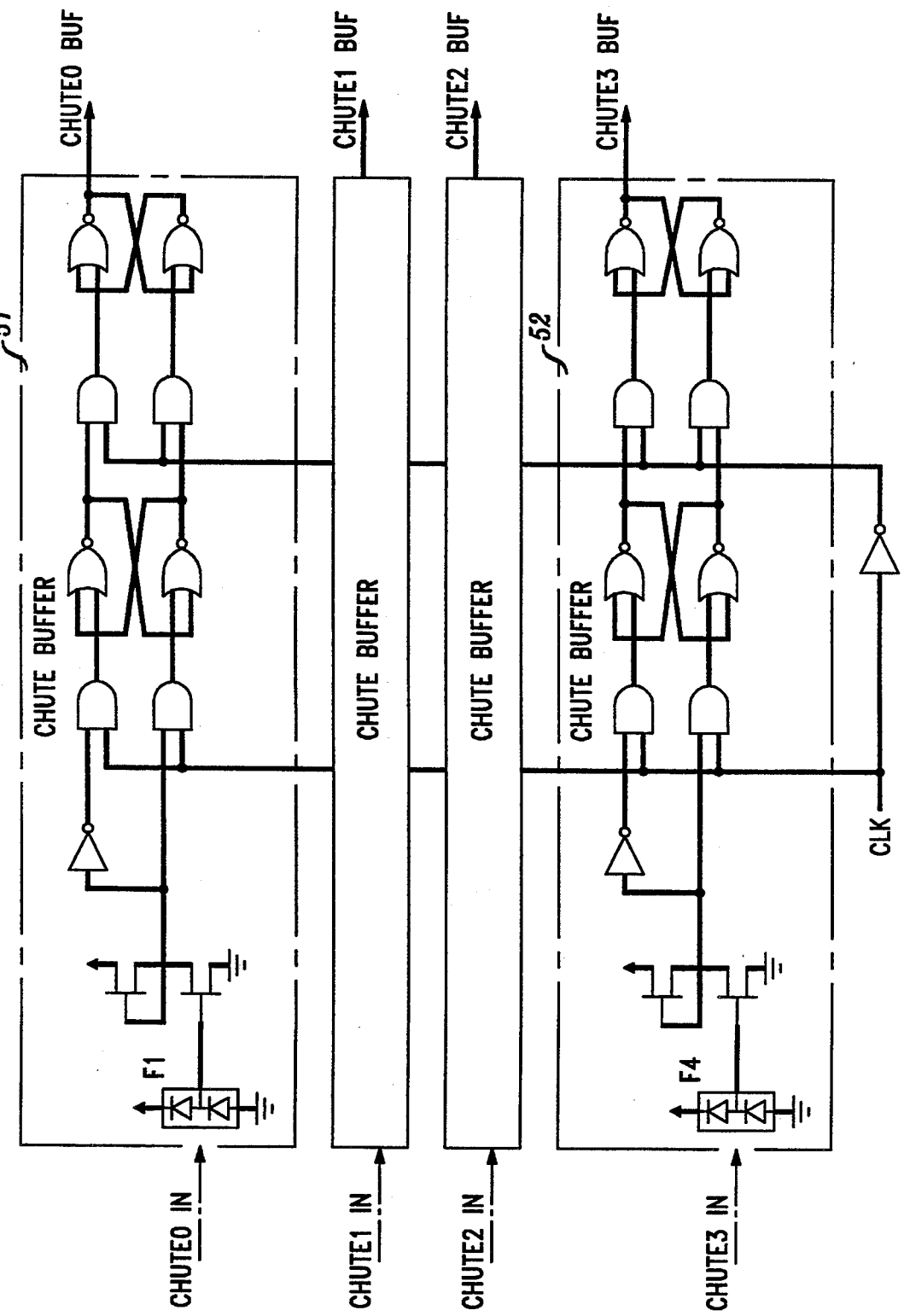
FIGS. 27–36 are diagrams showing the various elements of the node of FIG. 7 in greater detail.
Figure 28:
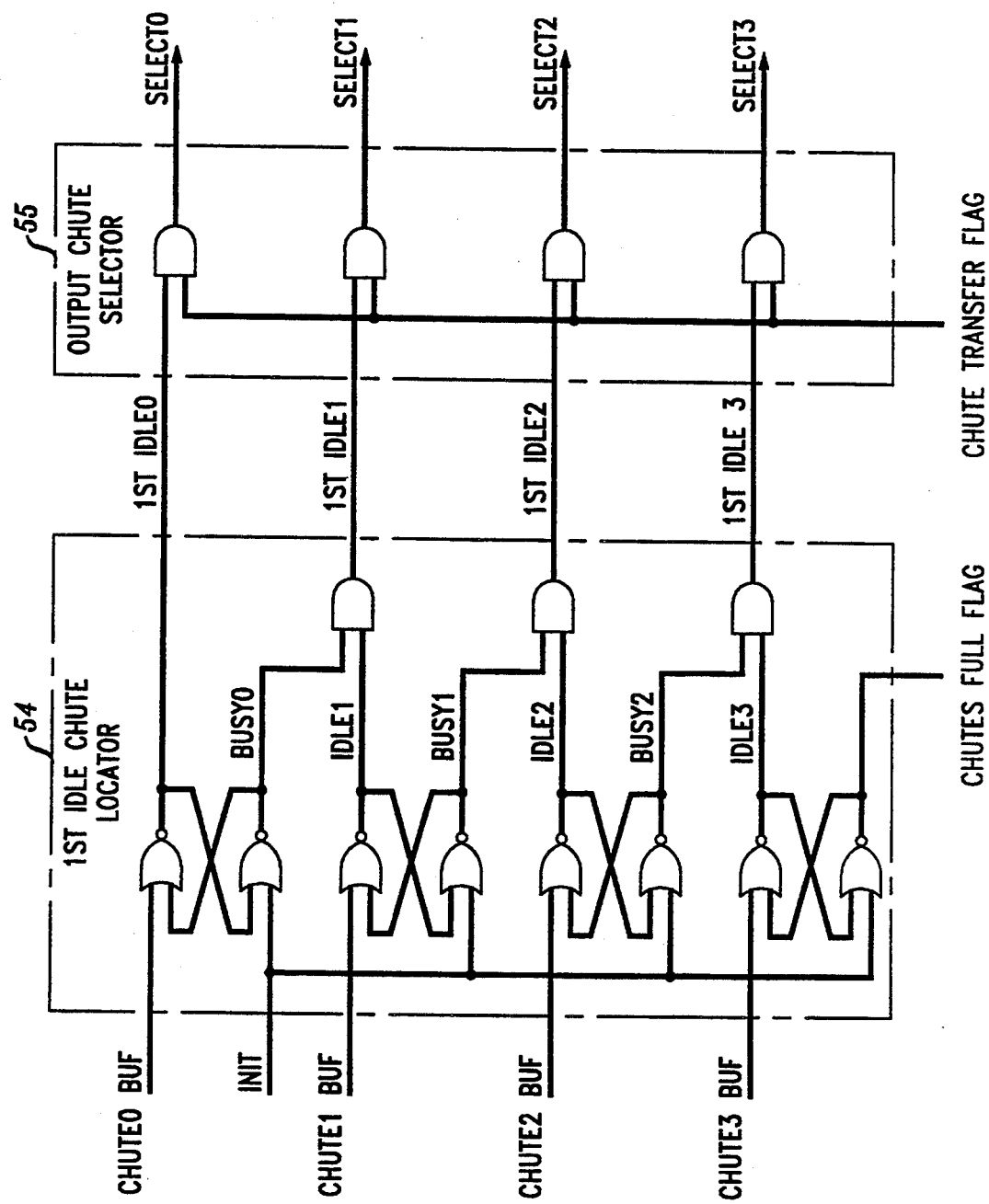
Figure 29:
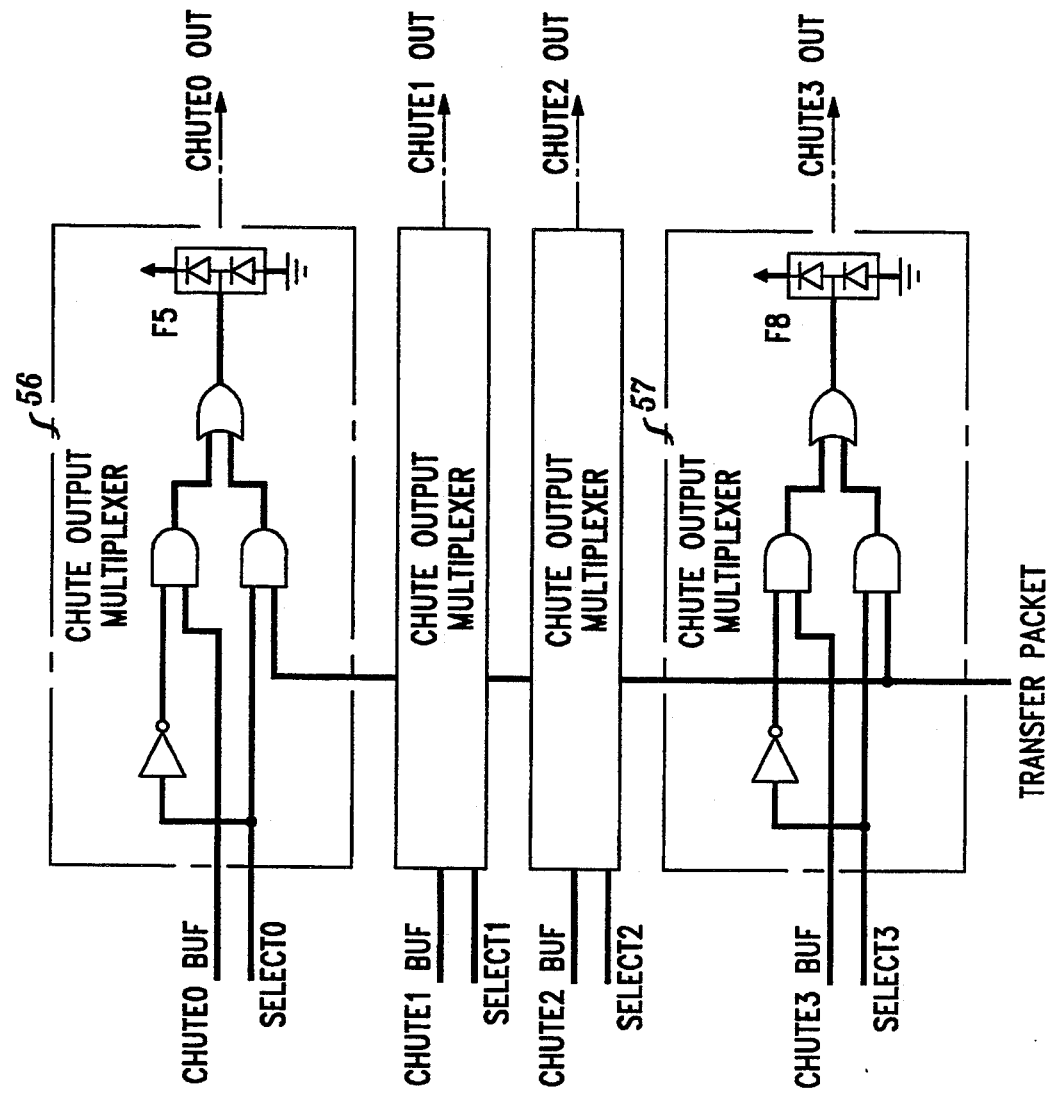
Figure 30:
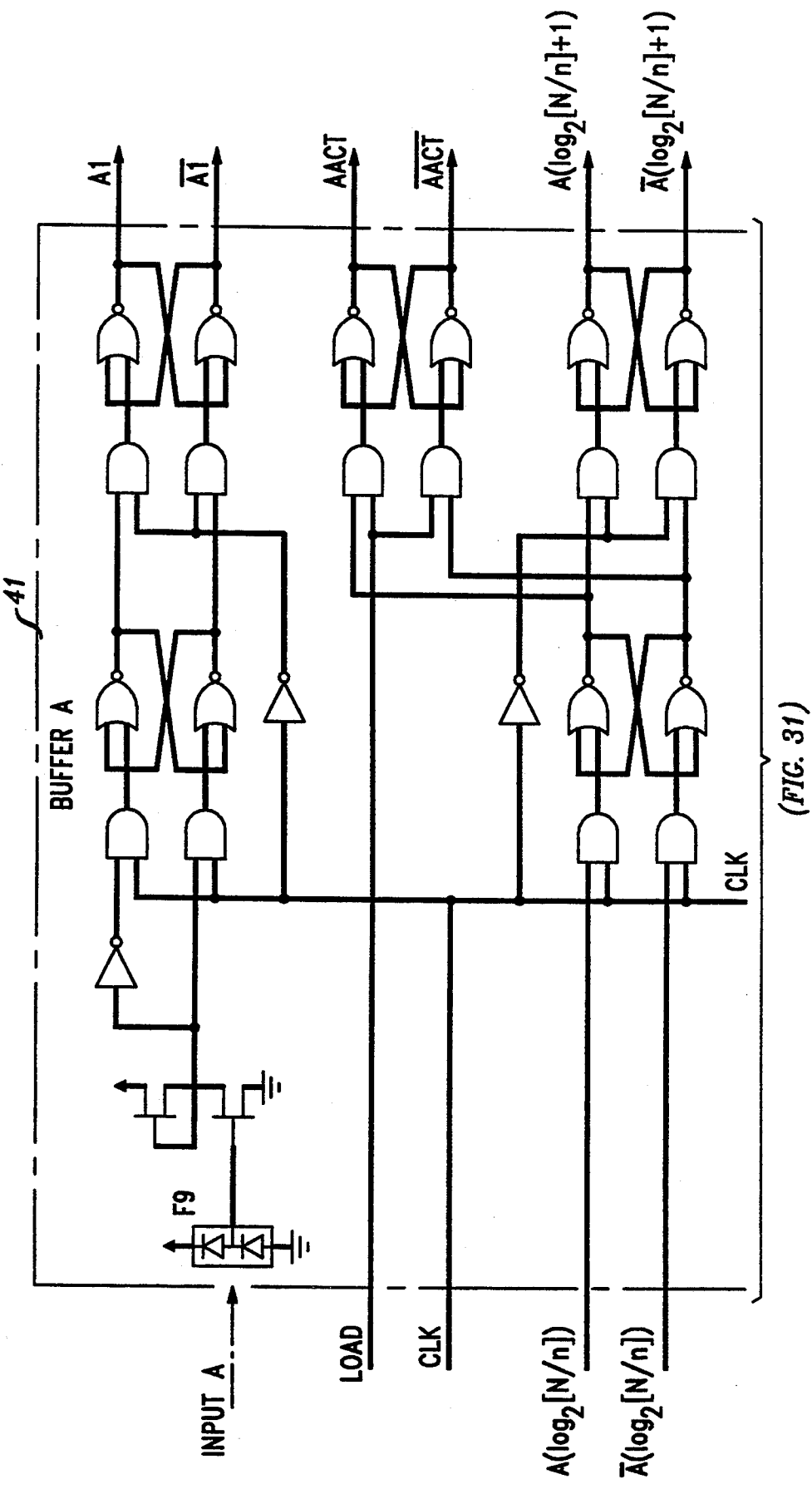
Figure 31:
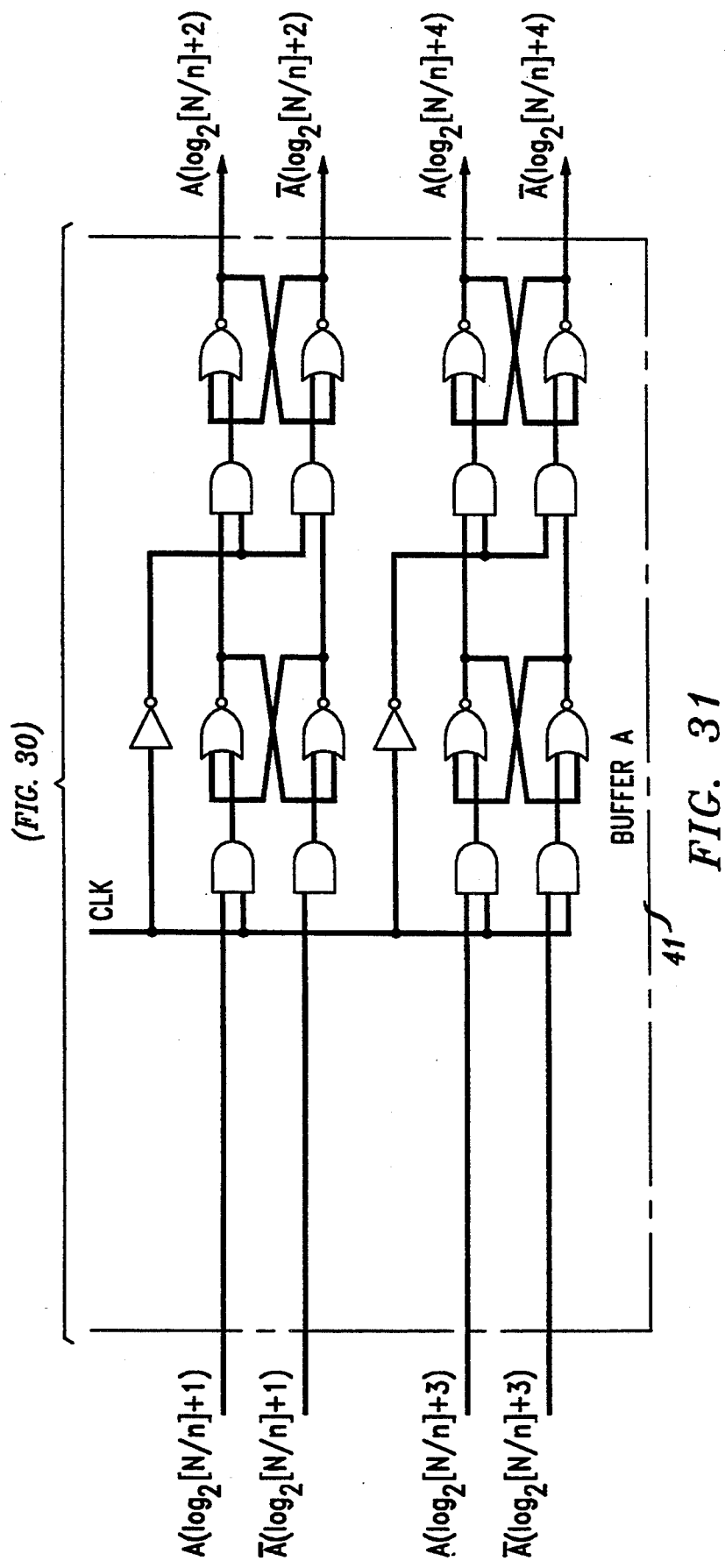
Figure 32:
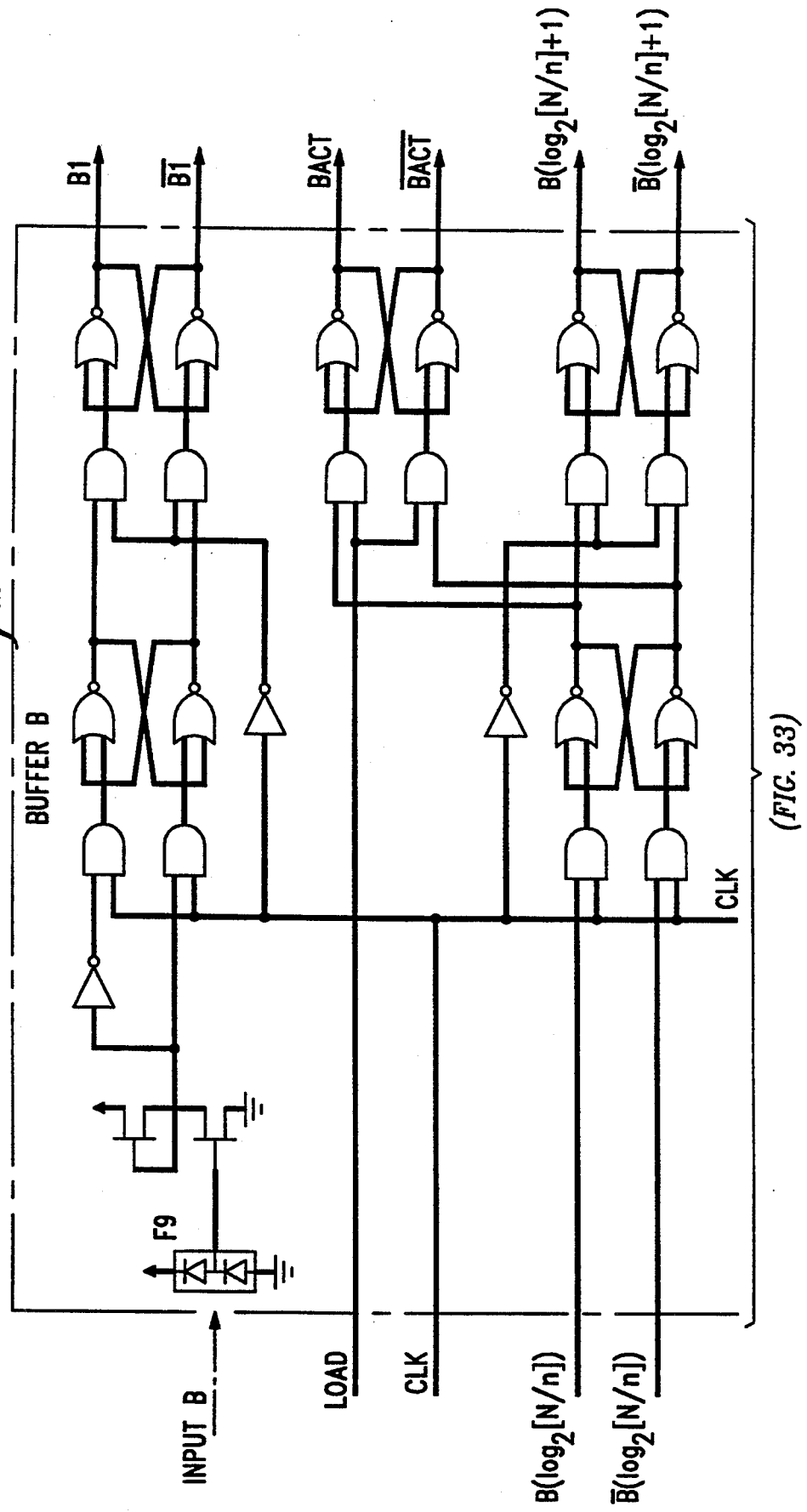
Figure 33:
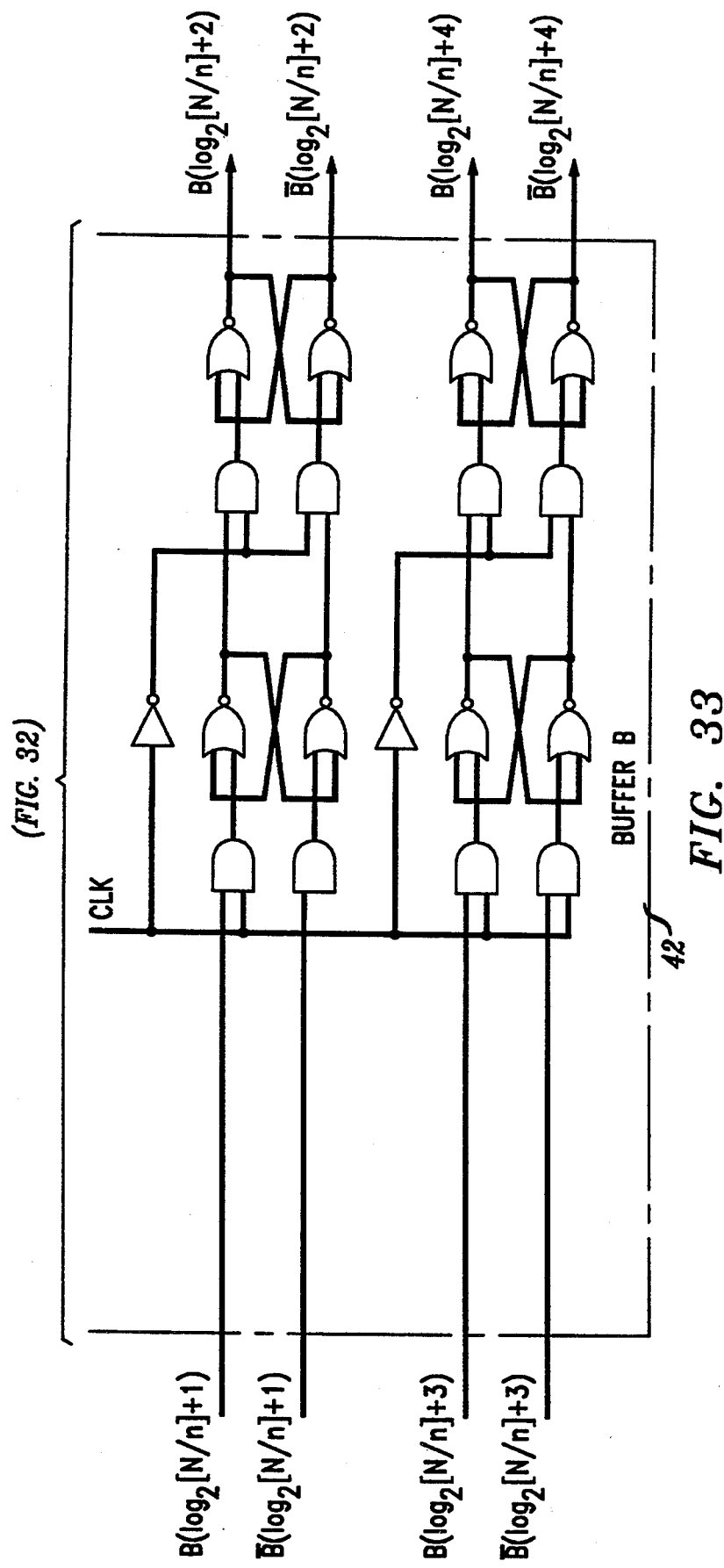
Figure 34:
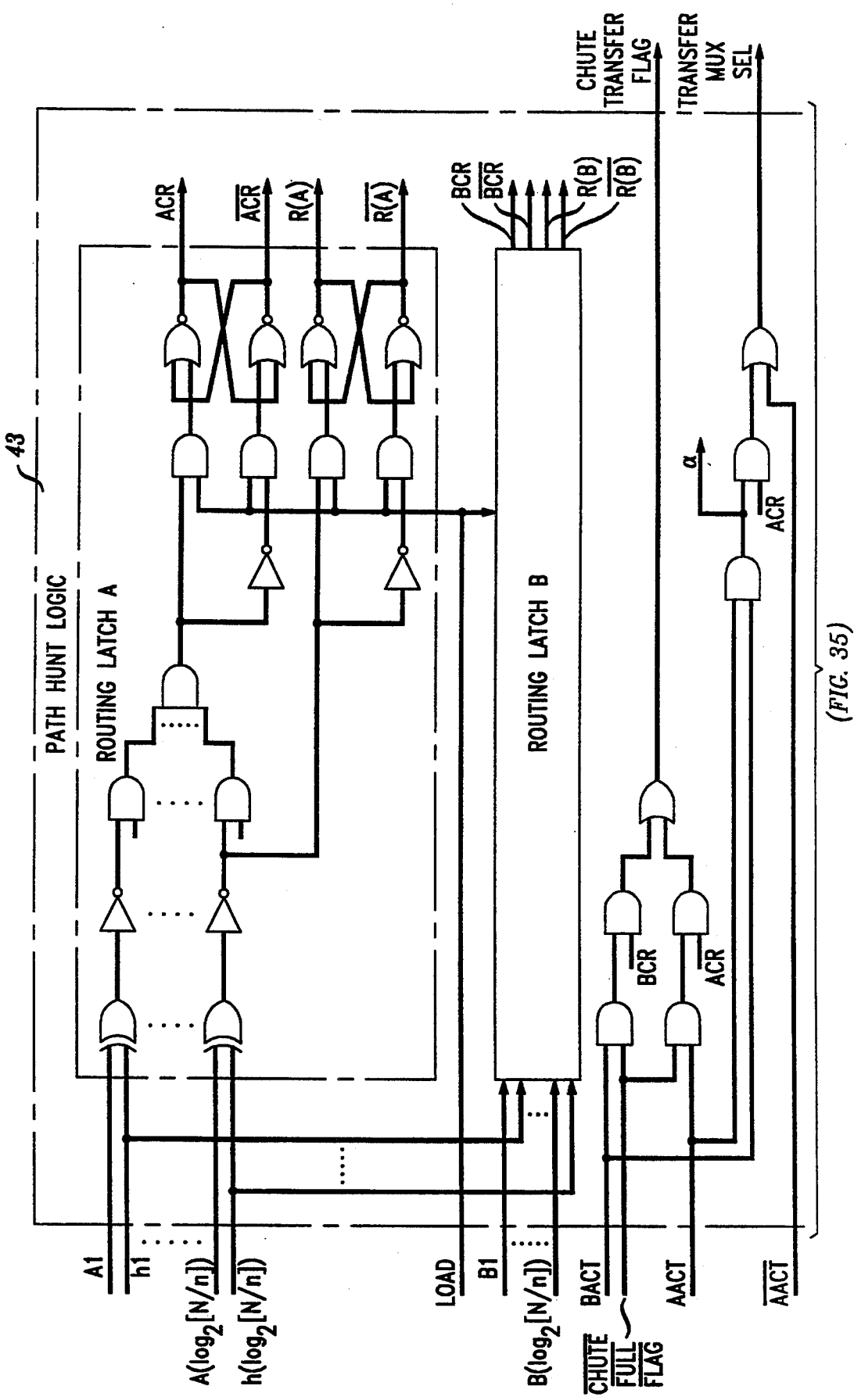

If these rules are applied to the networks in FIG. 25, new Compressed-Canyon networks with strategic local link-stages are created. The loss probability curves for the three new Compressed-Canyon networks are illustrated in FIG. 26. Comparisons between FIG. 21 and FIG. 26 indicate that the use of Compressed-Canyon networks result in substantial savings in system hardware costs.

The iterative mapping rules described above were devised using trial-and-error techniques.

It is to be understood that the above-described embodiment is merely illustrative of the principles of the invention and that many variations may be devised by those skilled in the art without departing from the spirit and scope of the invention. For example, distribution network 23 may be implemented in either optics or electronics. It is therefore intended that such variations be included within the scope of the claims.

We claim:

1. A packet switching arrangement having L input ports, M intermediate ports and N output ports, where L, M and N are positive integers greater than two, said arrangement comprising a distribution network for switching packets from said L input ports to said M intermediate ports without storing full received packets, and N/n output packet switching modules, where n, the number of outputs from each output packet switching module, and N/n are positive integers with $N > n > 1$, packets arriving at said L input ports during a given time slot being delivered by said distribution network to said output packet switching modules during a single time slot;

each of said modules comprising output means for switching packets from a distinct group of m of said intermediate ports to a distinct group of n of said output ports, where m is a positive integer with $m > n$, and means within said output means for storing full received packets;

said distribution network comprising

S stages of nodes, none of which nodes includes means for storing full received packets, with each node of at least the first (S−1) of said node stages comprising an X×Y switching means, where S, X and Y are positive integers with $S > 3$, $X > 1$ and $Y > 1$, and (S−1) link stages interconnecting successive ones of said S node stages, with each link stage comprising chute links and switch links, wherein the X×Y switching means of each node of the interior (S−2) of said S node stages receives packets on X switch links and selectively transmits packets on Y switch links, wherein said each node of said interior (S−2) node stages further comprises a plurality of chute connection means, each comprising an FET-SEED circuit, and each connected to only one chute link of the preceding link stage and to only one chute link of the following link stage, for transmitting a packet, being received from said preceding stage chute link, onto said following stage chute link, and means for transferring a packet, being received on a switch link by the X×Y switching means of said each node of said interor (S−2) node stages, to any selected one of said plurality of chute connection means for transmission on the following stage chute link.

2. An arrangement in accordance with claim 1 wherein the number of said plurality of chute connection means of said each node of said interior (S−2) node stages is Xm/n, where m/n is a positive integer.

3. An arrangement in accordance with claim 1 wherein all of said plurality of chute connection means of said each node of said interior (S−2) node stages are connected via chute links to only one node of the following node stage.

4. An arrangement in accordance with claim 1 wherein said selected chute connection means is selected based on the absence of a packet on the preceding stage chute link.

5. An arrangement in accordance with claim 1 wherein said transferring means is responsive to destination information included in said packet being received on a switch link.

6. An arrangement in accordance with claim 1 wherein said transferring means is responsive for transferring said packet being received on a switch link unless packets are present on all of the preceding stage chute links connected to said plurality of chute connection means of said each node of said interior (S-2) node stages.

7. An arrangement in accordance with claim 1 wherein the $X \times Y$ switching means of each node of the first of said S node stages receives packets from X of said input ports and selectively transmits packets on Y switch links, and wherein said each node of said first of said S node stages further comprises a plurality of chute connection means each connected to only one chute link of the following link stage, for transmitting a packet onto the following stage chute link, and means for transferring a packet, being received from one of said X input ports by said $X \times Y$ switching means of said each node of said first of said S node stages, to any selected one of said plurality of chute connection means of said each node of said first of said S node stages for transmission on the following stage chute link, and wherein each node of the last of said S node stages comprises means for receiving packets on X switch links, a plurality of chute connection means each connected to only one chute link of the preceding link stage and to only one of said M intermediate ports, for transmitting a packet, being received from the preceding stage chute link, to said one intermediate port, and means for transferring a packet, being received on a switch link by said receiving means, to any selected one of said plurality of chute connection means of said each node of said last of said S node stages for transmission to said one intermediate port.

8. An arrangement in accordance with claim 7 wherein said receiving means discards a packet being received on a switch link by said receiving means but not being transferred by said transferring means of said each node of the last of said S node stages.

9. An arrangement in accordance with claim 7 where no packets are discarded by any nodes of the first $(S-1)$ of said S node stages.

10. An arrangement in accordance with claim 1 wherein said distribution network comprises a plurality of partitions each associated with a distinct one of said output packet switching modules and each comprising all of the chute links of said network leading to the associated output packet switching module and all of the nodes of said network interconnected by said all of the chute links.

11. An arrangement in accordance with claim 10 wherein said each partition comprises a plurality of nodes in each of said S node stages.

12. An arrangement in accordance with claim 10 wherein said each partition comprises n/X nodes in each of said S node stages.

13. An arrangement in accordance with claim 10 wherein said $(S-1)$ link stages comprise global link stages having inter-partition switch links and local link stages having no inter-partition switch links and wherein the nodes of the first $(S-1)$ of said S node stages comprise global nodes preceding global link stages and local nodes preceding local link stages, wherein global nodes route packets in accordance with a first routing method, and local nodes route packets in accordance with a second routing method.

* * * * *

UNITED STATES PATENT AND TRADEMARK OFFICE
CERTIFICATE OF CORRECTION

PATENT NO. : 5,345,444

DATED : September 6, 1994

INVENTOR(S) : Thomas J. Cloonan and Gaylord W. Richards

It is certified that error appears in the above-indentified patent and that said Letters Patent is hereby corrected as shown below:

Column 8, lines 21-23, equation 2 should read $$(z_q, z_{q-1}, \cdots, z_2, z_1) = B_i^\theta [(u_q, u_{q-1}, \cdots, u_{q-i+1}, u_{q-i}, u_{q-i-1}, \cdots, u_2, u_1)]$$

$$= (u_q, u_{q-1}, \cdots, u_{q-i+1}, \theta \text{ XOR } u_{q-i}, u_{q-i-1}, \cdots, u_2, u_1). \quad [2]$$

Column 17, line 66, and Column 18, line 1, equation 7 should read $$P[Y(-1,-1)] = 0, \quad \text{for } D = -1 \quad [7]$$

$$P[Y(0,-1)] = n/N, \quad \text{for } D = 0$$

$$P[Y(D,-1)] = 2^{D-1} n/N, \quad \text{for } 1 \leq D \leq X = \log_2(N/n)$$

$$P[Y(X+1,-1)] = 0, \quad \text{for } D = X+1 = \log_2(N/n) + 1$$

UNITED STATES PATENT AND TRADEMARK OFFICE
CERTIFICATE OF CORRECTION

PATENT NO. : 5,345,444
DATED : September 6, 1994
INVENTOR(S) : Thomas J. Cloonan and Gaylord W. Richards It is certified that error appears in the above-indentified patent and that said Letters Patent is hereby corrected as shown below:

Column 22, line 53, the equation should read probability=(0.5)P[Y(1,i-1)]P[Z(C-1,i-1)].

Column 25, lines 42 and 43, the heading should read

P[Y(D-1,i)/Y(D,i-1)], for $2 \leq D \leq X+1$ in Global-Local Node-Stages.

Signed and Sealed this

Twenty-seventh Day of December, 1994

BRUCE LEHMAN

*Attest:*

*Attesting Officer*     *Commissioner of Patents and Trademarks*